US011945943B2

(12) United States Patent
Renner et al.

(10) Patent No.: US 11,945,943 B2
(45) Date of Patent: Apr. 2, 2024

(54) BINDER COMPOSITION FOR ADDITIVE MANUFACTURING

(71) Applicant: Desktop Metal, Inc., Burlington, MA (US)

(72) Inventors: Christopher Benjamin Renner, Cambridge, MA (US); Ilya L. Rushkin, Acton, MA (US); Robert J. Nick, Pepperell, MA (US); Emanuel M. Sachs, Newton, MA (US)

(73) Assignee: Desktop Metal, Inc., Burlington, MA (US)

( * ) Notice: Subject to any disclaimer, the term of this patent is extended or adjusted under 35 U.S.C. 154(b) by 584 days.

(21) Appl. No.: 16/998,527

(22) Filed: Aug. 20, 2020

(65) Prior Publication Data

US 2021/0053113 A1 Feb. 25, 2021

Related U.S. Application Data

(60) Provisional application No. 62/924,093, filed on Oct. 21, 2019, provisional application No. 62/890,871, filed on Aug. 23, 2019.

(51) Int. Cl.
| | |
|---|---|
| *B33Y 10/00* | (2015.01) |
| *B22F 1/10* | (2022.01) |
| *B22F 1/103* | (2022.01) |
| *B22F 10/00* | (2021.01) |
| *B33Y 70/10* | (2020.01) |
| *B33Y 80/00* | (2015.01) |
| *C08L 33/02* | (2006.01) |

(52) U.S. Cl.
CPC ............. *C08L 33/02* (2013.01); *B22F 1/10* (2022.01); *B22F 1/103* (2022.01); *B22F 10/00* (2021.01); *B33Y 10/00* (2014.12); *B33Y 70/10* (2020.01); *B33Y 80/00* (2014.12); *B22F 2301/255* (2013.01); *C08L 2312/00* (2013.01)

(58) Field of Classification Search
CPC .......... B33Y 10/00; B33Y 70/00; B33Y 70/10
See application file for complete search history.

(56) References Cited

U.S. PATENT DOCUMENTS

| | | |
|---|---|---|
| 2,186,328 A | 1/1940 | Daniels |
| 6,508,980 B1 | 1/2003 | Sachs et al. |
| 6,955,776 B1 | 10/2005 | Feenstra |
| 8,808,867 B2 | 8/2014 | Chun et al. |
| 9,708,502 B2 | 7/2017 | Naruse et al. |
| 11,434,766 B2 | 9/2022 | Channel et al. |

(Continued)

FOREIGN PATENT DOCUMENTS

| | | |
|---|---|---|
| WO | WO 2017/040893 A1 | 3/2017 |
| WO | WO 2018/156933 A1 | 8/2018 |

OTHER PUBLICATIONS

3-Aminopropylphosphonic acid, CID: 97587, PubChem, https://pubchem.ncbi.nlm.nih.gov, PubChem release May 7, 2021, printout 4 pages. (Year: 2021).*
Kernan et al., Three dimensional printing of Tungsten carbide-cobalt using a cobalt oxide precursor. International Solid Freeform Fabrication Symposium. 2003. pp. 616-631.

(Continued)

*Primary Examiner* — Vanessa T. Luk
(74) *Attorney, Agent, or Firm* — Wolf, Greenfield & Sacks, P.C.

(57) ABSTRACT

Methods of additive manufacturing, binder compositions for additive manufacturing, and articles produced by and/or associated with methods of additive manufacturing are generally described.

17 Claims, 15 Drawing Sheets

(56) References Cited

U.S. PATENT DOCUMENTS

| | | | |
|---|---|---|---|
| 2005/0017394 A1* | 1/2005 | Hochsmann | B29C 64/165 425/375 |
| 2008/0214764 A1 | 9/2008 | Watanabe et al. | |
| 2011/0014083 A1 | 1/2011 | Amaya et al. | |
| 2012/0097581 A1 | 4/2012 | Chun et al. | |
| 2016/0177122 A1* | 6/2016 | Naruse | C08K 9/10 523/205 |
| 2016/0258298 A1 | 9/2016 | Channel et al. | |
| 2017/0283629 A1 | 10/2017 | Fortier | |
| 2018/0071820 A1 | 3/2018 | Natarajan et al. | |
| 2018/0272561 A1 | 9/2018 | Kasperchik et al. | |
| 2019/0054527 A1 | 2/2019 | Natarajan et al. | |
| 2019/0091766 A1 | 3/2019 | Kasperchik et al. | |
| 2019/0111479 A1 | 4/2019 | Kasperchik et al. | |
| 2021/0138550 A1 | 5/2021 | Renner et al. | |
| 2021/0162502 A1 | 6/2021 | Rushkin et al. | |
| 2021/0213532 A1* | 7/2021 | Kowalski | B33Y 10/00 |
| 2021/0394265 A1 | 12/2021 | Rushkin et al. | |
| 2022/0088855 A1* | 3/2022 | Williams | B22F 7/008 |
| 2022/0274174 A1* | 9/2022 | Chen | B29C 64/165 |

OTHER PUBLICATIONS

International Search Report and Written Opinion dated Jan. 10, 2020 in connection with International Application No. PCT/US2019/056508.

Holman et al., Surface Adsorption Effects in the Inkjet Printing of an Aqueous Polymer Solution on a Porous Oxide Ceramic Substrate. Journal of Colloid and Interface Science. 2002;247:266-274.

U.S. Appl. No. 17/075,355, filed Oct. 20, 2020, Renner et al.

U.S. Appl. No. 17/109,306, filed Dec. 2, 2020, Rushkin et al.

PCT/US2019/056508, Jan. 10, 2020, International Search Report and Written Opinion.

International Preliminary Report on Patentability dated Apr. 29, 2021 in connection with International Application No. PCT/US2019/056508.

Office communication dated Jan. 5, 2023 in connection with U.S. Appl. No. 17/075,355.

Bai et al., Binder jetting additive manufacturing with a particle-free metal ink as a binder precursor. Materials & Design. Jun. 5, 2018;147:146-56.

Manière et al., Swelling negation during sintering of sterling silver: An experimental and theoretical approach. Results in Physics. Dec. 1, 2018;11:79-84.

* cited by examiner

BINDER COMPOSITION FOR ADDITIVE MANUFACTURING

CROSS REFERENCE TO RELATED APPLICATIONS

The present application claims the benefit under 35 U.S.C. § 119(e) of U.S. Provisional Application No. 62/890,871, filed Aug. 23, 2019, titled "Binder Compositions for Additive Manufacturing," and U.S. Provisional Application No. 62/924,093, filed Oct. 21, 2019, titled "Binder Compositions for Additive Manufacturing Comprising Low Molecular Weight Polymers Including Acrylic Acid Repeat Units," each of which is hereby incorporated by reference in its entirety.

TECHNICAL FIELD

Methods of additive manufacturing, binder compositions for additive manufacturing, and articles produced by and/or associated with methods of additive manufacturing are generally described.

BACKGROUND

Additive manufacturing may be employed to form structures, such as three-dimensional structures. Some methods of additive manufacturing involve employing a binder composition to adhere together a metal powder. However, these methods of additive manufacturing typically suffer from a number of drawbacks. Examples of such drawbacks include undesirable chemical interactions between the binder composition and the metal powder, poor mechanical integrity of metal-based composite objects fabricated from the binder composition, limited shelf stability of the binder composition, and/or the binder composition having a chemical composition unsuitable for being deposited by a print head. Accordingly, improved methods of additive manufacturing, binder compositions for additive manufacturing, and articles produced by and/or associated with methods of additive manufacturing are needed.

SUMMARY

Methods of additive manufacturing, binder compositions for additive manufacturing, and articles produced by and/or associated with methods of additive manufacturing are generally described.

In some embodiments, a method of additive manufacturing a metal-based composite structure by binder jet printing is provided. The method comprises depositing a first layer of metal powder, depositing a binder composition on at least a portion of the first layer of metal powder, and drying and/or cross-linking at least the binder composition deposited on the first layer of the metal powder, thereby forming a metal-based composite structure. The binder composition comprises water and a low molecular weight polymer including an acrylic acid repeat unit. The binder composition has a pH of greater than or equal to 4.

In some embodiments, a method of additive manufacturing comprises depositing a first layer of metal powder, depositing a binder composition on at least a portion of the first layer of metal powder, drying and/or cross-linking at least the binder composition deposited on the first layer of the metal powder, and heating the metal-based composite structure in an environment having a temperature of greater than or equal to 700° C. and less than or equal to 1400° C. The binder composition comprises water and a low molecular weight polymer including an acrylic acid repeat unit. The binder composition has a pH of greater than or equal to 4. Drying and/or cross-linking at least the binder composition deposited on the first layer of the metal powder results in the formation of a metal-based composite structure.

In some embodiments, a binder composition for additive manufacturing of metal objects by binder jetting is provided. The binder composition comprises water, a low molecular weight polymer including an acrylic acid repeat unit, a cross-linking agent, and a pH modifier. The cross-linking agent comprises a polyol, a multifunctional amine, and/or a multifunctional thiol.

In some embodiments, a three-dimensional composition formed by additive manufacturing is provided. The three-dimensional composition comprises a metal powder and a binder composition. The binder composition comprises water, a low molecular weight polymer including an acrylic acid repeat unit, a cross-linking agent, and a pH modifier. The cross-linking agent comprises a polyol, a multifunctional amine, and/or a multifunctional thiol.

In some embodiments, a metal-based composite structure formed by additive manufacturing is provided. The metal-based composite structure comprises a metal powder and a binder. The wt % of the metal powder in the metal-based composite structure is between 92 wt % and 99.9 wt %. The binder comprises a low molecular weight polymer including an acrylic acid repeat unit.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1:
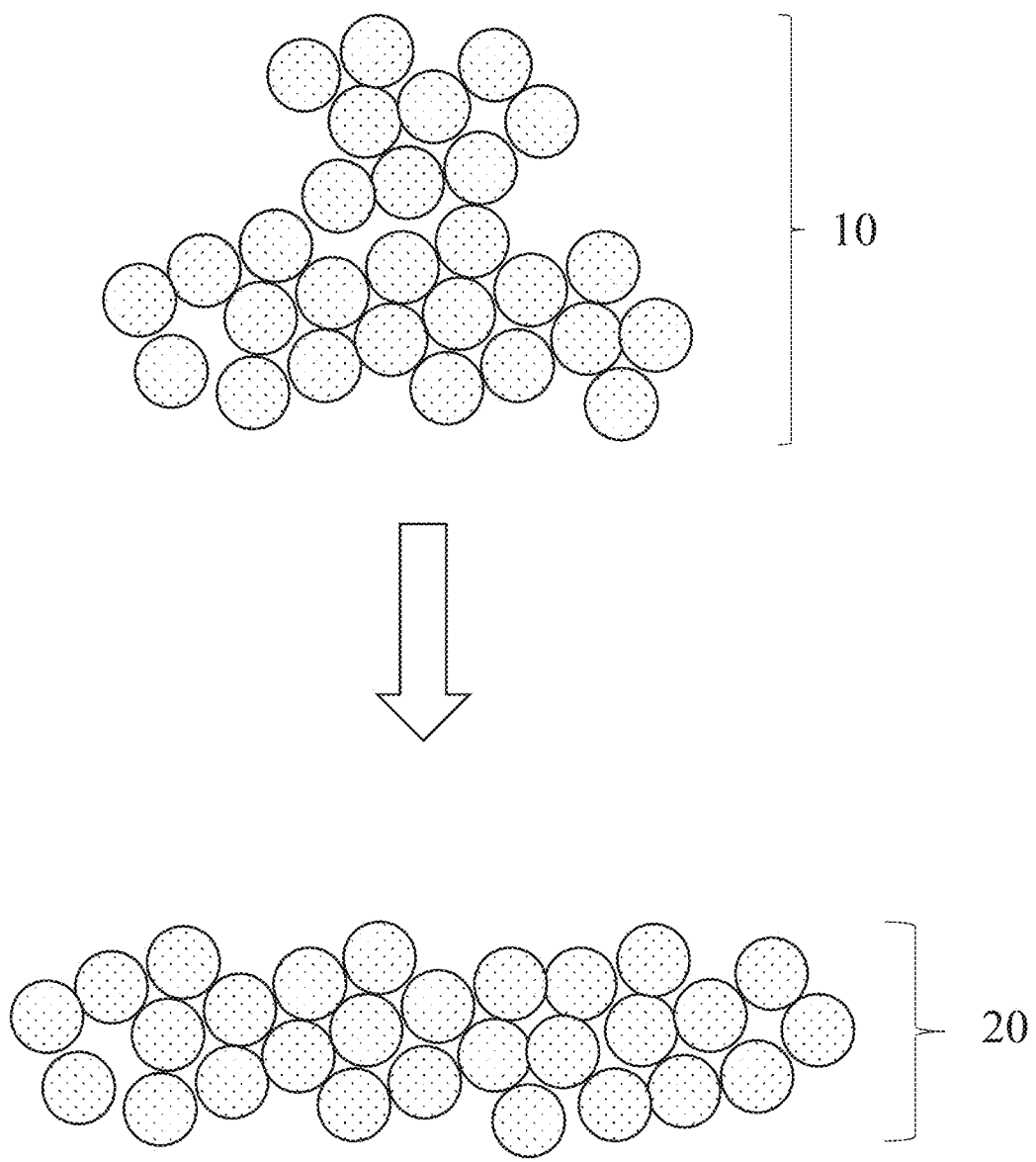
FIG. 1 shows a non-limiting embodiment of a method of depositing a layer of metal powder, in accordance with some embodiments.

Methods of additive manufacturing, binder compositions for additive manufacturing, and articles produced by and/or associated with methods of additive manufacturing are generally described. Some of the methods of additive manufacturing described herein employ a binder composition described herein having one or more advantageous features.

For instance, some binder compositions described herein have one or more advantages for use in combination with particular types of metal powders. By way of example, in some embodiments, a binder composition as a whole is configured to interact with a metal powder such that the metal powder undergoes minimal amounts of deleterious chemical reactions. For instance, a binder composition may have a pH that reduces corrosion of the relevant metal powder. In some embodiments, a binder includes relatively low amounts of (or lacks) species that are highly reactive with the metal powder and/or undesirably reactive with the metal powder. Binder compositions having this property may desirably allow for the formation of metal-based composite structures and/or metal objects in which the metal component(s) has a chemical composition close to (or identical to) its composition in powder form and/or in which the metal powder has a desirable chemical composition.

As a second example, in some embodiments, a binder composition as a whole is configured to interact with a layer of metal powder such that it penetrates the layer of metal powder and/or spreads within the layer of metal powder in a desirable manner. The binder composition may be configured to readily penetrate through the depth of the layer of metal powder, which may assist with adhering the layer of metal powder together and/or may reduce the amount of undesired pores in a metal-based composite structure formed therefrom prior to sintering. In some embodiments, a binder composition is configured to spread laterally to a relatively low extent within a layer of metal powder. As excessive spreading is believed to cause the formation of metal objects that are oversized and/or rough, this property may assist with the formation of metal objects having fine features and/or that are smooth.

In some embodiments, a binder composition described herein is configured to be compatible with one or more components of an additive manufacturing system. By way of example, in some embodiments, a binder composition as a whole is configured to interact with one or more components of the additive manufacturing system such that the component(s) of the additive manufacturing system undergo minimal amounts of deleterious chemical reactions. For instance, a binder composition may have a pH that is non-corrosive to the component(s) of the additive manufacturing system, such as non-corrosive to the print head of the additive manufacturing system (e.g., a print head comprising steel, such as a print head comprising a steel face plate). As another example, in some embodiments, a binder composition as a whole has is configured such that it can be printed by an additive manufacturing system in a desirable manner. For instance, the binder composition as a whole may be configured to allow for the formation of droplets of a desired size and/or uniformity by a print head of the additive manufacturing system. Such properties may allow for additive manufacturing system to be capable of facilely printing the binder composition in a manner that results in the formation of desirable metal-based composite structures without appreciable wear and tear of the on-demand printer.

In some embodiments, a binder composition described herein is configured to be stored for an appreciable amount of time without undergoing undesirable transformations. For instance, in some embodiments, a binder composition described herein has a composition that retards and/or prevents the growth of biological contaminants therein. As another example, a binder composition described herein may be provided in a container that is configured to resist degradation by the binder composition. These advantages may allow for some of the binder compositions described herein to be prepared well in advance of anticipated use and stored until needed.

It should be understood that some binder compositions described herein may have all of the above-described advantages, some binder compositions described herein may have a subset of the above-described advantages, and binder compositions described herein may have none of the above-described advantages. Similarly, some binder compositions described herein may have advantages not described above and/or may be desirable for use in a variety of applications for reasons not described above. Particular features of binder compositions that may promote one or more of the above-described advantages are described in further detail below.

Some embodiments relate methods of additive manufacturing, binder compositions for additive manufacturing, and/or articles formed by additive manufacturing (e.g., three-dimensional compositions, metal-based composite structures, metal objects). For instance, a binder composition having one or more of the advantageous properties described herein may be employed in a method of additive manufacturing described herein to form a three-dimensional composition, metal-based composite structure, and/or metal object described herein. An overview of steps that may be included in methods of additive manufacturing is provided below. It should be understood that some methods of additive manufacturing may comprise some of the steps described below but lack over the steps described below, that some methods of additive manufacturing may comprise all of the steps described below, that some methods of additive manufacturing may comprise none of the steps described below, and that some methods of additive manufacturing may comprise further steps not described below.

In some embodiments, a method of additive manufacturing comprises a step of depositing a layer of metal powder. This step may comprise dispersing a metal powder to form a layer thereof. The metal powder may initially not be in the form of layer (e.g., it may be in the form of a source of metal powder enclosed in a container, in the form of a pile, etc.). FIG. 1 shows one non-limiting embodiment of a method of depositing a layer of metal powder in which a metal powder 10 is deposited to form a layer of metal powder 20. In some embodiments, a metal powder is deposited to form the layer thereof by one or more tools, non-limiting examples of which include rollers, doctor blades, and sifters. Depositing a metal powder to form a layer thereof is typically performed such that the resultant layer of metal powder is formed on a substrate. Appropriate examples of substrates include bases on which the article formed by the additive manufacturing method is designed to be formed (e.g., platforms comprising metals and/or ceramics, sheets comprising metals and/or ceramics) and layers disposed on such bases (e.g., one or more layers of metal powder disposed on a base on which the article formed by the additive manufacturing method is designed to be formed, one or more layers formed in an additive manufacturing process, such as one or more of the layers formed by one or more of the processes described below). Layers disposed on such bases may include layer(s) configured to be incorporated into an article formed by additive manufacturing (e.g., in the case of layer(s) themselves formed by additive manufacturing and/or layer(s) not configured to be incorporated into an article formed by additive manufacturing (e.g., in the case of layer(s) of metal powder).

In some embodiments, the deposited metal powder comprises a precious metal. It should be understood that in the context of this disclosure, when a metal powder is said to comprise a precious metal, different configurations are possible. For example, the metal powder may comprise a mixture of different types of particles, some of which contain the precious metal, some of which do not. As a specific example, a metal powder comprising gold metal may comprise a mixture of gold metal-containing particles and non-gold-metal-containing particles (e.g., particles made entirely of zinc metal). The particles containing the precious metal may be formed entirely of the precious metal in some instances, while in other instances the particles containing the precious metal may comprises a mixture (e.g., alloy) or composite of the precious metal and one or more other components such as other metals (e.g., gold alloyed with zinc). In some embodiments, the precious-metal containing particles of a metal powder each comprises the precious metal in an amount of greater than or equal to 10 wt %, greater than or equal to 25 wt %, greater than or equal to 50 wt %, greater than or equal to 75 wt %, greater than or equal to 90 wt %, and/or up to 92.5 wt %, up to 95 wt %, up to 98 wt %, up to 99 wt %, up to 99.9 wt %, or 100 wt % (understanding that the precious-metal particles may not necessarily each contain the same amount of the precious metal). In some embodiments, a metal powder comprising a precious metal comprises particles, each of which comprises the precious metal. As described above, in such embodiments, these precious metal-containing particles may each be made entirely of the precious metal, or some or all of the precious metal-containing particles may contain a mixture (e.g., alloy) or composite of the precious metal and one or more other components (the particles each having the same amount of precious metal in some instances, and the particles having differing amounts of the precious metal in other instances).

Certain method steps and/or binder compositions described herein may help overcome challenges associated with additive manufacturing with precious metal using existing techniques and binders, such as poor adhesion between certain binder components and the metal. Referring again to FIG. 1, metal powder 10, which is deposited to form a layer of metal powder 20, is or comprises a precious metal powder (e.g., a powder comprising one or more precious metals), according to some embodiments. As used herein, "precious metals" may refer at least to ruthenium (Ru), rhodium (Rh), palladium (Pd), silver (Ag), osmium (Os), iridium (Ir), platinum (Pt), gold (Au), or combinations thereof. In certain instances in which the metal powder comprises a precious metal powder, the precious metal powder comprises silver metal and/or a silver alloy. In an exemplary embodiment, the precious metal powder comprises sterling silver. Sterling silver generally refers to a silver alloy having a silver content of greater than or equal to 92.5 weight percent (wt %). Sterling silver may contain silver alloyed with copper (e.g., at 7.5 wt %) to improve properties such as hardness and strength, though in some cases other elements such as germanium (Ge) are used). In some embodiments, the precious metal powder comprises platinum and/or a platinum alloy (e.g., platinum alloyed with cobalt (Co), ruthenium, and/or iridium). In some instances, the precious metal powder comprises gold metal and/or a gold alloy (e.g., gold alloyed with zinc (Zn), copper, silver, nickel (Ni), iron (Fe), cadmium (Cd), aluminum (Al), and/or palladium (Pd)). In some instances, the precious metal powder comprises platinum metal and/or a platinum alloy (e.g., platinum alloyed with iridium, ruthenium, palladium, cobalt, and/or copper (Cu)). The metal powder may have only a single precious metal present, though in some embodiments the metal powder comprises two or more precious metals. As one non-limiting example, the metal powder may comprise a mixture of silver metal powder and gold metal powder. In some embodiments in which the metal powder comprises a metal alloy (e.g., a precious metal alloy such as sterling silver), the metal powder comprises a plurality of particles of the metal alloy (e.g., a plurality of sterling silver particles).

The metal powder may have a relatively high content of the precious metal and/or precious metal alloy, by weight. Having a relatively high content of precious metal, and/or precious metal alloy in the metal powder may result in the manufacture of a metal-based composite structure and/or a completed metal object having a relatively high precious metal content during or following the additive manufacturing process. In some embodiments, the precious metal (e.g., gold, silver, platinum) or precious metal alloy (e.g., rose gold, sterling silver) is present in the metal powder in an amount of greater than or equal to 25 wt %, greater than or equal to 30 wt %, greater than or equal to 40 wt %, greater than or equal to 50 wt %, greater than or equal to 60 wt %, greater than or equal to 65 wt %, greater than or equal to greater than or equal to 70 wt %, greater than or equal 75 wt %, greater than or equal to 80 wt %, greater than or equal to 85 wt %, greater than or equal to 90 wt %, greater than or equal to 91 wt %, greater than or equal to 92 wt %, greater than or equal to 92.5 wt %, greater than or equal to 93 wt %, greater than or equal to 93.5 wt %, greater than or equal to 94%, greater than or equal to 94.5 wt %, greater than or equal to 95 wt %, greater than or equal to 95.5 wt %, greater than or equal to 96 wt %, greater than or equal to 96.5 wt %, greater than or equal to 97 wt %, greater than or equal to 97.5 wt %, greater than or equal to 98 wt %, greater than or equal to 98.5 wt %, greater than or equal to 99 wt %, greater than or equal to 99.5 wt %, greater than or equal to 99.7 wt %, greater than or equal to 99.8 wt %, or greater than or equal to 99.9 wt %. The precious metal (e.g., gold, silver, platinum), precious metal alloy (e.g., rose gold, sterling silver) may be present in the metal powder in amount of less than or equal to substantially 100 wt %, less than or equal to 99.9 wt %, less than or equal to 99.8 wt %, less than or equal to 99.7 wt %, less than or equal to 99.5 wt %, less than or equal to 99 wt %, less than or equal to 98.5 wt %, less than or equal to 98 wt %, less than or equal to 97.5 wt %, less than or equal to 97 wt %, less than or equal to 96.5 wt %, less than or equal to 96 wt %, less than or equal to 95.5 wt %, less than or equal to 96 wt %, less than or equal to 95.5 wt %, less than or equal to 95 wt %, less than or equal to 94.5 wt %, less than or equal to 94 wt %, less than or equal to 93.5 wt %, less than or equal to 93 wt %, less than or equal to 92.5 wt %, less than or equal to 92 wt %, less than or equal to 91 wt %, less than or equal to 90 wt %, less than or equal to 85 wt %, less than or equal to 80 wt %, less than or equal to 75 wt %, less than or equal to 70 wt %, less than or equal to 65 wt %, less than or equal to 60 wt %, less than or equal to 50 wt %, less than or equal to 40 wt %, or less. Combinations of these ranges are possible (e.g., greater than or equal to 25 wt % and less than or equal to substantially 100 wt %, greater than or equal to 25 wt % and less than or equal to 99.9 wt %, or greater than or equal to 92.5 wt % and less than or equal to 99.9 wt %). Other ranges are possible.

For example, in some embodiments, the metal powder comprises gold metal and/or a gold alloy in certain of the ranges described above. In some embodiments, gold is present in the metal powder in an amount of greater than or equal to 25 wt %, greater than or equal to greater than or equal to 30 wt %, greater than or equal to 40 wt %, greater than or equal to 50 wt %, greater than or equal to 60 wt %, greater than or equal to 65 wt %, greater than or equal to greater than or equal to 70 wt %, greater than or equal 75 wt %, greater than or equal to 80 wt %, greater than or equal to 85 wt %, greater than or equal to 90 wt %, greater than or equal to 91 wt %, greater than or equal to 92 wt %, greater than or equal to 92.5 wt %, greater than or equal to 93 wt %, greater than or equal to 93.5 wt %, greater than or equal to 94%, greater than or equal to 94.5 wt %, greater than or equal to 95 wt %, greater than or equal to 95.5 wt %, greater than or equal to 96 wt %, greater than or equal to 96.5 wt %, greater than or equal to 97 wt %, greater than or equal to 97.5 wt %, greater than or equal to 98 wt %, greater than or equal to 98.5 wt %, greater than or equal to 99 wt %, greater than or equal to 99.5 wt %, greater than or equal to 99.7 wt %, greater than or equal to 99.8 wt %, or greater than or equal to 99.9 wt %. Gold metal may be present in the metal powder in amount of less than or equal to substantially 100 wt %, less than or equal to 99.9 wt %, less than or equal to 99.8 wt %, less than or equal to 99.7 wt %, less than or equal to 99.5 wt %, less than or equal to 99 wt %, less than or equal to 98.5 wt %, less than or equal to 98 wt %, less than or equal to 97.5 wt %, less than or equal to 97 wt %, less than or equal to 96.5 wt %, less than or equal to 96 wt %, less than or equal to 95.5 wt %, less than or equal to 96 wt %, less than or equal to 95.5 wt %, less than or equal to 95 wt %, less than or equal to 94.5 wt %, less than or equal to 94 wt %, less than or equal to 93.5 wt %, less than or equal to 93 wt %, less than or equal to 92.5 wt %, less than or equal to 92 wt %, less than or equal to 91 wt %, less than or equal to 90 wt %, less than or equal to 85 wt %, less than or equal to 80 wt %, less than or equal to 75 wt %, less than or equal to 70 wt %, less than or equal to 65 wt %, less than or equal to 60 wt %, less than or equal to 50 wt %, less than or equal to 40 wt %, or less. Combinations of these ranges are possible (e.g., greater than or equal to 25 wt % and less than or equal to substantially 100 wt %, greater than or equal to 25 wt % and less than or equal to 99.9 wt %, or greater than or equal to 92.5 wt % and less than or equal to 99.9 wt %). Other ranges are possible. It should be understood that the amount of gold metal in a material may also be expressed in terms of karat. An alloy having gold present in an amount of 100 wt % (pure gold) has 24 karats. Therefore, an alloy having gold present in an amount of 75 wt % has 18 karat, an alloy having gold present in an amount of 50 wt % has 12 karats, and so forth. In some embodiments, the metal powder is a gold alloy powder having greater than or equal to 6 karats, greater than or equal to 8 karats, greater than or equal to 12 karats, greater than or equal to 14 karats, greater than or equal to 16 karats, greater than or equal to 18 karats, greater than or equal to 20 karats, greater than or equal to 22 karats, greater than or equal to 23 karats, or more. In some embodiments, the metal powder is a gold alloy powder having less than or equal to 24 karats, less than or equal to 23 karats, less than or equal to 22 karats, less than or equal to 21 karats, less than or equal to 20 karats, less than or equal to 18 karats, less than or equal to 16 karats, less than or equal to 14 karats, less than or equal to 12 karats, less than or equal to 10 karats, less than or equal to 8 karats, or less. Combinations (e.g., greater than or equal to 6 karats and less than or equal to 24 karats) are possible. Other ranges are also possible. Various gold alloys are possible. Non-limiting examples of gold alloys include yellow gold (e.g., 75 wt % gold, 16 wt % silver, 9 wt % copper) and rose gold (e.g., 75 wt % gold, 6 wt % silver, 19 wt % copper).

In some embodiments, the metal powder comprises silver metal and/or a silver alloy in certain of the ranges described above. In some embodiments, silver is present in the metal powder in an amount of greater than or equal to 90 wt %, greater than or equal to 91 wt %, greater than or equal to 92 wt %, greater than or equal to 92.5 wt %, greater than or equal to 93 wt %, greater than or equal to 93.5 wt %, greater than or equal to 94%, greater than or equal to 94.5 wt %, greater than or equal to 95 wt %, greater than or equal to 95.5 wt %, greater than or equal to 96 wt %, greater than or equal to 96.5 wt %, greater than or equal to 97 wt %, greater than or equal to 97.5 wt %, greater than or equal to 98 wt %, greater than or equal to 98.5 wt %, greater than or equal to 99 wt %, greater than or equal to 99.5 wt %, greater than or equal to 99.7 wt %, greater than or equal to 99.8 wt %, or greater than or equal to 99.9 wt %. In some embodiments, silver is present in the metal powder in an amount of less than or equal to substantially 100 wt %, less than or equal to 99.9 wt %, less than or equal to 99.8 wt %, less than or equal to 99.7 wt %, less than or equal to 99.5 wt %, less than or equal to 99 wt %, less than or equal to 98.5 wt %, less than or equal to 98 wt %, less than or equal to 97.5 wt %, less than or equal to 97 wt %, less than or equal to 96.5 wt %, less than or equal to 96 wt %, less than or equal to 95.5 wt %, less than or equal to 96 wt %, less than or equal to 95.5 wt %, less than or equal to 95 wt %, less than or equal to 94.5 wt %, less than or equal to 94 wt %, less than or equal to 93.5 wt %, less than or equal to 93 wt %, less than or equal to 92.5 wt %, less than or equal to 92 wt %, less than or equal to 91 wt %, or less. Combinations (e.g., greater than or equal to 90 wt % and less than or equal to 100 wt %, or greater than or equal to 92.5 wt % and less than or equal to 100 wt %) are possible. Other ranges for the amount of silver in the metal powder are also possible. Various silver alloys are possible. Non-limiting examples of silver alloys include sterling silver and argentium silver (e.g., 93.5 wt % or 96 wt % silver alloyed with other metals or metalloids, such as germanium).

In some embodiments, the metal powder comprises platinum metal and/or a platinum alloy in certain of the ranges described above. In some embodiments, platinum is present in the metal powder in an amount of greater than or equal to 90 wt %, greater than or equal to 91 wt %, greater than or equal to 92 wt %, greater than or equal to 92.5 wt %, greater than or equal to 93 wt %, greater than or equal to 93.5 wt %, greater than or equal to 94%, greater than or equal to 94.5 wt %, greater than or equal to 95 wt %, greater than or equal to 95.5 wt %, greater than or equal to 96 wt %, greater than or equal to 96.5 wt %, greater than or equal to 97 wt %, greater than or equal to 97.5 wt %, greater than or equal to 98 wt %, greater than or equal to 98.5 wt %, greater than or equal to 99 wt %, greater than or equal to 99.5 wt %, greater than or equal to 99.7 wt %, greater than or equal to 99.8 wt %, or greater than or equal to 99.9 wt %. In some embodiments, platinum is present in the metal powder in an amount of less than or equal to substantially 100 wt %, less than or equal to 99.9 wt %, less than or equal to 99.8 wt %, less than or equal to 99.7 wt %, less than or equal to 99.5 wt %, less than or equal to 99 wt %, less than or equal to 98.5 wt %, less than or equal to 98 wt %, less than or equal to 97.5 wt %, less than or equal to 97 wt %, less than or equal to 96.5 wt %, less than or equal to 96 wt %, less than or equal to 95.5 wt %, less than or equal to 96 wt %, less than or equal to 95.5 wt %, less than or equal to 95 wt %, less than or equal to 94.5 wt %, less than or equal to 94 wt %, less than or equal to 93.5 wt %, less than or equal to 93 wt %, less than or equal to 92.5 wt %, less than or equal to 92 wt %, less than or equal to 91 wt %, or less. Combinations (e.g., greater than or equal to 90 wt % and less than or equal to 100 wt %, or greater than or equal to 92.5 wt % and less than or equal to 100 wt %) are possible. Other ranges for the amount of platinum in the metal powder are also possible. Various platinum alloys are possible. For example the metal powder may comprise an alloy of platinum and iridium (e.g., Pt950/Ir containing 95 wt % Pt and 5 wt % Jr, Pt900/Ir containing 90 wt % Pt and 10 wt % Jr, or Pt850/Ir containing 85 wt % Pt and 15 wt % Jr). As another example, the metal powder may comprise an alloy of platinum and ruthenium (e.g., Pt950/Ru containing 95 wt % Pt and 5 wt % Ru). As yet another example, the metal powder may comprise an alloy of platinum and palladium (e.g., Pt950/Pd containing 95 wt % Pt and 5 wt % Pd). As yet another example, the metal powder may comprise an alloy of platinum and cobalt (e.g., Pt950/Co containing 95 wt % Pt and 5 wt % Co). As yet another example, the metal powder may comprise an alloy of platinum and copper (e.g., Pt960/Cu containing 96 wt % Pt and 4 wt % Cu). In some embodiments, the metal powder comprises an alloy of platinum, cobalt, and palladium (e.g., Pt850/Co50/Pd100 containing 85 wt % Pt, 5 wt % Co, and 10 wt % Pd).

Figure 2A:
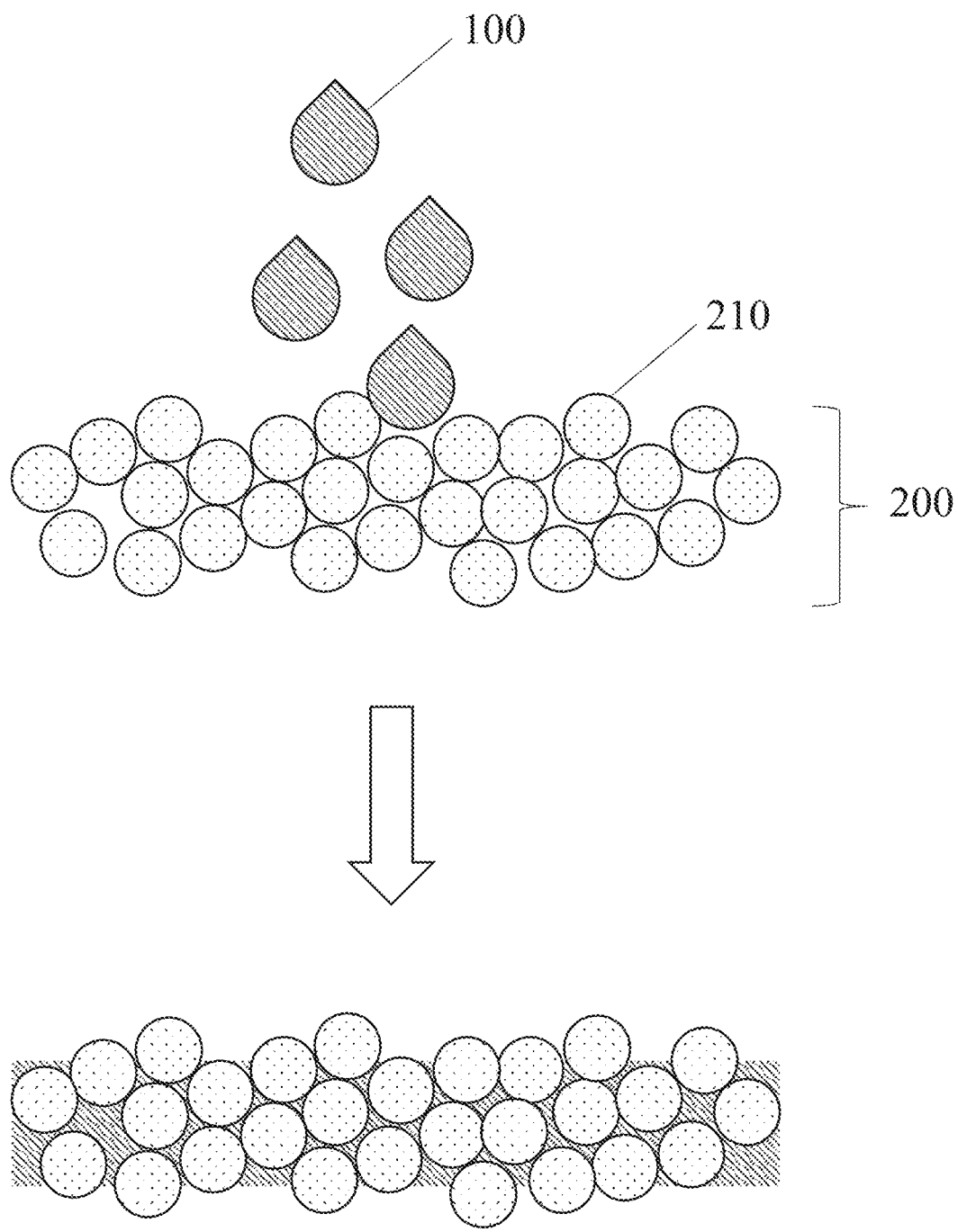
FIG. 2A shows a non-limiting embodiment of a method of depositing a binder composition onto at least a portion of a layer of metal powder, in accordance with some embodiments.

Once a layer of metal powder is obtained, a method of additive manufacturing may comprise depositing a binder composition onto at least a portion of the layer of metal powder. FIG. 2A shows one example of this method step, as it depicts the deposition of a binder composition 100 on a layer 200 of metal powder. The metal powder comprises a plurality 210 of metal particles. In some embodiments, like the embodiment shown in FIG. 2A, the binder composition may be deposited on the metal powder in the form of droplets, such as in the form of a plurality of droplets formed by a print head. By way of example, a method of additive manufacturing described herein may comprise performing a binder jet printing process.

An additive manufacturing method may comprise performing the steps shown in FIGS. 1 and 2A multiple times successively. For instance, a method of additive manufacturing may comprise depositing a first layer of metal powder, then depositing a binder composition on at least a portion of the first layer of metal powder, and then depositing a second layer of metal powder on the first layer of metal powder. As another example, a method of additive manufacturing may comprise depositing a binder composition on at least a portion of a first layer of metal powder, then depositing a second layer of metal powder on the first layer of metal powder, and then depositing a binder composition on at least a portion of the second layer of metal powder. It can be seen that some methods of additive manufacturing may comprise performing these two steps in an alternating manner at least twice, at least three times, at least four times, at least five times, at least ten times, at least a hundred times, or a number of times sufficient to build up a metal-based composite structure.

Methods comprising performing successive steps of depositing a layer of metal powder and depositing a binder composition onto at least a portion of the layer of metal powder may be performed in a variety of manners. By way of example, FIG. 2B shows a method step of depositing a second powder layer 252 on the first powder layer onto which a binder composition had been deposited.

In some embodiments, the sequential steps of depositing a layer of metal powder and depositing a binder composition thereon may be performed in a manner in which the binder deposited on at least a portion of a first layer of metal powder is not dried or cross-linked prior to depositing a second layer of metal powder on the first layer of metal powder (e.g., the second layer of metal powder is deposited on the first layer of metal powder prior to drying or cross-linking the binder composition). The article formed by such successive steps may be referred to elsewhere herein as a "three-dimensional composition". In some embodiments, the sequential steps of depositing a layer of metal powder and depositing a binder composition thereon may be performed in a manner in which the binder deposited on at least a portion of a first layer of metal powder is dried and/or cross-linked prior to depositing a second layer of metal powder on the first layer of metal powder.

It should be noted that some embodiments may comprise both of the above-referenced sequences of steps. For instance, the steps of sequentially depositing a layer of metal powder and then depositing a binder composition onto at least a portion of the layer of metal powder may be repeated a number of times without performing any drying or heating process on the binder composition (e.g., one or more layers of metal powder may be deposited prior to cross-linking or drying the binder composition previously deposited, binder composition may be deposited onto at least a portion of a layer of metal powder deposited prior to the cross-linking or drying of the binder composition previously deposited). These steps may result in the formation of a three-dimensional composition. Then, the binder composition may be dried and/or cross-linked to form a metal-based composite structure from the three-dimensional composition. After which, further steps of sequentially depositing a layer of metal powder and then depositing a binder composition onto at least a portion of the layer of metal powder may be performed thereon. The second three-dimensional composition may also be dried and/or cross-linked. This drying and/or cross-linking may result in the formation of a new metal-based composite structure comprising the prior metal-based composite structure and the dried and/or cross-linked three-dimensional composition formed thereon.

Figure 2B:
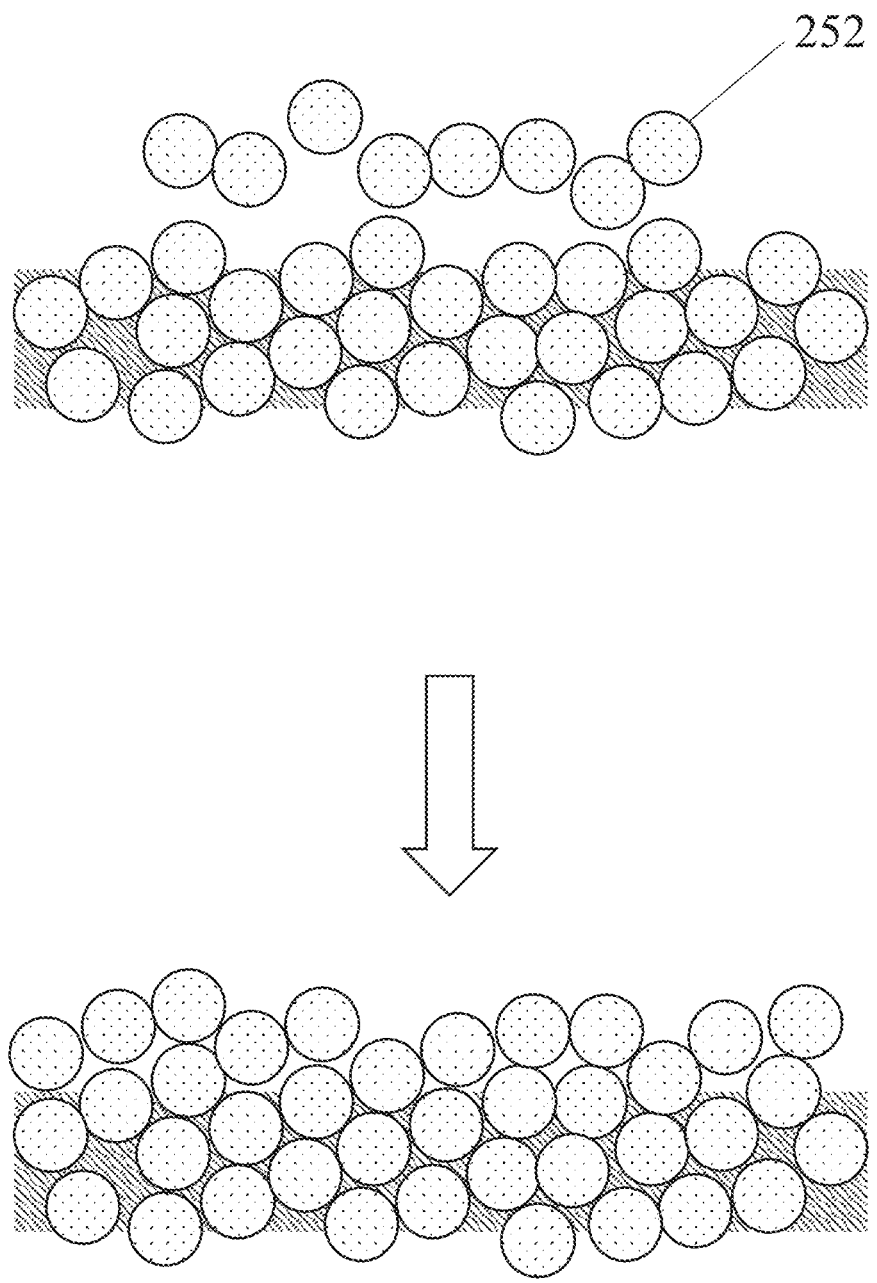
FIG. 2B shows a non-limiting embodiment of a method step of depositing a second powder layer on a first powder layer onto which a binder composition had been deposited, in accordance with some embodiments.
Figure 2C:
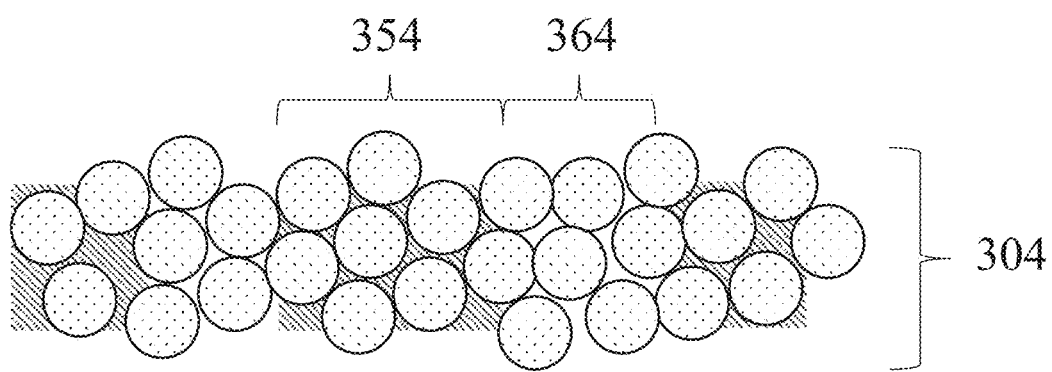
FIG. 2C shows a non-limiting embodiment of a layer onto which a binder composition has been deposited, in accordance with some embodiments.

In some embodiments, a step of depositing a binder composition on at least a portion of a layer of metal powder like that shown in FIG. 2A or FIG. 2B comprises depositing a binder composition on a layer of metal powder such that it contacts some portions of the layer of metal powder and does not contact other portions of the layer of metal powder. The binder composition may penetrate into and/or spread into portions of the layer of metal powder that it contacts and may not penetrate or spread into portions of the layer of metal powder that it does not contact. This process may result in the formation of a layer having a morphology like that shown in FIG. 2C. In FIG. 2C, a layer 304 comprises a portion 354 comprising both a binder composition and a portion of the layer of metal powder and a portion 364 comprising a portion of the layer of metal powder but lacking the binder composition. The portions of the layer of metal powder through which the binder composition has penetrated and/or spread may be adhered together by one or more components of the binder composition (e.g., a polymer) upon deposition thereof and/or during later processing steps. The portions of the layer of metal powder through which the binder composition has not penetrated or spread may remain unadhered to each other.

During formation of a three-dimensional composition, deposition of a binder composition on a layer or metal powder may also comprise depositing a portion of the binder composition onto layer positioned therebeneath. Advantageously, this may adhere together layers in the three-dimensional composition with the layers to which they are directly adjacent, which may result in the formation of a three-dimensional object, metal-based composite structure, or combination of metal-based composite structures adhered together in all three dimensions and/or having a continuous morphology.

As described above, some methods of additive manufacturing comprise forming a metal-based composite structure (e.g., from a layer comprising a binder composition, from a three-dimensional composition) (e.g., in a process comprising drying and/or cross-linking a binder composition). As also described above, the binder composition may be a binder composition present in a three-dimensional composition and/or may be a binder composition present in a layer disposed on a metal-based composite structure.

Drying the binder composition may comprise exposing the binder composition to a stimulus that causes one or more volatile components therein to evaporate (e.g., free water, organic solvents, volatile pH modifiers). Other, non-volatile and/or less volatile components of the binder composition may not be removed by a drying process (e.g., bound water, a polymer, a cross-linking agent).

Cross-linking the binder composition may comprise exposing the binder composition to a stimulus that causes one or more portions thereof to undergo a cross-linking reaction (e.g., a polymer, a cross-linking agent). Non-limiting examples of suitable stimuli include heat and light (e.g., microwave radiation, UV light), wherein heat transfer may include any combination of conduction, convection and/or radiation. Convective heat transfer may include, but is not limited to, forced convection through the powder bed. Heat and/or light stimuli may be suitable both for drying the binder composition and cross-linking the binder composition; other such stimuli may only be suitable for one or the other. In some embodiments, a binder composition may be dried and then cross-linked. The drying step may comprise removing one or more components that would interfere with the cross-linking step. For instance, a drying step may comprise removing water (e.g., water that causes the equilibrium of the cross-linking reaction to favor breaking cross-links instead of forming cross-links) and/or may comprise removing a pH modifier (e.g., a pH modifier that would interfere with the cross-linking reaction).

Figure 3:
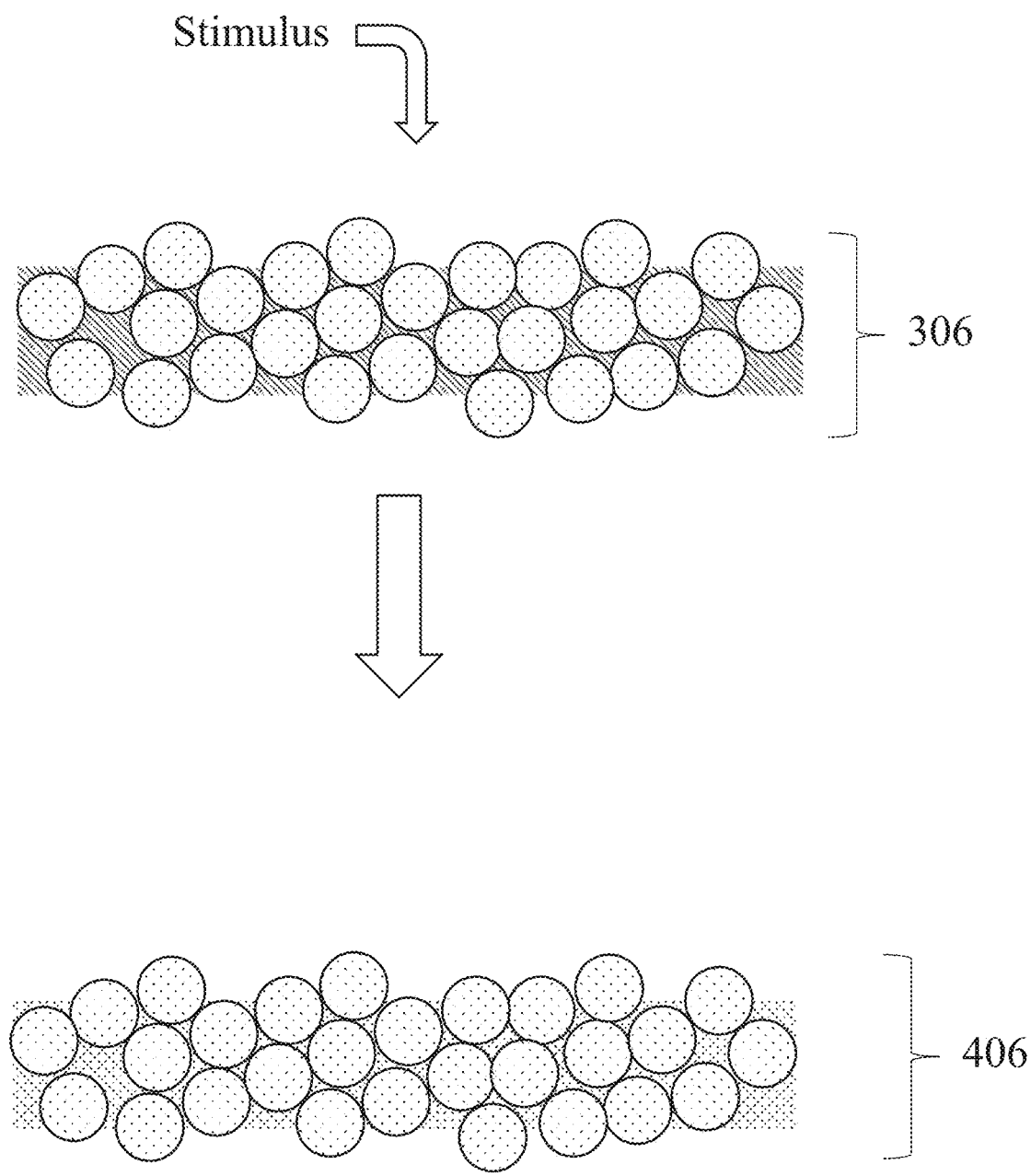
FIG. 3 shows one non-limiting embodiment of a method of drying and/or cross-linking a binder composition, in accordance with some embodiments.

FIG. 3 shows one example of a step of drying and/or cross-linking a binder composition, in which a stimulus is applied to a layer 306 to form a metal-based composite structure 406. In some embodiments, a method like that shown in FIG. 3 is performed on a single layer comprising a layer of metal particles and a binder (and/or a layer of metal particles on which a binder is disposed). In some embodiments, a method like that shown in FIG. 3 is performed on a series of such layers disposed on each other in a three-dimensional composition simultaneously.

In some embodiments, a metal-based composite structure may undergo one or more further steps. By way of example, portion(s) of a layer of metal powder (and/or layers of metal powder forming a metal powder bed) onto which the binder has been deposited may be incorporated into the metal-based composite structure while other portion(s) (e.g., portions onto which the binder composition was not deposited) may not be incorporated into the metal-based composite structure. One or more portion(s) of the layer(s) of metal powder and/or metal powder bed not incorporated into the metal-based composite structure may be removed therefrom. This may be accomplished by, for example, removing the metal-based composite structure from a powder bed.

Figure 4:
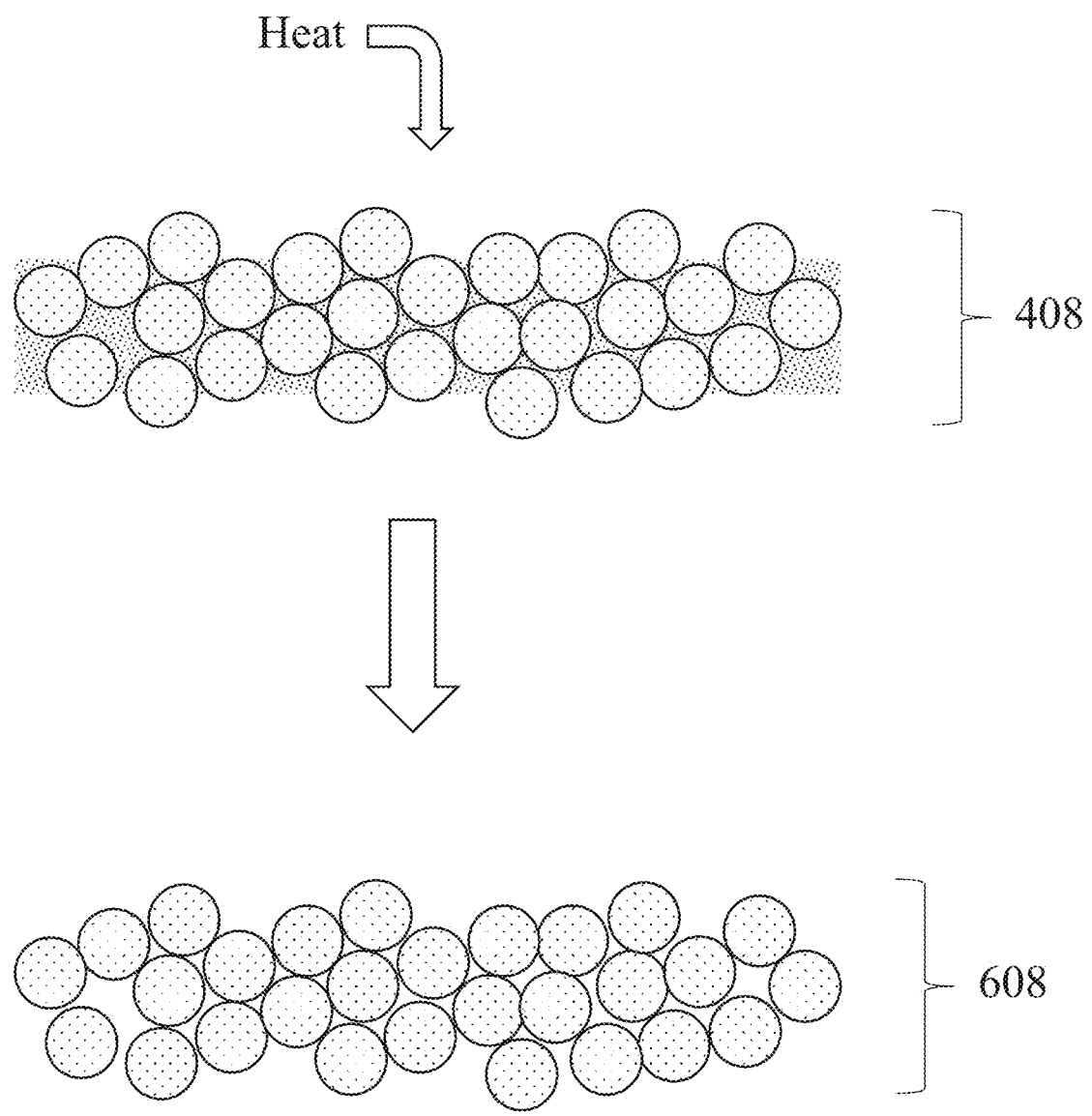
FIG. 4 shows one non-limiting embodiment of a method of heating a metal-based composite structure, in accordance with some embodiments.

As another example, a metal-based composite structure may be heated. The heating may comprise positioning the metal-based composite structure in an environment at a temperature that results in the removal of one or more components of the binder composition previously retained in the composite structure. For instance, the heating may remove a polymer from the binder composition retained in the composite structure and/or one or more other components of the binder composition not removed from the composite structure by prior drying and/or cross-linking steps. In some embodiments, heating the composite structure may cause thermal decomposition of these components of the binder composition that are then volatilized or retained as solids (e.g., as char) positioned within the resultant structure. The resultant structure may also be referred to herein as a "de-bound metal structure". FIG. 4 shows one example of a heating step, in which heat is applied to a metal-based composite structure 408 to form a de-bound metal structure 608. During a heating step, the particles present in the metal-based composite structure may adhere together directly as the portion(s) of the binder composition are being removed.

Figure 5:
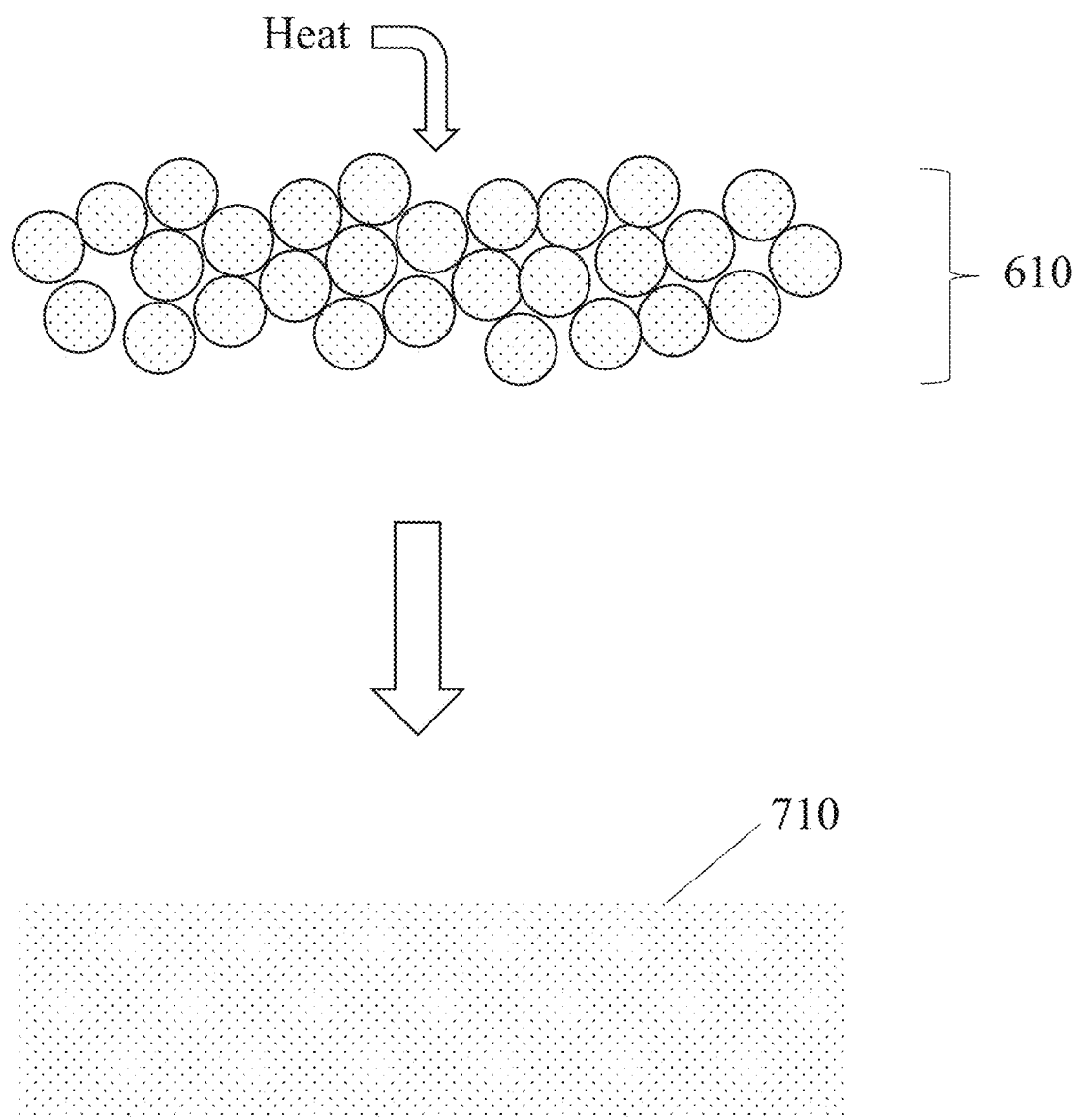
FIG. 5 shows one non-limiting embodiment of a method of heating a de-bound metal structure, in accordance with some embodiments.

In some embodiments, a metal-based composite structure and/or a de-bound metal structure undergoes a heating step to form a metal object. This heating step may comprise heating an environment in which the metal-based composite structure and/or de-bound metal structure is positioned to a temperature that allows for diffusion of metal components within the metal-based composite structure and/or de-bound metal structure but that does not melt the metal-based composite structure and/or de-bound metal structure to an undesirable extent. For example, this heating step may comprise heating the environment to a temperature that promotes sintering of the metal-based composite structure and/or de-bound metal structure. Advantageously, diffusion that occurs during sintering may further bond together the resultant metal object and/or may reduce (and/or eliminate) any porosity present in the metal-based composite structure and/or de-bound metal structure. This diffusion may also cause the metal-based composite structure and/or de-bound metal structure to densify, which may enhance its surface finish, mechanical properties, and/or electrical conductivity. FIG. 5 shows one example of a step of heating a de-bound metal structure, in which heat is applied to a de-bound metal structure 610 to form a metal object 710.

Figure 6A:
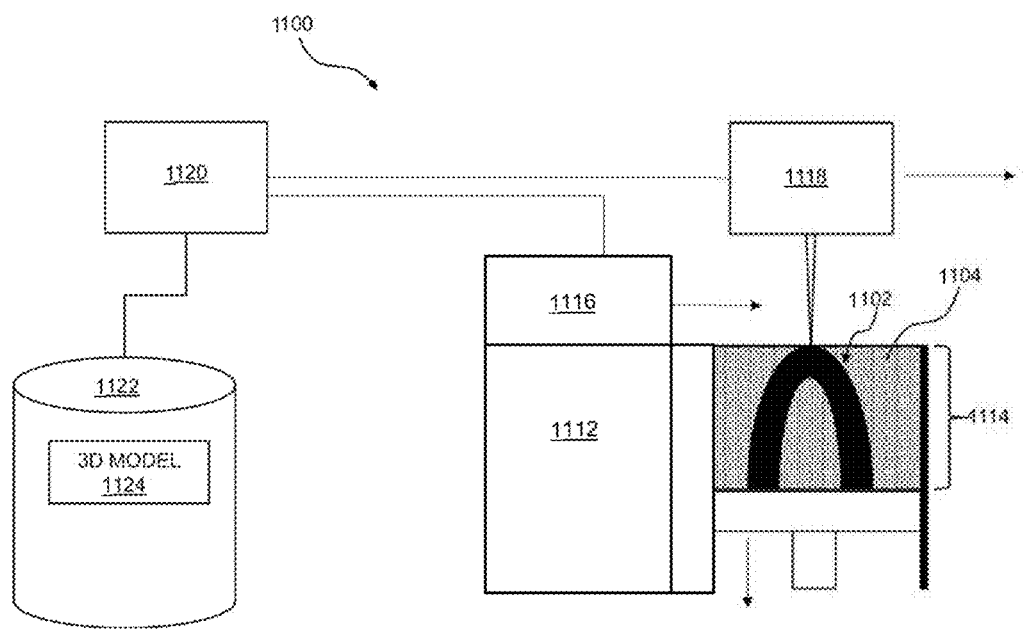
FIGS. 6A-6B show two similar versions of an exemplary additive manufacturing system, in accordance with some embodiments.
Figure 6B:
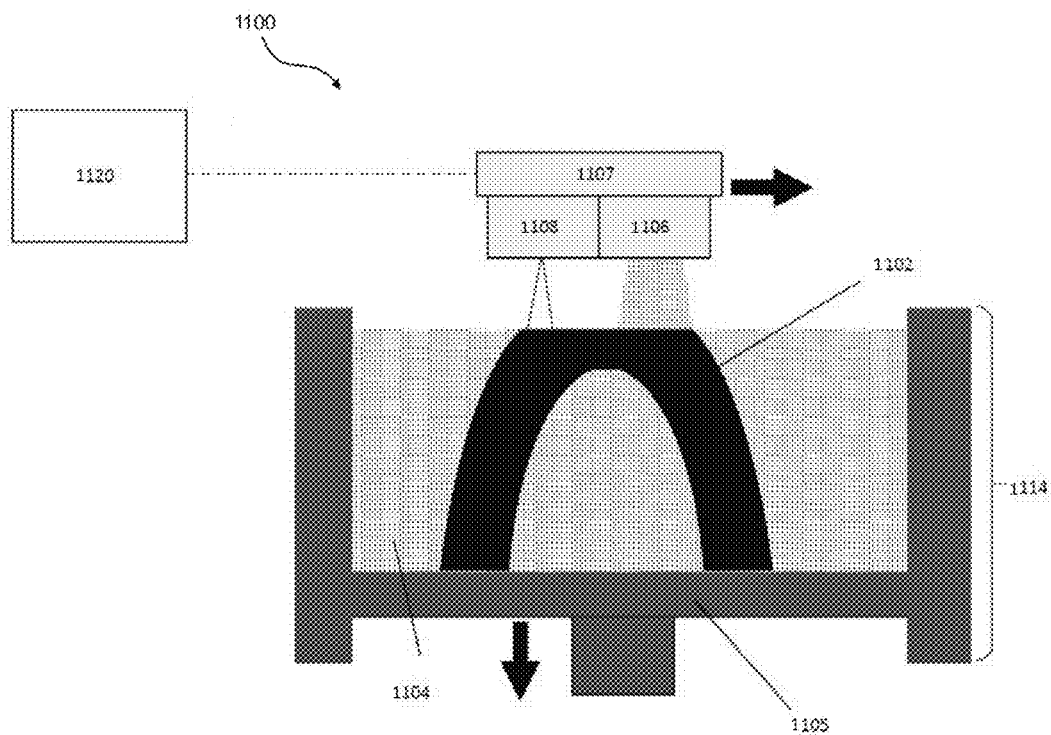

In some embodiments, one or more of the method steps described above may be performed in an additive manufacturing system. FIGS. 6A and 6B show two similar versions of an exemplary additive manufacturing system 1100. The various components of this additive manufacturing system and its operation are described below.

The additive manufacturing system 1100 shown in FIGS. 6A and 6B may be used to form an article 1102 from a metal powder 1104. The article 1102 may be a three-dimensional composition as described elsewhere herein. For instance, it may comprise a binder composition and a metal powder comprising a plurality of metal particles (e.g., as shown in FIGS. 2A-2C). As also described elsewhere herein, the three-dimensional composition 1102 can undergo subsequent steps to form a metal object. While the additive manufacturing system shown in FIGS. 6A and 6B is suitable for performing a binder jetting process to form a three-dimensional composition (e.g., by selectively joining portions of layers of metal powder with a binder composition in a sequential manner), it should be understood that the current disclosure is not limited to any particular type of additive manufacturing process or powder process (e.g., any particular type of powder metallurgical process) involving a binder. For example, other suitable processes that may be employed to form a three-dimensional composition to form a three-dimensional composition include, but are not limited to injection molding processes and powder fusion processes (e.g., selective laser melting processes).

The additive manufacturing system 1100 shown in FIGS. 6A and 6B can include a powder deposition mechanism 1106 (e.g., shown in FIG. 6B) and a print head (e.g., shown as print head 1118 in FIG. 6A and print head 1108 in FIG. 6B), which may be coupled to and moved across the print area by a unit 1107 (e.g., as shown in FIG. 6B). The powder deposition mechanism 1106 may be operated to deposit a layer of metal powder by depositing powder 1104 onto the powder bed 1114.

In some embodiments, a powder deposition mechanism comprises a metal powder supply 1112, a metal powder bed 1114, and a spreader 1116 (e.g., as shown in FIG. 6A). When present, the spreader 1116 can be movable from the metal powder supply 1112 to the metal powder bed 1114 and along the metal powder bed 1114 to deposit a metal powder onto the metal powder bed 1114 and to deposit successive layers of the metal powder across the metal powder bed 1114. As discussed in more detail below, the additive manufacturing apparatus 1100 and/or the spreader 1116 therein may be configured to deposit layers of metal powder on the powder bed having any suitable geometry (e.g., layers of metal powder having a homogeneous, planar geometry; layers of metal powder having a morphology other than a homogeneous, planar geometry). Depending on the particular embodiment, the spreader 1116 may include, for example, a roller rotatable about an axis perpendicular to an axis of movement of the spreader 1116 across the powder bed 1114. The roller can be, for example, substantially cylindrical. In use, rotation of the roller about the axis perpendicular to the axis of movement of the spreader 1116 can deposit the metal powder from the metal powder supply 1112 to the metal powder bed 1114 and form a layer of the metal powder along the metal powder bed 1114. It should be appreciated, therefore, that a plurality of sequential layers of the material 1104 can be formed in the metal powder bed 1114 through repeated movement of the spreader 1116 across the metal powder bed 1114.

The print head 1108 (in FIG. 6B) and/or 1118 (in FIG. 6A) can be movable (e.g., in coordination with movement of the spreader 1116) across the metal powder bed 1114 and/or can be stationary (e.g., in embodiments in which the platform 1105 is movable). In some embodiments, the print head 1108 and/or 1118 includes one or more orifices through which a liquid (e.g., a binder composition) can be delivered from the print head 1118 to each layer of the metal powder along the metal powder bed 1114. In certain embodiments, the print head 1108 and/or 1118 can include one or more piezoelectric elements, and each piezoelectric element may be associated with a respective orifice and, in use, each piezoelectric element can be selectively actuated such that displacement of the piezoelectric element can expel liquid from the respective orifice. In some embodiments, the print head 1108 and/or 1118 may be arranged to expel a single liquid formulation from the one or more orifices. In other embodiments, the print head 1108 and/or 1118 may be arranged to expel a plurality of liquid formulations from the one or more orifices. For example, the print head 1108 and/or 1118 can expel a plurality of liquids (e.g., a plurality of solvents), a plurality of components of a binder composition, or both from the one or more orifices. Moreover, in some instances, expelling or otherwise delivering a liquid from the print head may include emitting an aerosolized liquid (i.e., an aerosol spray) from a nozzle of the print head.

In general, the print head 1108 in FIG. 6B and/or 1118 in FIG. 6A may be controlled to deliver liquid such as a binder composition to the metal powder bed 1114 in predetermined two-dimensional patterns, with each pattern corresponding to a respective layer of the three-dimensional composition 1102. In this manner, the delivery of the binder composition may be a printing operation in which the metal powder in each respective layer of the three-dimensional composition is selectively joined along the predetermined two-dimensional layers. After each layer of the three-dimensional composition is formed as described above, the platform 1105 may be moved down and a new layer of metal powder deposited, binder composition again applied to the new metal powder, etc. until the object has been formed.

In some embodiments, the print head 1108 (in FIG. 6B) and/or 1118 (in FIG. 6A) can extend axially along substantially an entire dimension of the metal powder bed 1114 in a direction perpendicular to a direction of movement of the print head 1108 and/or 1118 across the metal powder bed 1114. For example, in such embodiments, the print head 1118 can define a plurality of orifices arranged along the axial extent of the print head 1108 and/or 1118, and liquid can be selectively jetted from these orifices along the axial extent to form a predetermined two-dimensional pattern of liquid along the metal powder bed 1114 as the print head 1108 and/or 1118 moves across the metal powder bed 1114. In some embodiments, the print head 1108 and/or 1118 may extend only partially across the metal powder bed 1114, and the print head 1108 and/or 1118 may be movable in two dimensions relative to a plane defined by the powder bed 1114 to deliver a predetermined two-dimensional pattern of a liquid along the powder bed 1114.

The additive manufacturing system 1100 generally further includes a controller 1120 in electrical communication with one or more other system components. For instance, in FIG. 6A, a controller 1120 is in electrical communication with the metal powder supply 1112, the metal powder bed 1114, the spreader 1116, and the print head 1118. In FIG. 6B, the controller 1120 is in electrical communication with the unit 1107, the powder deposition mechanism 1106, and the print head 1108. Also in FIG. 6B, the controller 1120 may be configured to control the motion of the unit 1107, the material deposition mechanism 1106, and the print head 1108 as described above.

A non-transitory, computer readable storage medium 1122 may be in communication with the controller 1120 and have stored thereon a three-dimensional model 1124 and instructions for carrying out any one or more of the methods described herein. Alternatively, the non-transitory, computer readable storage medium may comprise previously prepared instructions. With reference to FIG. 6B, such instructions, when executed by the controller 1120, may operate the platform 1105, the unit 1107, the material deposition mechanism 1106, and the print head 1108 to fabricate one or more three-dimensional compositions. For example, one or more processors of the controller 1120 can execute instructions to move the unit 1107 forwards and backwards along an x-axis direction across the surface of the powder bed 1114. One or more processors of the controller 1120 also may control the material deposition mechanism 1106 to deposit build material onto the metal powder bed 1114.

With reference to FIG. 6A, one or more processors of the controller 1120 can execute instructions to control movement of one or more of the metal powder supply 1112 and the metal powder bed 1114 relative to one another as the three-dimensional composition 1102 is being formed. For example, one or more processors of the controller 1120 can execute instructions to move the metal powder supply 1112 in a z-axis direction toward the spreader 1116 to direct the metal powder 1104 toward the spreader 1116 as each layer of the three-dimensional composition 102 is formed and to move the metal powder bed 1114 in a z-axis direction away from the spreader 1116 to accept each new layer of the metal powder along the top of the metal powder bed 1114 as the spreader 1116 moves across the metal powder bed 1114. One or more processors of the controller 1120 also may control movement of the spreader 1116 from the metal powder supply 1112 to the metal powder bed 1114 to move successive layers of the metal powder across the metal powder bed 1114.

In some embodiments, one or more processors of the controller 1120 can control movement of the print head 1108 (in FIG. 6B) and/or 1118 (in FIG. 6A) to deposit liquid such as a binder composition onto selected regions of the metal powder bed 1114 to deliver a respective predetermined two-dimensional pattern of the liquid to each new layer of the metal powder 1104 along the top of the metal powder bed 1114. In general, as a plurality of sequential layers of the metal powder 1104 are introduced to the metal powder bed 1114 and the predetermined two-dimensional patterns of the liquid are delivered to each respective layer of the plurality of sequential layers of the metal powder 1104, the three-dimensional composition 1102 is formed according to the three-dimensional model (e.g., a model stored in a non-transitory, computer readable storage medium coupled to, or otherwise accessible by, the controller 1120, such as three-dimensional model 1124 stored in the non-transitory, computer readable storage medium 1122). In certain embodiments, the controller 1120 may retrieve the three-dimensional model (e.g., three-dimensional model 1124) in response to user input, and generate machine-ready instructions for execution by the additive manufacturing system 1100 to fabricate the three-dimensional object 1102.

As described above, it will be appreciated that the illustrative additive manufacturing system 1100 is provided as one example of a suitable additive manufacturing system and is not intended to be limiting with respect to the techniques described herein for controlling the flow behavior of a metal powder. For instance, it will be appreciated that the techniques may be applied within an additive manufacturing apparatus that utilizes only a roller as a material deposition mechanism and does not include material deposition mechanism 1106.

According to some embodiments, the techniques described herein for controlling the flow behavior of a metal powder may be employed to control properties of a metal powder for a binder jet additive manufacturing system. Such a system may comprise additive manufacturing system 1100 in addition to one or more other apparatus for producing a completed part (e.g., a metal object as described herein). Such apparatus may include, for example, a furnace for sintering a three-dimensional composition fabricated by the additive manufacturing system 1100 (or for sintering such a three-dimensional composition subsequent to applying other post-processing steps upon the three-dimensional composition).

Techniques described herein may refer to a "metal powder," although it will be appreciated that the techniques described herein are not necessarily limited to use cases in which the metal material employed to form one or more of the articles described herein comprises or consists of a powder. As such, while the discussion above may focus primarily on depositing a binder composition onto a metal powder, it will be appreciated that any binder deposition process described herein may also apply to deposition of a binder onto any granular material(s).

Figure 7:
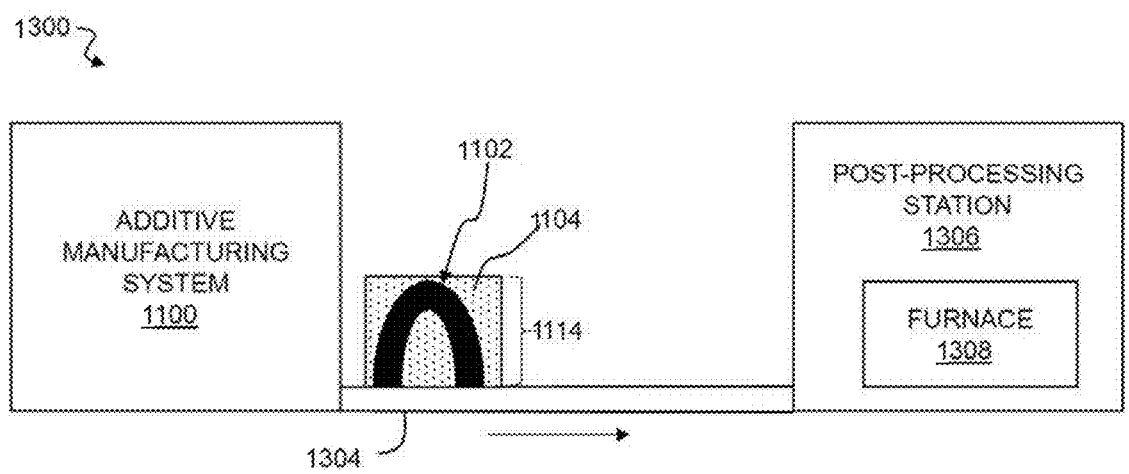
FIG. 7 shows one non-limiting embodiment of an additive manufacturing plant, in accordance with some embodiments.

Referring now to FIG. 7, an additive manufacturing plant 1300 can include the additive manufacturing system 1100, a conveyor 1304, and a post-processing station 1306. The metal powder bed 1114 containing the three-dimensional composition 1102 can be moved along the conveyor 1304 and into the post-processing station 1306. The conveyor 1304 can be, for example, a belt conveyor movable in a direction from the additive manufacturing system 1100 toward the post-processing station. Additionally, or alternatively, the conveyor 1304 can include a cart on which the powder bed 1114 is mounted and, in certain instances, the powder bed 1114 can be moved from the additive manufacturing system 1100 to the post-processing station 1306 through movement of the cart (e.g., through the use of actuators to move the cart along rails or by an operator pushing the cart).

In the post-processing station 1306 shown in FIG. 7, the three-dimensional composition 1102 can be heated in the metal powder bed 1114 to remove at least some of the liquid of the binder composition in the three-dimensional composition and to form a metal-based composite structure (e.g., a self-supporting metal-based composite structure) within the metal powder bed. The metal-based composite structure can be removed from the metal powder bed 1114. According to some aspects, the binder compositions described herein may aid in attaining a desired mechanical strength characteristic of the metal-based composite structure, thereby allowing for improved ability to handle the metal-based composite structure and improved consistency in metal objects formed from such metal-based composite structures. The metal powder 1104 remaining in the metal powder bed 1114 upon removal of the metal-based composite structure can be, for example, recycled for use in subsequent fabrication of additional parts. Additionally, or alternatively, in the post-processing station 1306, the metal-based composite structure can be cleaned (e.g., through the use of pressurized air) of excess amounts of the metal powder 1104.

In systems employing a binder jetting process, a metal-based composite structure can undergo one or more de-binding processes in the post-processing station 1306 to remove all or a portion of a polymer of the binder composition from the metal-based composite structure 1102. Non-limiting examples of suitable de-binding processes can include a thermal de-binding process (e.g., heating as described elsewhere herein), a supercritical fluid de-binding process, a catalytic de-binding process, a liquid de-binding process, and combinations thereof. For example, a plurality of de-binding processes can be staged to remove components of a binder composition in corresponding stages as the metal-based composite structure 102 is formed into a metal object.

The post-processing station 1306 shown in FIG. 7 can include a furnace 1308. The metal-based composite structure can undergo de-binding in the furnace 1308. It is also possible for de-binding may take place in a location other than a furnace or for the de-binding step to be omitted (e.g., for a metal-based composite structure to undergo sintering without undergoing de-binding first). In some embodiments, the metal-based composite structure and/or the de-bound metal structure can undergo sintering in the furnace 1308 such that the metal particles of the powder 1106 melt (e.g., to an extent not overall undesirable) and combine with one another to form a metal object.

As described above, in some embodiments, a binder composition (and/or one or more components thereof) is configured to form one or more of the articles described herein (e.g., a three-dimensional composition, a metal-based composition) in combination with a metal powder described herein. In some embodiments, one or more of the articles described herein may be formed from a binder composition described herein (e.g., a de-bound metal composition, a metal object). Such articles may comprise the binder composition, may comprise some components of the binder composition but lack other components of the binder composition (e.g., may comprise a polymer present in the binder composition but lack a solvent present in the binder composition), or may not include any components of the binder composition. In some embodiments, an article described herein comprises a reaction product of a binder composition (e.g., a polymer present in the binder composition that has been cross-linked, such as by a cross-linking agent present in the binder composition; a thermal decomposition product of a component of the binder composition, such as char).

As also described above, some binder compositions described herein may have one or more physical properties that enhances their suitability for use in one or more of the methods described herein, such as one or more of the methods for additive manufacturing described herein, and/or in one or more of the articles described herein, such as a three-dimensional object, a metal-based composite structure, a de-bound metal structure, and/or a metal object. Further details regarding some such physical properties is provided below.

In some embodiments, a binder composition described herein may have an advantageous viscosity. Without wishing to be bound by any particular theory, it is believed that the viscosity of the binder composition may affect its ability to be printed by a particular print head. For instance, some print heads may be designed to print binder compositions having a certain range of viscosities and may be unable to print compositions having viscosities outside of this range in a manner that is reliable and/or desirable. By way of example, binder compositions having viscosities above the range for which the print head is configured may not flow or may not flow appreciably at the pressures provided by the print head. As another example, binder compositions having viscosities below the range for which the print head is configured may flow in undesirable manners at the pressures provided by the print head (e.g., flow in a manner that produces droplets that are coalesced, take the form a mist, and/or misdirected), resulting in poor control over the deposition of the binder composition from the print head.

In some embodiments, a binder composition has a viscosity at a printing temperature of greater than or equal to 0.55 cP, greater than or equal to 1 cP, greater than or equal to 1.5 cP, greater than or equal to 2 cP, greater than or equal to 2.5 cP, greater than or equal to 3 cP, greater than or equal to 3.5 cP, greater than or equal to 4 cP, greater than or equal to 5 cP, greater than or equal to 6 cP, greater than or equal to 7 cP, greater than or equal to 8 cP, greater than or equal to 10 cP, greater than or equal to 12.5 cP, greater than or equal to 15 cP, greater than or equal to 17.5 cP, greater than or equal to 20 cP, greater than or equal to 22.5 cP, greater than or equal to 25 cP, or greater than or equal to 27.5 cP. In some embodiments, a binder composition has a viscosity at a printing temperature of less than or equal to 30 cP, less than or equal to 27.5 cP, less than or equal to 25 cP, less than or equal to 22.5 cP, less than or equal to 20 cP, less than or equal to 17.5 cP, less than or equal to 15 cP, less than or equal to 12.5 cP, less than or equal to 10 cP, less than or equal to 8 cP, less than or equal to 7 cP, less than or equal to 6 cP, less than or equal to 5 cP, less than or equal to 4 cP, less than or equal to 3.5 cP, less than or equal to 3 cP, less than or equal to 2.5 cP, less than or equal to 2 cP, less than or equal to 1.5 cP, or less than or equal to 1 cP. Combinations of the above-referenced ranges are also possible (e.g., greater than or equal to 0.55 cP and less than or equal to 30 cP, greater than or equal to 1 cP and less than or equal to 10 cP, greater than or equal to 3 cP and less than or equal to 30 cP, or greater than or equal to 3 cP and less than or equal to 10 cP). Other ranges are also possible. The viscosity of the binder composition may be determined by use of a cone and plate rheometer operated at a shear rate of 300 s$^{-1}$. The viscosities described above may be desirable for use with particular print heads of interest (e.g., piezoelectric print heads, thermal print heads, print heads suitable for ink jet printing). By way of example, in some embodiments, it may be desirable for a binder composition configured to be deposited thermally (e.g., by a thermal print head) to have a viscosity of greater than or equal to 1 cP and less than or equal to 10 cP at the printing temperature. As another example, in some embodiments, it may be desirable for a binder composition configured to be deposited piezoelectrically (e.g., by a piezoelectric print head) to have a viscosity of greater than or equal to 3 cP and less than or equal to 30 cP at the printing temperature.

The printing temperature may be a temperature at which the binder composition is ejected from a print head (e.g., by an additive manufacturing process, by a binder jetting process). In some embodiments, the printing temperature is greater than or equal to 20° C., greater than or equal to 25° C., greater than or equal to 30° C., greater than or equal to 35° C., or greater than or equal to 40° C. In some embodiments, the printing temperature is less than or equal to 45° C., less than or equal to 40° C., less than or equal to 35° C., less than or equal to 30° C., or less than or equal to 20° C. Combinations of the above-referenced ranges are also possible (e.g., greater than or equal to 20° C. and less than or equal to 40° C.). Other ranges are also possible.

As described above, some binder compositions have pHs that are non-corrosive to one or more articles with which the binder composition is configured to contact during formation of a metal-based composite structure. As also described above, these components may include portions of a printer, such as a print head, and/or components to be incorporated into a metal-based composite structure, such as a metal powder. In some embodiments, a binder composition that is a weak acid or that is a base may be less corrosive to such components than a binder composition that is a strong acid. Some binder compositions that are weak acids and/or bases may be non-corrosive to such components. For binder compositions configured to be employed with a metal powder particularly susceptible to corrosion, such as a steel powder, suitable values of pH for the binder composition may be higher than for those configured to be employed with a plurality of particles less susceptible to corrosion.

In some embodiments, a binder composition has a pH of greater than or equal to 4, greater than or equal to 4.5, greater than or equal to 5, greater than or equal to 5.5, greater than or equal to 6, greater than or equal to 6.5, greater than or equal to 7, greater than or equal to 7.5, greater than or equal to 8, greater than or equal to 8.5, greater than or equal to 9 greater than or equal to 9.5, greater than or equal to 10, or greater than or equal to 10.5. In some embodiments, a binder composition has a pH of less than or equal to 11, less than or equal to 10.5, less than or equal to 10, less than or equal to 9.5, less than or equal to 9, less than or equal to 8.5, less than or equal to 8, less than or equal to 7.5, less than or equal to 7, less than or equal to 6.5, less than or equal to 6, less than or equal to 5.5, or less than or equal to 5. Combinations of the above-referenced ranges are also possible (e.g., greater than or equal to 4 and less than or equal to 11, greater than or equal to 5 and less than or equal to 8, greater than or equal to 7 and less than or equal to 11, or greater than or equal to 7 and less than or equal to 9). Other ranges are also possible. The pH of a binder composition may be measured with a pH meter.

In some embodiments, the pH of the binder composition may be selected to be compatible with the particular type of metal powder it will be used in combination with. For instance, it may be desirable for binder compositions suitable for use with ferrous alloys having low chromium contents (e.g., below 2 wt %, such as 4140 low alloy steel) to have a weakly basic pH (e.g., greater than or equal to 7 and less than or equal to 11, or greater than or equal to 7 and less than or equal to 9). As another example, it may be desirable for binder compositions suitable for use with steels having appreciable chromium contents (e.g., in excess of 2 wt %, such as stainless steels and some non-stainless steels) to have weakly acidic or weakly basic values of pH (e.g., greater than or equal to 4 and less than or equal to 11, or greater than or equal to 5 and less than or equal to 8).

The binder compositions described herein may have a variety of suitable surface tensions. For instance, in some embodiments, a binder composition has a surface tension of greater than or equal to 18 dynes/cm, greater than or equal to 20 dynes/cm, greater than or equal to 22.5 dynes/cm, greater than or equal to 25 dynes/cm, greater than or equal to 28 dynes/cm, greater than or equal to 30 dynes/cm, greater than or equal to 32.5 dynes/cm, greater than or equal to 35 dynes/cm, greater than or equal to 40 dynes/cm, greater than or equal to 45 dynes/cm, greater than or equal to 50 dynes/cm, greater than or equal to 55 dynes/cm, greater than or equal to 60 dynes/cm, or greater than or equal to 65 dynes/cm. In some embodiments, a binder composition has a surface tension of less than or equal to 70 dynes/cm, less than or equal to 65 dynes/cm, less than or equal to 60 dynes/cm, less than or equal to 55 dynes/cm, less than or equal to 50 dynes/cm, less than or equal to 45 dynes/cm, less than or equal to 40 dynes/cm, less than or equal to 35 dynes/cm, less than or equal to 32.5 dynes/cm, less than or equal to 30 dynes/cm, less than or equal to 28 dynes/cm, less than or equal to 25 dynes/cm, less than or equal to 22.5 dynes/cm, or less than or equal to 20 dynes/cm. Combinations of the above-referenced ranges are also possible (e.g., greater than or equal to 18 dynes/cm and less than or equal to 70 dynes/cm). Other ranges are also possible. The surface tension of a binder composition may be measured in accordance with ASTM D1331-14.

As described above, in some embodiments, a binder composition as a whole may comprise a combination of advantageous components. Further details regarding such components are provided below.

In some embodiments, a binder composition comprises one or more polymers. One example of a suitable type of polymer that may be included in a binder composition is a polymer including an acrylic acid repeat unit, the chemical structure of which is shown below:

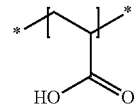

Advantageously, the acrylic acid repeat unit may be esterified as part of a cross-linking reaction. The acrylic acid repeat unit may be an acidic repeat unit (e.g., comprising an acidic hydrogen) or may be a deprotonated repeat unit (e.g., it may be deprotonated and negatively charged, it may be associated with a counter ion). Without wishing to be bound by any particular theory, in some embodiments, a polymer including at least some acrylic acid repeat units that are deprotonated (e.g., exclusively acrylic acid repeat units that have been deprotonated, both acrylic acid repeat units that have been deprotonated and those that are acidic) may be beneficially hygroscopic and/or soluble. This is believed to reduce the latency of the binder formulation and enhance its decap performance.

Polymers including acrylic acid repeat units may further comprise other, different repeat units. By way of example, a binder composition may comprise a polymer comprising an acrylic acid repeat unit and comprising further, non-acrylic acid, repeat units (e.g., styrene monomers, maleic anhydride repeat units). The repeat units in a polymer (e.g., acrylic acid repeat units, others) may be distributed within the polymer in a variety of suitable manners (e.g., randomly, statistically, alternatingly, in one or more blocks, etc.). In some embodiments, a polymer may comprise acrylic acid repeat units and may comprise one or more end groups lacking an acrylic acid functional group (e.g., one or more initiators, one or more RAFT agents). It is also possible for the polymer to be a homopolymer comprising acrylic acid repeat units. By way of example, a binder composition may comprise poly (acrylic acid).

When a polymer comprising an acrylic acid repeat unit further comprises other repeat units, the acrylic acid repeat unit may make up a variety of suitable amounts of the polymer. In some embodiments, a polymer comprises an acrylic acid repeat unit that makes up greater than or equal to 30 mol %, greater than or equal to 40 mol %, greater than or equal to 50 mol %, greater than or equal to 60 mol %, greater than or equal to 70 mol %, greater than or equal to 80 mol %, or greater than or equal to 90 mol % of the repeat units within the polymer. In some embodiments, a polymer comprises an acrylic acid repeat unit make up less than or equal to 100 mol %, less than or equal to 90 mol %, less than or equal to 80 mol %, less than or equal to 70 mol %, less than or equal to 60 mol %, less than or equal to 50 mol %, or less than or equal to 40 mol % of the repeat units within the polymer. Combinations of the above-referenced ranges are also possible (e.g., greater than or equal to 30 mol % and less than or equal to 100 mol %). Other ranges are also possible.

Further examples of suitable polymers for use in binder compositions include synthetic polymers and natural polymers. Non-limiting examples of suitable synthetic polymers include poly(ethylenimine)s (which may be a suitable cross-linking agent as described elsewhere herein), poly(vinyl alcohol), and poly(vinyl pyrrolidone). Non-limiting examples of suitable natural polymers include chitosan, gelatin, starches, and sugars.

In some embodiments, a binder composition comprises a low molecular weight polymer (e.g., a low molecular weight polymer including an acrylic acid repeat unit). Advantageously low molecular weight polymers may increase the viscosity of binder compositions to a smaller extent than otherwise equivalent polymers having a higher molecular weight. This may desirably allow for binder compositions to be formulated that both have a beneficial viscosity and include a larger wt % of polymer. Increased amounts of polymer in the binder composition are believed to enhance the transverse flexural strength of articles formed therefrom (e.g., metal-based composite structures). Lower molecular weight polymers are also believed to be beneficial because it is believed that they are more soluble in many binder formulations than otherwise equivalent polymers having a higher molecular weight. This enhanced solubility is believed to result in improved binder jetting performance (e.g., improved latency and/or decap performance).

A binder composition described herein may comprise a polymer (e.g., a polymer including an acrylic acid repeat unit) having a weight average molecular weight of less than or equal to 40 kDa, less than or equal to 35 kDa, less than or equal to 30 kDa, less than or equal to 25 kDa, less than or equal to 20 kDa, less than or equal to 15 kDa, less than or equal to 10 kDa, less than or equal to 7.5 kDa, less than or equal to 6 kDa, less than or equal to 5 kDa, less than or equal to 4 kDa, less than or equal to 3 kDa, less than or equal to 2 kDa, or less than or equal to 1 kDa. In some embodiments, the binder composition comprises a polymer (e.g., a polymer including an acrylic acid repeat unit) having a weight average molecular weight of greater than or equal to 500 Da, greater than or equal to 1 kDa, greater than or equal to 2 kDa, greater than or equal to 3 kDa, greater than or equal to 4 kDa, greater than or equal to 5 kDa, greater than or equal to 6 kDa, greater than or equal to 7.5 kDa, greater than or equal to 10 kDa, greater than or equal to 15 kDa, greater than or equal to 20 kDa, greater than or equal to 30 kDa, or greater than or equal to 35 kDa. In some embodiments, a binder composition comprises a polymer having a weight average molecular weight of Combinations of the above-referenced ranges are also possible (e.g., less than or equal to 40 kDa and greater than or equal to 500 Da, less than or equal to 40 kDa and greater than or equal to 2 kDa, or less than or equal to 6 kDa and greater than or equal to 2 kDa). Other ranges are also possible. The weight average molecular weight may be determined by GPC.

It should also be understood that a single type of polymer present in a binder composition (e.g., a polymer including an acrylic acid repeat unit, a polymer lacking an acrylic acid repeat unit) may have a weight average molecular weight in one or more of the above-referenced ranges (e.g., in a binder composition that further comprises other, different types of polymers or that lacks other, different polymers) and/or the binder composition may comprise more than one type of polymer and all of the types of polymers together may have a weight average molecular weight in one or more of the above-referenced ranges.

In some embodiments, a binder composition comprises both a low molecular weight polymer (e.g., a polymer comprising an acrylic acid repeat unit) and further comprises a non-low molecular weight polymer. The non-low molecular weight polymer may have a molecular weight outside of one or more of the ranges described above (e.g., of greater than 40 kDa). In some embodiments, the non-low molecular weight polymer comprises a polymer lacking an acrylic acid repeat unit (e.g., a binder composition may comprise synthetic polymer and/or a natural polymer as described above that is also a non-low molecular weight polymer).

Polymers suitable for use in the binder compositions described herein may be present in the binder compositions in a variety of suitable amounts. In some embodiments, a binder composition comprises a polymer or combination of polymers that make up greater than or equal to 1 wt %, greater than or equal to 2 wt %, greater than or equal to 3 wt %, greater than or equal to 4 wt %, greater than or equal to 5 wt %, greater than or equal to 7.5 wt %, greater than or equal to 10 wt %, greater than or equal to 15 wt %, greater than or equal to 20 wt %, greater than or equal to 25 wt %, greater than or equal to 30 wt %, or greater than or equal to 35 wt % of the binder composition. In some embodiments, a binder composition comprises a polymer or combination of polymers that make up less than or equal to 40 wt %, less than or equal to 35 wt %, less than or equal to 30 wt %, less than or equal to 25 wt %, less than or equal to 20 wt %, less than or equal to 15 wt %, less than or equal to 10 wt %, less than or equal to 7.5 wt %, less than or equal to 5 wt %, less than or equal to 4 wt %, less than or equal to 3 wt %, or less than or equal to 1 wt % of the binder composition. Combinations of the above-referenced ranges are also possible (e.g., greater than or equal to 1 wt % and less than or equal to 40 wt %, greater than or equal to 1 wt % and less than or equal to 30 wt %, greater than or equal to 1 wt % and less than or equal to 25 wt %, greater than or equal to 2 wt % and less than or equal to 30 wt %, or greater than or equal to 3 wt % and less than or equal to 40 wt %). Other ranges are also possible. It should also be understood that a single polymer may be present in a binder composition in one or more of the above-referenced ranges (e.g., that further comprises other, different polymers or that lacks other, different polymers) and/or the total amount of polymer in a binder composition may be in one or more of the above-referenced ranges.

In some embodiments, a binder composition comprises one or more cross-linking agents. The cross-linking agent(s) may be configured to cross-link one or more polymers also present in the binder composition. This may advantageously cause the polymer(s) to form a cross-linked network with enhanced cohesive strength, which may enhance the mechanical properties (e.g., flexural strength) of a metal-based composite structure formed from the binder composition.

When present, a cross-linking agent may be configured to cross-link one or more polymers in a variety of suitable manners. For instance, in some embodiments, a cross-linking agent is configured to undergo a reaction with one or more functional groups on a polymer. By way of example, a cross-linking agent may comprise a nucleophilic functional group that is configured to undergo a reaction with an electrophilic functional group included in the polymer (e.g., an acrylic acid repeat unit). Non-limiting examples of suitable nucleophilic functional groups include alcohol-based functional groups (e.g., hydroxyl functional groups), amino functional groups, thiol functional groups, and epoxide functional groups. Non-limiting examples of suitable cross-linking agents comprising such functional groups include poly(ethylenimine)s, polyols (e.g., aliphatic diols such as 1,2-hexanediol, 1,3-hexanediol, 1,2-butanediol, 1,4-cyclohexane diol, ethylene diol, diethylene glycol, and/or propylene glycol; aliphatic triols such as glycerol; aliphatic tetrols, such as erythritol), aliphatic poly(ether)s (e.g., poly(propylene glycol), poly(ethylene glycol)), multifunctional amines (e.g., diethanolamine, triethanolamine), multifunctional thiols, and metallic cross-linking agents (e.g., zirconium carbonate, titanium isopropoxides, aluminum isopropoxides).

The cross-linking agents described herein typically comprise at least two portions configured to undergo a reaction with a polymer (e.g., at least two nucleophilic functional groups). In other words, the cross-linking agents described herein are typically at least difunctional. In some embodiments, a binder composition comprises a cross-linking agent that is difunctional, trifunctional, tetrafunctional, or having a higher level of functionality.

Cross-linking agents suitable for use in the binder compositions described herein may have a variety of suitable molecular weights. In some embodiments, a binder composition comprises a cross-linking agent having a weight average molecular weight of less than or equal to 2 kDa, less than or equal to 1 kDa, less than or equal to 750 Da, less than or equal to 500 Da, less than or equal to 200 Da, less than or equal to 100 Da, or less than or equal to 75 Da. In some embodiments, a binder composition comprises a cross-linking agent having a weight average molecular weight of greater than or equal to 62 Da, greater than or equal to 75 Da, greater than or equal to 100 Da, greater than or equal to 200 Da, greater than or equal to 500 Da, greater than or equal to 750 Da, or greater than or equal to 1 kDa. Combinations of the above-referenced ranges are also possible (e.g., less than or equal to 2 kDa and greater than or equal to 62 Da). Other ranges are also possible. The weight average molecular weight may be determined by GPC.

It should also be understood that a single type of cross-linking agent present in a binder composition may have a weight average molecular weight in one or more of the above-referenced ranges (e.g., in a binder composition that further comprises other, different types of cross-linking agents or that lacks other, different cross-linking agents) and/or the binder composition may comprise more than one type of cross-linking agents and all of the types of cross-linking agents together may have a weight average molecular weight in one or more of the above-referenced ranges.

Cross-linking agents suitable for use in the binder compositions described herein may be present in the binder compositions in a variety of suitable amounts. In some embodiments, a binder composition comprises a cross-linking agent or combination of cross-linking agents that make up greater than or equal to 0 wt %, greater than or equal to 0.1 wt %, greater than or equal to 0.2 wt %, greater than or equal to 0.3 wt %, greater than or equal to 0.4 wt %, greater than or equal to 0.5 wt %, greater than or equal to 0.75 wt %, greater than or equal to 1 wt %, greater than or equal to 1.5 wt %, greater than or equal to 2 wt %, greater than or equal to 5 wt %, or greater than or equal to 7.5 wt % of the binder composition. In some embodiments, a binder composition comprises cross-linking agent or combination of cross-linking agents that make up less than or equal to 10 wt %, less than or equal to 7.5 wt %, less than or equal to 5 wt %, less than or equal to 2 wt %, less than or equal to 1.5 wt %, less than or equal to 1 wt %, less than or equal to 0.75 wt %, less than or equal to 0.5 wt %, less than or equal to 0.4 wt %, less than or equal to 0.3 wt %, less than or equal to 0.2 wt %, or less than or equal to 0.1 wt % of the binder composition. Combinations of the above-referenced ranges are also possible (e.g., greater than or equal to 0 wt % and less than or equal to 10 wt %, greater than or equal to 0.1 wt % and less than or equal to 10 wt %, or greater than or equal to 0.2 wt % and less than or equal to 10 wt %). Other ranges are also possible. It should also be understood that a single cross-linking agent may be present in a binder composition in one or more of the above-referenced ranges (e.g., that further comprises other, different cross-linking agents or that lacks other, different cross-linking agents) and/or the total amount of cross-linking agent in a binder composition may be in one or more of the above-referenced ranges.

In some embodiments, a binder composition comprises a solvent. The solvent may solvate the other components therein (e.g., one or more polymers therein, one or more pH modifiers therein, one or more surfactants therein, one or more biocides therein, one or more humectants therein, one or more adhesion promoters therein, one or more cross-linking agents therein). In some embodiments, the solvent is a liquid and/or the binder composition is a liquid solution.

In some embodiments, a binder composition comprises a solvent comprising water. In other words, a binder composition may comprise an aqueous solvent and/or an aqueous solution. Without wishing to be bound by any particular theory, it is believed that aqueous solvents may be desirable for use in binder compositions because they may be more environmentally friendly and/or less toxic than other types of solvents (e.g., than organic solvents). It is also believed that, when water is a reaction product of a cross-linking reaction that one or more components of the binder composition are configured to undergo, the presence of water in the binder composition may advantageously suppress cross-linking at points in time before it is desired. Then, the water may be removed and cross-linking may be performed.

Solvents suitable for use in the binder compositions described herein may be present in the binder compositions in a variety of suitable amounts. In some embodiments, a binder composition comprises a solvent that makes up greater than or equal to 50 wt %, greater than or equal to 55 wt %, greater than or equal to 60 wt %, greater than or equal to 65 wt %, greater than or equal to 70 wt %, greater than or equal to 75 wt %, greater than or equal to 80 wt %, greater than or equal to 85 wt %, greater than or equal to 90 wt %, or greater than or equal to 95 wt % of the binder composition. In some embodiments, a binder composition comprises a solvent that makes up less than or equal to 99 wt %, less than or equal to 95 wt %, less than or equal to 90 wt %, less than or equal to 85 wt %, less than or equal to 80 wt %, less than or equal to 75 wt %, less than or equal to 70 wt %, less than or equal to 65 wt %, less than or equal to 60 wt %, or less than or equal to 55 wt % of the binder composition. Combinations of the above-referenced ranges are also possible (e.g., greater than or equal to 50 wt % and less than or equal to 99 wt %). Other ranges are also possible.

Binder compositions comprising a solvent may also comprise one or more co-solvents. The co-solvent(s) may enhance the solubility of one or more components of the binder composition in the solvent (e.g., it may enhance the solubility of one or more polymers, one or more pH modifiers, one or more surfactants, one or more biocides, one or more humectants, one or more adhesion promoters, and/or one or more cross-linking agents in the binder composition). The co-solvent(s) may be liquid(s).

Non-limiting examples of suitable co-solvents include solvents that are miscible with the solvent and readily solubilize one or more components of the binder composition. For instance, when the solvent comprises water and the binder composition comprises one or more organic components, one or more water-soluble organic solvents may be suitable for use as co-solvents. Non-limiting examples of suitable co-solvents include alcohols (e.g., monofunctional alcohols, diols, triols), ketones (e.g., acetone, diacetone, butanone), esters (e.g., ethyl acetate), ethers, lactones (e.g., hydroxybutyrolactone), lactams, pyrrolidones (e.g., N-methyl pyrrolidone, N-phenyl pyrrolidone, 2-pyrrolidone), amides (e.g., dimethyl acetamide), sulfones (e.g., dimethyl sulfone), and sulfoxides (e.g., dimethyl sulfoxide). Further examples of alcohols include methanol, ethanol, isopropanol, 1-butanol, 2-butanol, 1,2-hexanediol, ethylene glycol, propylene glycol, 1-(1-hydroxypropoxy)propan-1-ol, 1-(2-hydroxypropoxy)propan-2-ol, 3,3'-oxybis(propan-1-ol), and dipropylene glycol (a mixture of isomers 1-(1-hydroxypropoxy)propan-1-ol, 1-(2-hydroxypropoxy) propan-2-ol, and 3,3'-oxybis(propan-1-ol)).

Co-solvents suitable for use in the binder compositions described herein may be present in the binder compositions in a variety of suitable amounts. In some embodiments, a binder composition comprises a co-solvent or combination of co-solvents that make up greater than or equal to 0 wt %, greater than or equal to 1 wt %, greater than or equal to 2 wt %, greater than or equal to 3 wt %, greater than or equal to 4 wt %, greater than or equal to 5 wt %, greater than or equal to 7.5 wt %, greater than or equal to 10 wt %, greater than or equal to 15 wt %, greater than or equal to 20 wt %, or greater than or equal to 25 wt % of the binder composition. In some embodiments, a binder composition comprises a co-solvent or combination of co-solvents that make up less than or equal to 30 wt %, less than or equal to 25 wt %, less than or equal to 20 wt %, less than or equal to 15 wt %, less than or equal to 10 wt %, less than or equal to 7.5 wt %, less than or equal to 5 wt %, less than or equal to 4 wt %, less than or equal to 3 wt %, less than or equal to 2 wt %, or less than or equal to 1 wt % of the binder composition. Combinations of the above-referenced ranges are also possible (e.g., greater than or equal to 0 wt % and less than or equal to 30 wt %, or greater than or equal to 0 wt % and less than or equal to 5 wt %). Other ranges are also possible. It should also be understood that a single co-solvent may be present in a binder composition in one or more of the above-referenced ranges (e.g., that further comprises other, different co-solvents or that lacks other, different co-solvents) and/or the total amount of co-solvent in a binder composition may be in one or more of the above-referenced ranges.

In some embodiments, a binder composition comprises an adhesion promoter. An adhesion promoter is a component of a binder composition that facilitates adhesion between one or more components of the binder composition and a metal powder. For example, an adhesion promoter may facilitate adhesion between a low molecular weight polymer (e.g., a polymer comprising an acrylic acid repeating unit) and a metal powder during at least a portion of an additive manufacturing process. It has been observed in the context of this disclosure that in some embodiments, improved adhesion afforded by inclusion of adhesion promoters in a binder composition can improve binder performance with metal powders relative to binder compositions lacking such an adhesion promoter. It should be understood that in this context, adhesion between one or more components of a binder composition and a metal powder refers to any of a variety of specific and non-specific physical and/or chemical interactions that hold the component and the metal powder together. For example, an adhesion promoter may facilitate adhesion between a component of the binder composition (e.g., a low molecular weight polymer comprising an acrylic acid repeating unit) by forming one or more chemical bonds (e.g., covalent, hydrogen, and/or ionic bonds) with the component and/or with the metal powder. As other examples, the adhesion promoter may facilitate adhesion between a component of the binder composition by electrostatic, dispersive, and/or hydrogen-bonding interactions between the component the metal powder. In some instances, adhesion promoters described herein may be particularly useful with certain types of metal powders such as precious metal powders (e.g., comprising gold metal and/or a gold alloy, silver metal and/or a silver alloy, or platinum metal and/or a platinum alloy).

In some embodiments, the adhesion promoter in the binder composition is a molecule. For example, the adhesion promoter may be a small molecule (e.g., having a molecular weight of less than 1000 Da, less than or equal to 750 Da, less than or equal to 500 Da, less than or equal to 300 Da, and/or as low as 200 Da, as low as 100 Da, or lower). In some embodiments, the adhesion promoter is a polymer (e.g., repeating units and a weight average molecular weight of greater than or equal to 1 kDa, greater than or equal to 1.5 kDa, greater than or equal to 2 kDa, greater than or equal to 5 kDa, and/or up to 10 kDa, up to 20 kDa, up to 40 kDa, or greater).

In some embodiments, the adhesion promoter comprises a functional group capable of binding to the metal powder. A choice of functional group for the adhesion promoter may depend on the composition of the metal powder. For example, the functional group of the adhesion promoter may be selected based on known reactivity with the metal/metal alloy and/or a known binding affinity with the metal/metal alloy. Examples of possible functional groups include, but are not limited to thiols, disulfides, carboxylic acids/carboxylates, amines, and hydroxy groups. A functional group capable of binding to a metal powder may be capable of forming a chemical bond with the metal powder. The chemical bond (e.g., a covalent bond, an ionic bond) may be relatively strong. For example, the functional group may be capable of forming a chemical bond having a bond dissociation energy of greater than or equal to 50 kJ/mol, greater than or equal to 75 kJ/mol, greater than or equal to 100 kJ/mol, greater than or equal to 120 kJ/mol, and/or up to 130 kJ/mol, up to 150 kJ/mol, up to 200 kJ/mol, or higher at 298 K. It should be understood that in the context of this disclosure, binding (e.g., via formation of a chemical bond) between a functional group and a metal powder encompasses forming non-covalent affinity-based interactions as well as undergoing bond-forming reactions such as dative/coordination bonding, reactions involving acid-base interactions (including those involving protonation/deprotonation), reactions involving nucleophilic/electrophilic substitutions, reactions involving radical-based coupling/decoupling, and/or reactions involving reduction or oxidation.

Figure 9A:
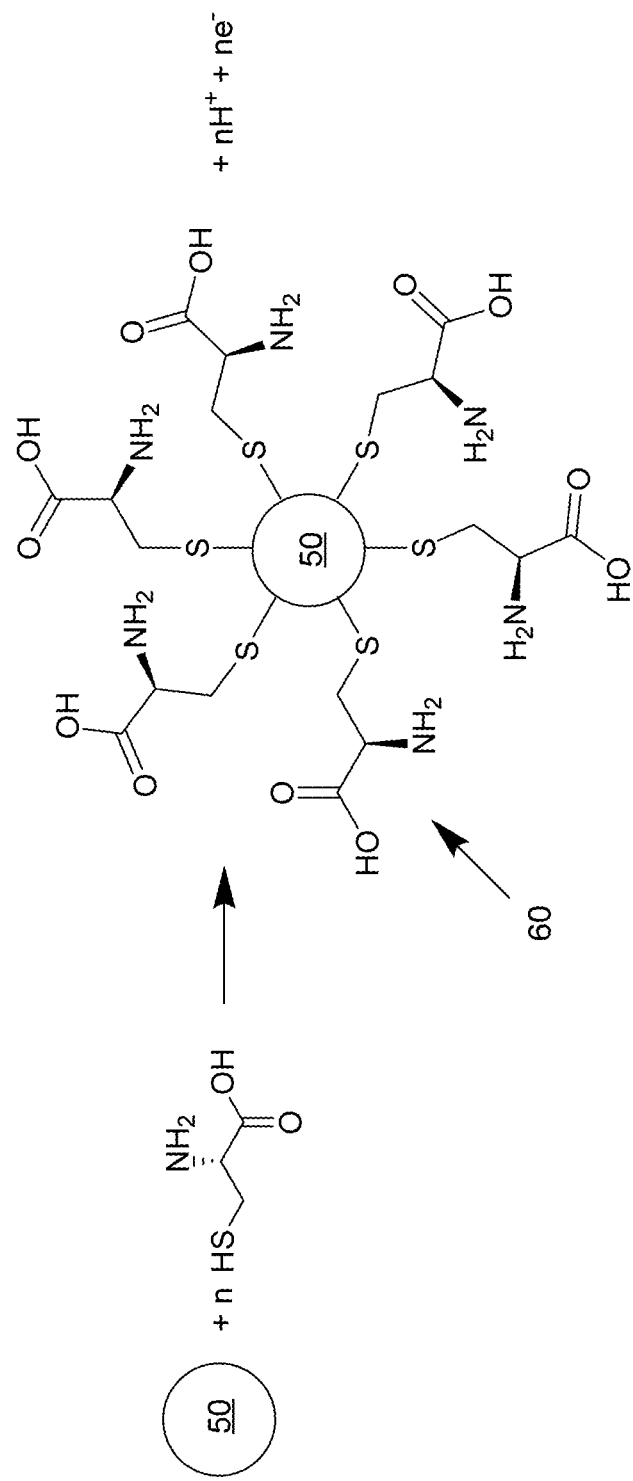
FIG. 9A shows a non-limiting reaction scheme between a metal powder and an adhesion promoter, in accordance with some embodiments.

In some embodiments, the functional group capable of binding to the metal powder is a sulfur-containing functional group. Examples of sulfur-containing functional groups the adhesion promoter may comprise include, but are not limited to, thiols, disulfides, thioethers, thioesters, sulfonyl groups, sulfoxide groups, sulfinic acid groups, sulfonate ester groups, thiocyanates, thioketones, thials, and thiocarboxylate/thiocarboxylic acid groups. It has been observed in the context of this disclosure that in some embodiments, adhesion promoters comprising sulfur-containing functional groups may promote beneficial adhesion with certain metal powders, such as precious metal powders. For example, it has been observed that metal powders comprising gold metal and/or gold alloys (e.g., rose gold) may bind relatively strongly to adhesion promoters comprising sulfur-containing functional groups (e.g., thiol-containing functional groups). Without wishing to be bound by any particular theory, it is believed that sulfur-containing functional groups such as thiols can form relatively strong bonds with gold. FIG. 9A depicts an illustrative reaction scheme showing adhesion between metal powder particle 50 (e.g., a gold particle) with sulfur-containing adhesion promoters 60 (e.g., cysteine molecules), according to certain embodiments.

In some embodiments, the functional group capable of binding to the metal powder (e.g., a sulfur-containing functional group) is a first functional group of the adhesion promoter, and the adhesion promoter comprises a second functional group. The second functional group may be capable of promoting adhesion with one or more components of the binder composition. For example, the second functional group may be capable of undergoing a chemical reaction to form a chemical bond with a low molecular weight polymer of the binder composition (e.g., comprising acrylic acid repeat units). Forming a chemical bond between the adhesion promoter and the low molecular weight polymer may be performed under any of a variety of suitable conditions known in the art, such as via heating, applying electromagnetic radiation (e.g., UV or visible light), and/or adding reaction initiators such as suitable catalyst. The second functional group may react with a backbone of the polymer, or a residue of the polymer.

In some embodiments, the second functional group comprises a nucleophilic functional group. Examples of potentially suitable nucleophilic functional groups include, but are not limited to, amine groups and hydroxyl groups. The nucleophilic groups of the adhesion promoter may react to result in a bond with an electrophilic functional group of a polymer of the binder compositions. As an illustrative example, an adhesion promoter may facilitate adhesion between a metal powder (e.g., comprising gold metal and/or gold alloy) and a polymer comprising acrylic acid repeating units by binding a first functional group (e.g., thiol) to the metal particle and reacting a second functional group (e.g., an amine) with the carboxylic acid groups of the acrylic acid polymer to afford an amide bond. In some embodiments, the first functional group is a sulfur-containing functional group and the second functional group is a nucleophilic group. Molecular examples of such an adhesion promoter includes amine thiols, dithiothreitol, and mercaptoethanol. A polymeric example of such an adhesion promoter is a thiolated polyvinyl alcohol.

Figure 9B:
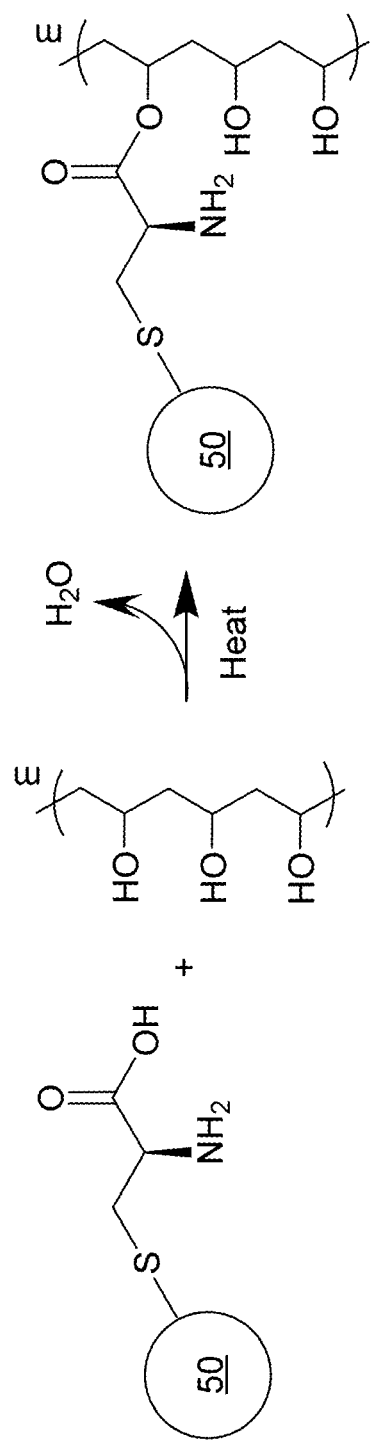
FIG. 9B shows a non-limiting reaction scheme between a metal powder, an adhesion promoter, and a polymer, in accordance with some embodiments.

In some embodiments, the second functional group comprises an electrophilic functional group. Examples of potentially suitable electrophilic functional groups include, but are not limited to, carboxylate/carboxylic acid groups, aldehydes, ketones, and groups comprising leaving groups such as halides, tosylates, succinimidyl groups, and the like. The electrophilic functional groups of the adhesion promoter may react to result in a bond with nucleophilic functional group of a polymer of the binder compositions. As an illustrative example, an adhesion promoter may facilitate adhesion between a metal powder (e.g., comprising gold metal and/or gold alloy) and a polymer comprising hydroxy or amine repeating units (e.g., polyvinyl alcohol or polyethylene imine, respectively) by binding a first functional group (e.g., thiol) to the metal particle and reacting a second functional group (e.g., a carboxylic acid/carboxylate) with the hydroxy or amine groups of the polymer to afford an ester or amide bond. In some embodiments, the first functional group is a sulfur-containing functional group and the second functional group is an electrophilic functional group. Examples of such an adhesion promoter include, but are not limited to, thiocarboxylic acids, and thiocarboxylates. FIG. 9B shows an illustrative reaction scheme showing a bond-forming reaction between adhesion promoters 60 comprising thiol groups bound to metal powder 50 (e.g., comprising gold metal and/or gold alloy) and carboxylate electrophilic groups, with polyvinyl alcohol of a binder composition, according to certain embodiments.

In some embodiments, the adhesion promoter comprises a first functional group capable of binding to a metal powder, a second functional group, and a third functional group. As in the case of the second functional group, the third functional group may be a nucleophilic functional group or an electrophilic functional group. In some embodiments, the second functional group is a nucleophilic functional group and the third functional group is an electrophilic functional group (or equivalently, the second functional group is an electrophilic group and the third functional group is a nucleophilic group). It is believed that an adhesion promoter comprising both a nucleophilic functional group and an electrophilic functional group can, in some instances, afford manufacturing and binder formulation choice flexibility by being able to react with either nucleophilic group-containing polymers (e.g., polyvinyl alcohol) or electrophilic functional group-containing polymers (e.g., polymers with acrylic acid repeating units) of the binder composition. Examples of such adhesion promoters include sulfur-containing amino acids. For example, the adhesion promoter may be or comprise cysteine (e.g., L-cysteine) or its oxidation product cystine (comprising a disulfide bond). The adhesion promoter may, alternatively be or comprise methionine, homocysteine, and/or taurine. Referring again to FIGS. 9A-9B, adhesion promoters 60 are cysteine molecules each comprising a thiol, a carboxylate, and an amine, in accordance with certain embodiments.

The adhesion promoter may be present in a binder composition in any of a variety of suitable amounts. In some embodiments, the weight percentage of the adhesion promoter in the binder composition is greater than or equal to 0.1 wt %, greater than or equal to 0.2 wt %, greater than or equal to 0.5 wt %, greater than or equal to 1 wt %, greater than or equal to 1.5 wt %, greater than or equal to 2 wt %, greater than or equal to 3 wt %, greater than or equal to 5 wt %, greater than or equal to 10 wt %, or higher. In some embodiments, the weight percentage of the adhesion promoter in the binder composition is less than or equal to 40 wt %, less than or equal to 30 wt %, less than or equal to 20 wt %, less than or equal to 15 wt %, less than or equal to 10 wt %, less than or equal to 8 wt %, less than or equal to 5 wt %, less than or equal to 4 wt %, less than or equal to 3 wt %, or less. Combinations of these ranges are possible. For example, in some embodiments the weight percentage of the adhesion promoter in the binder composition is greater than or equal to 0.1 wt % and less than or equal to 40 wt %, or greater than or equal to 0.1 wt % and less than or equal to 10 wt %.

In some embodiments, a binder composition comprises one or more pH modifiers. The pH modifier(s) may be configured to interact with the other components of the binder composition to adjust the pH to a desired value. For instance, the pH modifier may be configured to interact with the other components of the binder composition to adjust the pH to a value that will not appreciably corrode one or more articles with which the binder composition is configured to contact during formation of a composite structure.

The binder compositions described herein may comprise pH modifier(s) that are basic. A variety of types of bases may be suitable for use as pH modifiers. For instance, examples of suitable pH modifiers include Arrhenius bases, Lewis bases, and Bronsted-Lowry bases. As another example, a binder composition may comprise an inorganic base and/or an organic base. Non-limiting examples of suitable pH modifiers include hydroxides (e.g., sodium hydroxide, potassium hydroxide, lithium hydroxide), carbonates (e.g., sodium carbonate, potassium carbonate, lithium carbonate), ammonia, tetramethyl ammonium hydroxide, and amine-containing species (e.g., organic amine-containing species that may be aliphatic or aromatic, such as methyl amine, ethyl amine, triethyl amine, ethanolamine, triethanolamine, diaminobenzene), and amine derivatives (e.g., pyridine, imidazole).

The pH modifiers described herein may be selected such that the pH of the binder composition is in a desirable range. In some embodiments, a pH modifier is selected such that the pH of the binder composition is greater than or equal to 4, greater than or equal to 4.5, greater than or equal to 5, greater than or equal to 5.5, greater than or equal to 6, greater than or equal to 6.5, greater than or equal to 7, greater than or equal to 7.5, greater than or equal to 8, greater than or equal to 8.5, greater than or equal to 9 greater than or equal to 9.5, greater than or equal to 10, or greater than or equal to 10.5. In some embodiments, a binder composition has a pH of less than or equal to 11, less than or equal to 10.5, less than or equal to 10, less than or equal to 9.5, less than or equal to 9, less than or equal to 8.5, less than or equal to 8, less than or equal to 7.5, less than or equal to 7, less than or equal to 6.5, less than or equal to 6, less than or equal to 5.5, or less than or equal to 5. Combinations of the above-referenced ranges are also possible (e.g., greater than or equal to 4 and less than or equal to 11, greater than or equal to 5 and less than or equal to 8, greater than or equal to 7 and less than or equal to 11, or greater than or equal to 7 and less than or equal to 9). Other ranges are also possible.

The pH modifiers described herein may have a variety of suitable boiling points. In some embodiments, it may be advantageous for a pH modifier to have a relatively low boiling point, as this may facilitate removal of the pH modifier from the binder composition (or from a three dimensional composition and/or metal-based composite structure fabricated from a binder composition) at relatively low temperatures. This property may be advantageous when it is desirable to remove the pH modifier from a three-dimensional composition and/or metal-based composite structure into which it has been incorporated during one of the steps described herein (e.g., a drying and/or heating step) and/or prior to performing some of the steps described herein (e.g., a further heating step). As one specific example, it may be advantageous to remove the pH modifier from binder composition prior to cross-linking, as the pH modifier may interfere with the cross-linking reaction in certain cases. The inclusion of such a pH modifier in the binder composition may desirably suppress cross-linking at points in time before it is desired. In other embodiments, a pH modifier may also function as a cross-linking agent.

In some embodiments, a binder composition comprises a pH modifier having a boiling point of less than or equal to 150° C., less than or equal to 125° C., less than or equal to 100° C., less than or equal to 75° C., less than or equal to 50° C., less than or equal to 25° C., less than or equal to 0° C., or less than or equal to −25° C. In some embodiments, a binder composition comprises a pH modifier having a boiling point of greater than or equal to −40° C., greater than or equal to −25° C., greater than or equal to 0° C., greater than or equal to 25° C., greater than or equal to 50° C., greater than or equal to 75° C., greater than or equal to 100° C., or greater than or equal to 125° C. Combinations of the above-referenced ranges are also possible (e.g., less than or equal to 150° C. and greater than or equal to −40° C.). Other ranges are also possible.

In some embodiments, a binder composition comprises one or more corrosion inhibitors. The corrosion inhibitor(s) may reduce the amount of corrosion that a plurality of metal particles undergoes when in contact with the binder composition (e.g., in comparison to the corrosion that the plurality of metal particles would undergo when in contact with an otherwise equivalent binder composition lacking the corrosion inhibitor). This may be particularly useful for binder compositions configured to be employed in combination with metal powders particularly prone to corrosion, such as metal powders comprising tool steel. Some corrosion inhibitors suitable for use in the binder compositions described herein may also be suitable for use as pH modifiers. The binder compositions described herein may comprise pH modifiers that are not corrosion inhibitors, corrosion inhibitors that are not pH modifiers, and pH modifiers that are corrosion inhibitors.

Non-limiting examples of suitable corrosion inhibitors include amines (e.g., triethanol amine, hexamine, phenylenediamine, monoethanol amine), amine salts (e.g., triethanol amine salts of decacarboxylic acid), hydrazine, benzotriazole, and poly(ethyleneimine).

In some embodiments, a binder composition comprises one or more surfactant(s). The surfactant(s) may increase the penetration of the binder composition into a composite layer and/or may enhance the jetting performance of the binder composition. It is also believed that the surfactants may increase the amount of spreading of the binder composition in a powder layer. In some embodiments, the surfactant(s) may reduce the level of foaming in the binder composition during one or more processes associated with additive manufacturing (e.g., transport to and/or deposition by a print head) and/or may enhance the rate at which the binder composition can refill a print head (e.g., a thermal print head).

Some binder compositions may comprise ionic surfactants and some binder compositions may comprise non-ionic surfactants. Non-limiting examples of suitable ionic surfactants include sulfates (e.g., ammonium lauryl sulfate, sodium lauryl sulfate, sodium laureth sulfate, sodium myreth sulfate, perfluorooctanesulfonate, perfluorobutanesulfonate), sulfosuccinates (e.g., dioctyl sodium sulfosuccinate), ethers (e.g., alkyl-aryl ether phosphates, alkyl ether phosphates), sodium stearate, sodium lauroyl sarcosinate, perfluorononanoate, and perfluorooctanoate. Non-limiting examples of suitable non-ionic surfactants include Surfynol 440, Surfynol 2502, Surfynol 604, Thetawet TS 8230, and Thetawet FS-8150, polyoxyl 35 castor oil, lauryldimethylamine oxide, Triton X-100, and Dynol 604.

In some embodiments, a binder composition comprises a surfactant or combination of surfactants that make up greater than or equal to 0 wt %, greater than or equal to 0.01 wt %, greater than or equal to 0.02 wt %, greater than or equal to 0.05 wt %, greater than or equal to 0.075 wt %, greater than or equal to 0.1 wt %, greater than or equal to 0.2 wt %, greater than or equal to 0.3 wt %, greater than or equal to 0.4 wt %, greater than or equal to 0.5 wt %, greater than or equal to 0.6 wt %, greater than or equal to 0.7 wt %, greater than or equal to 0.8 wt %, or greater than or equal to 0.9 wt % of the binder composition. In some embodiments, a binder composition comprises a surfactant or combination of surfactants that make up less than or equal to 1 wt %, less than or equal to 0.9 wt %, less than or equal to 0.8 wt %, less than or equal to 0.7 wt %, less than or equal to 0.6 wt %, less than or equal to 0.5 wt %, less than or equal to 0.4 wt %, less than or equal to 0.3 wt %, less than or equal to 0.2 wt %, less than or equal to 0.1 wt %, less than or equal to 0.075 wt %, less than or equal to 0.05 wt %, less than or equal to 0.02 wt %, or less than or equal to 0.01 wt % of the binder composition. Combinations of the above-referenced ranges are also possible (e.g., greater than or equal to 0 wt % and less than or equal to 1 wt %, greater than or equal to 0.01 wt % and less than or equal to 1 wt %, greater than or equal to 0.01 wt % and less than or equal to 0.05 wt %, greater than or equal to 0.1 wt % and less than or equal to 1 wt %, greater than or equal to 0.1 wt % and less than or equal to 0.5 wt %, or greater than or equal to 0.5 wt % and less than or equal to 1 wt %). Other ranges are also possible. It should be understood that a single surfactant may be present in a binder composition in one or more of the above-referenced ranges (e.g., that further comprises other, different surfactants or that lacks other, different surfactants) and/or the total amount of surfactant in a binder composition may be in one or more of the above-referenced ranges.

In some embodiments, a binder composition comprises one or more biocide(s). The biocide(s) may inhibit the growth of biological species (e.g., bacteria, yeast, fungi) in the binder composition during storage and/or inhibit enzymatic degradation of a polymer in the binder composition during storage. Without wishing to be bound by any particular theory, it is believed that biologically-derived polymers, such as chitosan and gelatin, may be particularly susceptible to such degradation.

Binder compositions described herein may comprise one or more biocides that are microbicides and/or one or more biocides that are fungicides. In some embodiments, a binder composition comprises a biocide that is an isothiazolinone, such as ProxelGXL, 1,2-benzisothiazolin-3-one, 4,5-Dichloro-2-octyl-4-isothiazolin-3-one, and 2-n-Octyl-4-Isothiazolin-3-One. Further examples of suitable biocides include 3-(3,4-dichlorophenyl)-1,1-dimethylure, 2-bromo-2-nitropropane-1,3-diol, lauryldimethylamine oxide, benzalkonium chloride, and/or rotenone.

In some embodiments, a binder composition comprises a biocide or combination of biocides that make up greater than or equal to 0 wt %, greater than or equal to 0.01 wt %, greater than or equal to 0.02 wt %, greater than or equal to 0.05 wt %, greater than or equal to 0.075 wt %, greater than or equal to 0.1 wt %, greater than or equal to 0.15 wt %, or greater than or equal to 0.2 wt % of the binder composition. In some embodiments, a binder composition comprises a biocide or combination of biocides that make up less than or equal to 0.25 wt %, less than or equal to 0.2 wt %, less than or equal to 0.15 wt %, less than or equal to 0.1 wt %, less than or equal to 0.075 wt %, less than or equal to 0.05 wt %, less than or equal to 0.02 wt %, or less than or equal to 0.01 wt % of the binder composition. Combinations of the above-referenced ranges are also possible (e.g., greater than or equal to 0 wt % and less than or equal to 0.25 wt %). Other ranges are also possible. It should also be understood that a single biocide may be present in a binder composition in one or more of the above-referenced ranges (e.g., that further comprises other, different biocides or that lacks other, different biocides) and/or the total amount of biocide in a binder composition may be in one or more of the above-referenced ranges.

In some embodiments, a binder composition comprises one or more humectants. Non-limiting examples of suitable humectants include alcohols (e.g., mono- or multifunctional alcohols), ethers, lactones, lactams (e.g., substituted lactams, unsubstituted lactams), amides, amines, sulfones, sulfoxides, sulfides, carbonates, and carbamates. Further non-limiting examples of suitable humectants include 1,3-propanediol, 1,4-butanediol, 1,4-cyclohexanedimethanol, 1,5-pentanediol, 1,6-hexanediol, 1,2-hexanediol, 1,8-octanediol, 1,2-propanediol, 1,2-butanediol, 1,3-butanediol, 2,3-butanediol, ethylene glycol, diethylene glycol, triethylene glycol, tetraethylene glycol, poly(ethylene glycol) having a weight average molecular weight of less than 2000 Da, dipropylene glycol, propylene glycol, polypropylene glycol having weight average molecular weight less than 2000, glycerol, 1,2,6-hexanetriol, sorbitol, 2-pyrrolidone, 1-methyl-2-pyrrolidone, 1-methyl-2-piperidone, N-ethylacetamide, N-methlpropionamide, N-acetyl ethanolamine, N-methylacetamide, formamide, 3-amino-1,2-propanediol, 2,2-thiodiethanol, 3,3-thiodipropanol, tetramethylene sulfone, butadiene sulfone, ethylene carbonate, butyrolacetone, tetrahydrofurfuryl alcohol, glycerol, 1,2,4-butenetriol, trimethylpropane, pantothenol, urea, biuret, triethanolamine, and diethanolamine.

In some embodiments, a binder composition comprises a humectant or combination of humectants that makes up less than or equal to 30 wt %, less than or equal to 25 wt %, less than or equal to 20 wt %, less than or equal to 17.5 wt %, less than or equal to 15 wt %, less than or equal to 12.5 wt %, less than or equal to 10 wt %, less than or equal to 7.5 wt %, less than or equal to 5 wt %, less than or equal to 2.5 wt %, or less than or equal to 1 wt % of the binder composition. In some embodiments, a binder composition comprises a humectant or combination of humectants that makes up greater than or equal to 0 wt %, greater than or equal to 1 wt %, greater than or equal to 2.5 wt %, greater than or equal to 5 wt %, greater than or equal to 7.5 wt %, greater than or equal to 10 wt %, greater than or equal to 12.5 wt %, greater than or equal to 15 wt %, greater than or equal to 17.5 wt %, greater than or equal to 20 wt %, or greater than or equal to 25 wt % of the binder composition. Combinations of the above-referenced ranges are also possible (e.g., less than or equal to 30 wt % and greater than or equal to 0 wt %). Other ranges are also possible. It should also be understood that a single humectant may be present in a binder composition in one or more of the above-referenced ranges (e.g., that further comprises other, different humectants or that lacks other, different humectants) and/or the total amount of humectant in a binder composition may be in one or more of the above-referenced ranges.

As described above, in some embodiments, a binder composition is provided in a container configured to resist corrosion by the binder composition. For example, the container may comprise a corrosion-resistant material arranged within the container. The container may be designed such that any binder material it contains is only in contact with the corrosion-resistant material during long term storage (e.g., the corrosion-resistant material may cover the inner portions of the container that would be exposed to the binder composition when the container is sealed and/or stored). In some embodiments, the container is designed such that any binder material it contains or dispenses is only in contact with the corrosion-resistant material (e.g., the corrosion-resistant material may cover all portions of the container which the binder composition is configured to contact during storage thereof and dispensing thereof). The container may further comprise a material that is not corrosion-resistant. This material may be positioned in portions of the container with which the binder is not in contact during storage and/or dispensing.

Figure 8A:
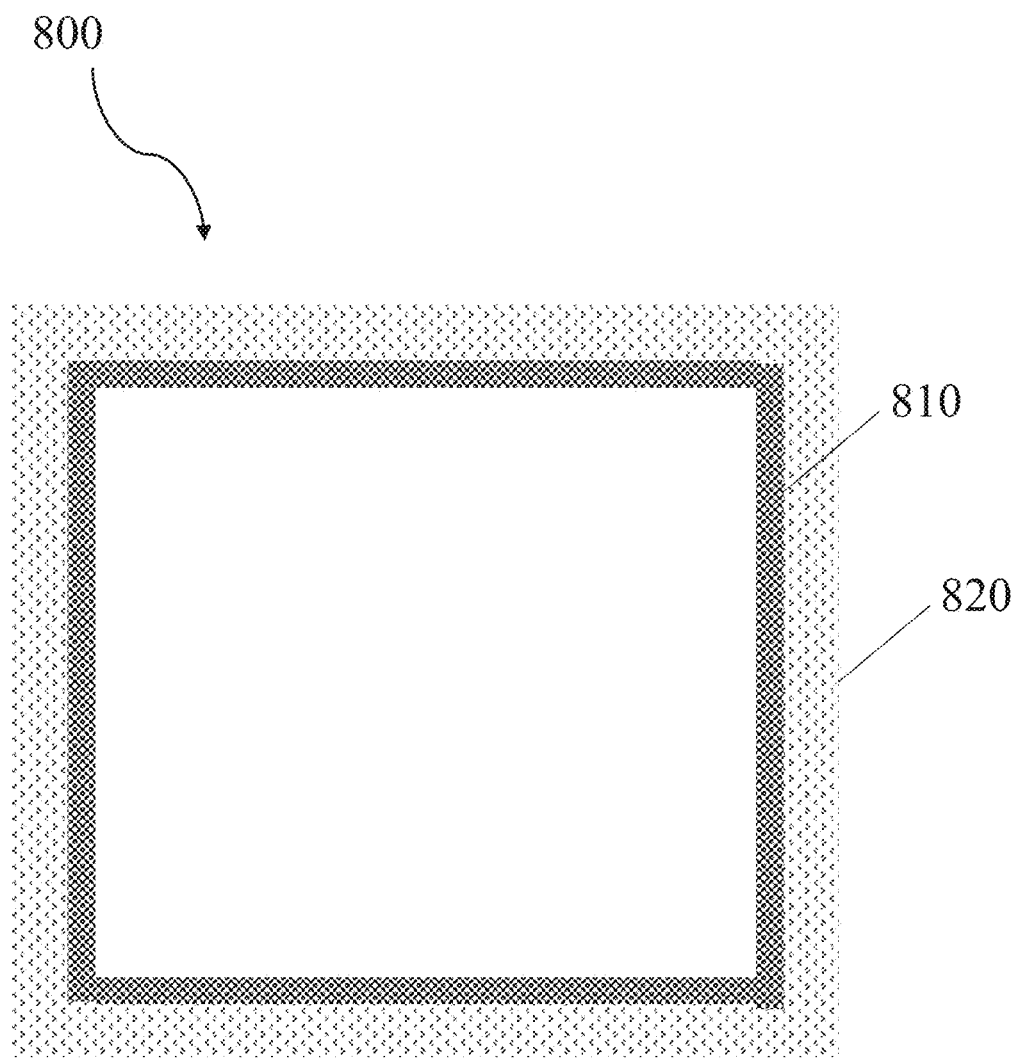
FIG. 8A shows one non-limiting embodiment of a container configured to resist corrosion by a binder composition, in accordance with some embodiments.
Figure 8B:
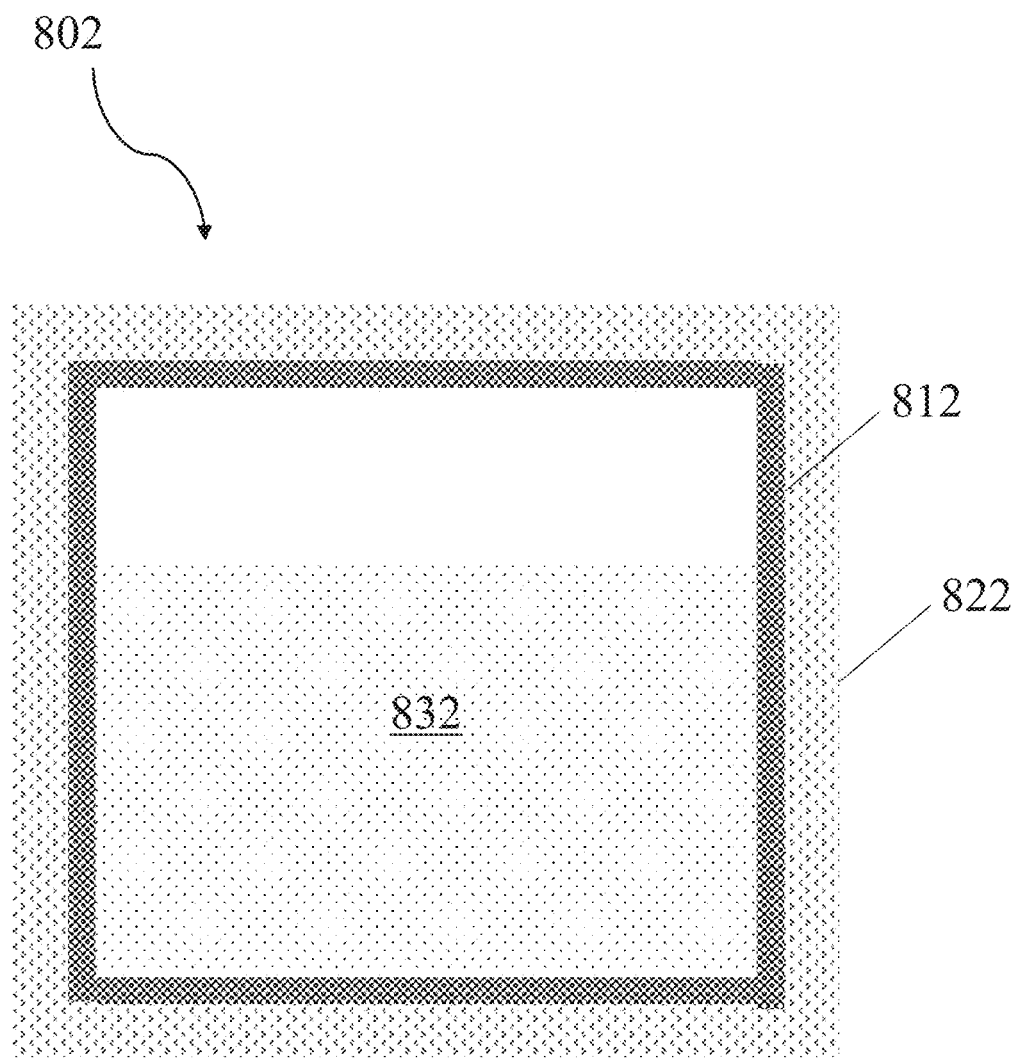
FIG. 8B shows another non-limiting embodiment of a container configured to resist corrosion by a binder composition, in accordance with some embodiments.

FIG. 8A shows one non-limiting embodiment of a container configured to resist corrosion by a binder composition. In FIG. 8A, a container 800 comprises a corrosion-resistant material 810 arranged within the container. The container 800 also comprises a material 820 that is not corrosion-resistant material and on which the corrosion-resistant material is disposed. In some embodiments, like the embodiment shown in FIG. 8B, a container like that shown in FIG. 8A may contain and/or be configured to contain a binder composition. In FIG. 8B, a container 802 comprises a binder composition 832. The binder composition may be a composition that is not corrosive to the corrosion-resistant material 812 with which it is in contact and/or may be a composition that is corrosive to the material 822 on which the corrosion-resistant material 812 is disposed.

Figure 8C:
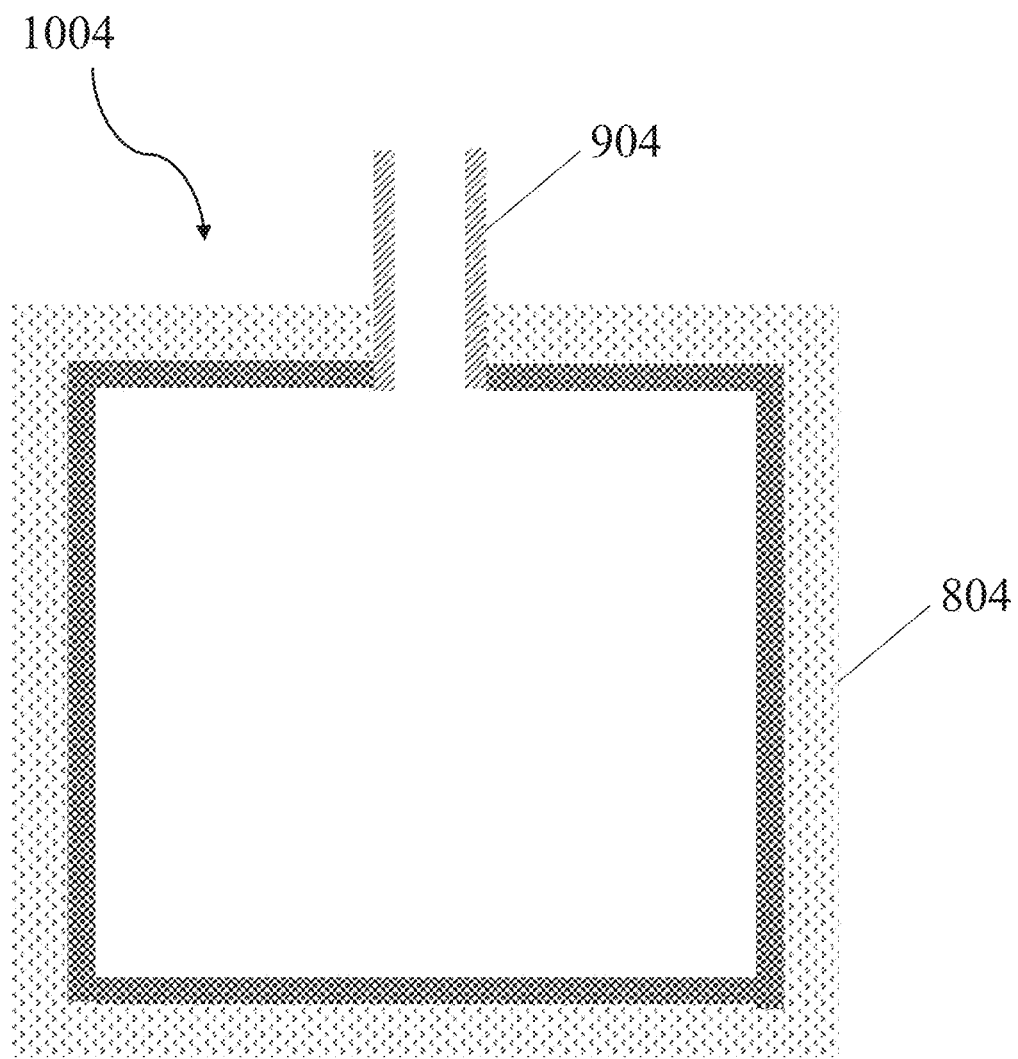
FIG. 8C shows one non-limiting example of an article for supplying a binder composition to an on-demand printing system.

In some embodiments, a container comprising a corrosion-resistant material arranged therein is one part of an article for supplying a binder composition to an additive manufacturing system. The article may further comprise one or more additional components. For instance, the article may comprise an interfacing component configured to interface with an additive manufacturing system. The interfacing component may be configured to do so by removably engaging with the additive manufacturing printing system. By way of example, the interfacing component may comprise one or more portions that can be reversibly attached to the additive manufacturing system, such as a barbed fitting and/or tubing. In some embodiments, an interfacing component may also be coupled to the container. The coupling may be permanent (e.g., the interfacing component may be integrally connected to the container and/or may require specialized tools to be removed from the container) or may be reversible (e.g., the interfacing component may be coupled to the container by a barbed fitting and/or tubing). FIG. 8C shows one non-limiting example of an article 1004 for supplying a binder composition to an on-demand printing system comprising a container 804 and an interfacing component 904.

Portions of articles for supplying a binder composition to an on-demand printing system may comprise a variety of suitable materials. For instance, in some embodiments, a corrosion-resistant material arranged therein may comprise poly(ethylene) and/or an epoxy phenolic polymer. A container in which the corrosion-resistant material is arranged may comprise a metal, such as steel.

As described above, some embodiments relate to metal-based composite structures comprising a metal powder and some embodiments relate to methods of forming such structures. Further details regarding such metal powders are provided below.

In some embodiments, a metal powder comprises a plurality of particles having a chemical composition that results in the formation of metal objects having a desirable chemical composition. For instance, the metal powder may comprise a plurality of particles comprising a material that it is desirable for a metal object to comprise and/or be formed from.

In some embodiments, a metal powder comprises a plurality of metal particles (i.e., a plurality of particles comprising a metal alloy). Non-limiting examples of suitable metal alloys include ferric alloys, such as steels. Non-limiting examples of steels include stainless steels (e.g., 17-4 PH stainless steel, 316 stainless steel, 260L stainless steel) and low alloy steels (e.g., 4140 low alloy steel, H13 low alloy steel).

In some embodiments, a metal powder comprises a plurality of particles comprising a metal alloy comprising chromium (e.g., an alloy comprising iron and chromium). Chromium may make up greater than or equal to 0 wt %, greater than or equal to 0.1 wt %, greater than or equal to 0.2 wt %, greater than or equal to 0.5 wt %, greater than or equal to 0.8 wt %, greater than or equal to 0.9 wt %, greater than or equal to 1 wt %, greater than or equal to 1.25 wt %, greater than or equal to 1.5 wt %, greater than or equal to 1.75 wt %, greater than or equal to 2 wt %, greater than or equal to 5 wt %, greater than or equal to 7.5 wt %, greater than or equal to 10 wt %, greater than or equal to 12.5 wt %, or greater than or equal to 15 wt % of the metal alloy. Chromium may make up less than or equal to 17.5 wt %, less than or equal to 15 wt %, less than or equal to 12.5 wt %, less than or equal to 10 wt %, less than or equal to 7.5 wt %, less than or equal to 5 wt %, less than or equal to 2 wt %, less than or equal to 1.75 wt %, less than or equal to 2.5 wt %, less than or equal to 1.25 wt %, less than or equal to 1 wt %, less than or equal to 0.9 wt %, less than or equal to 0.8 wt %, less than or equal to 0.5 wt %, less than or equal to 0.2 wt %, or less than or equal to 0.1 wt % of the metal alloy. Combinations of the above-referenced ranges are also possible (e.g., greater than or equal to 0 wt % and less than or equal to 17.5 wt %, greater than or equal to 0.8 wt % and less than or equal to 17.5 wt %, greater than or equal to 0.8 wt % and less than or equal to 1.1 wt %, or greater than or equal to 15 wt % and less than or equal to 17.5 wt %). Other ranges are also possible. The chromium content of a metal alloy may be determined in accordance with ASTM E1086-08.

In some embodiments, a metal powder comprises a plurality of particles comprising a metal alloy comprising carbon (e.g., an alloy comprising iron and carbon). Carbon may make up greater than or equal to 0 wt %, greater than or equal to 0.01 wt %, greater than or equal to 0.02 wt %, greater than or equal to 0.03 wt %, greater than or equal to 0.05 wt %, greater than or equal to 0.07 wt %, greater than or equal to 0.1 wt %, greater than or equal to 0.15 wt %, greater than or equal to 0.2 wt %, greater than or equal to 0.25 wt %, greater than or equal to 0.3 wt %, greater than or equal to 0.35 wt %, greater than or equal to 0.38 wt %, or greater than or equal to 0.39 wt % of the metal alloy. Carbon may make up less than or equal to 0.4 wt %, less than or equal to 0.39 wt %, less than or equal to 0.38 wt %, less than or equal to 0.35 wt %, less than or equal to 0.3 wt %, less than or equal to 0.25 wt %, less than or equal to 0.2 wt %, less than or equal to 0.15 wt %, less than or equal to 0.1 wt %, less than or equal to 0.07 wt %, less than or equal to 0.05 wt %, less than or equal to 0.03 wt %, less than or equal to 0.02 wt %, or less than or equal to 0.01 wt % of the metal alloy. Combinations of the above-referenced ranges are also possible (e.g., greater than or equal to 0 wt % and less than or equal to 0.4 wt %, greater than or equal to 0 wt % and less or equal to 0.07 wt %, or greater than or equal to 0.38 wt % and less than or equal to 0.4 wt %). Other ranges are also possible. The carbon content of a metal alloy may be determined in accordance with ASTM E1086-08.

Further examples of elements that may be included in metal alloys suitable for use in the metal powders described herein include, but are not limited to, aluminum (which may make up, e.g., greater than or equal to 0.95 wt % and less than or equal to 1.30 wt % of the metal alloy), boron (which may make up, e.g., greater than or equal to 0.001 wt % and less than or equal to 0.003 wt % of the metal alloy), cobalt (which may make up, e.g., greater than or equal to 0 wt % and less than or equal to 8 wt % of the metal alloy), copper (which may make up, e.g., greater than or equal to 0 wt % and less than or equal to 5 wt % of the metal alloy), manganese (which may make up, e.g., greater than or equal to 0 wt % and less than or equal to 12 wt % of the metal alloy), molybdenum (which may make up, e.g., greater than or equal to 0.2 wt % and less than or equal to 5 wt % of the metal alloy), nickel (which may make up, e.g., greater than or equal to 2 wt % and less than or equal to 20 wt % of the metal alloy), phosphorus (which may be present in trace amounts and/or make up, e.g., greater than or equal to 0 wt % and less than or equal to 0.05 wt % of the metal alloy), silicon (which may make up, e.g., greater than or equal to 0.2 wt % and less than or equal to 2 wt % of the metal alloy), vanadium (which may make up, e.g., greater than or equal to 0 wt % and less than or equal to 5 wt % of the metal alloy), tungsten (which may make up, e.g., greater than or equal to 0 wt % and less than or equal to 18 wt % of the metal alloy), and zirconium (which may make up, e.g., approximately 0.1 wt % of the metal alloy). The amount of each of the above-referenced elements in a metal alloy may be determined in accordance with ASTM E1086-08.

The metal powders described herein may comprise a plurality of metal particles have a variety of suitable sizes. In some embodiments, a metal powder may comprise a plurality of particles having a size suitable for the formation of metal objects by additive manufacturing methods (e.g., that have good flow behavior and/or are suitable for sintering). For instance, the plurality of particles may have an advantageous value of D50 (i.e., an advantageous median particle size). In some embodiments, the plurality of particles has a D50 of greater than or equal to 5 microns, greater than or equal to 7 microns, greater than or equal to 10 microns, greater than or equal to 12.5 microns, greater than or equal to 15 microns, greater than or equal to 20 microns, greater than or equal to 25 microns, greater than or equal to 30 microns, greater than or equal to 35 microns, greater than or equal to 40 microns, or greater than or equal to 45 microns. In some embodiments, the plurality of particles has a D50 of less than or equal to 50 microns, less than or equal to 45 microns, less than or equal to 40 microns, less than or equal to 35 microns, less than or equal to 30 microns, less than or equal to 25 microns, less than or equal to 20 microns, less than or equal to 15 microns, less than or equal to 12.5 microns, less than or equal to 10 microns, or less than or equal to 7 microns. Combinations of the above-referenced ranges are also possible (e.g., greater than or equal to 5 microns and less than or equal to 50 microns, or greater than or equal to 7 microns and less than or equal to 20 microns). Other ranges are also possible. The D50 of a plurality of particles may be determined in accordance with ASTM E2651-13.

As described above, certain embodiments relate to methods of additive manufacturing by binder jet printing. Further details regarding such embodiments and the articles produced by methods of additive manufacturing are provided below.

As also described above, some methods of additive manufacturing comprise depositing a binder composition on a layer of metal powder. The layer of metal powder may be a layer that comprises a plurality of particles that are not adhered together. For instance, the metal particles in a layer of metal powder may be readily separated from each other by the application of minimal amounts of force, such as the application of forces present during typical processes of depositing a layer of metal powder and/or the application of gravity.

When present, layers of metal powder may have a variety of suitable thicknesses. In some embodiments, a layer of metal powder has a thickness of greater than or equal to 25 microns, greater than or equal to 30 microns, greater than or equal to 35 microns, greater than or equal to 40 microns, greater than or equal to 45 microns, greater than or equal to 50 microns, greater than or equal to 60 microns, greater than or equal to 70 microns, greater than or equal to 80 microns, or greater than or equal to 90 microns. In some embodiments, a layer of metal powder has a thickness of less than or equal to 100 microns, less than or equal to 90 microns, less than or equal to 80 microns, less than or equal to 70 microns, less than or equal to 60 microns, less than or equal to 50 microns, less than or equal to 45 microns, less than or equal to 40 microns, less than or equal to 35 microns, or less than or equal to 30 microns. Combinations of the above-referenced ranges are also possible (e.g., greater than or equal to 25 microns and less than or equal to 100 microns). Other ranges are also possible.

Once a layer of metal powder has been deposited, deposition of a binder composition thereon may occur (e.g., by means of a print head, such as an ink jet print head, that ejects a plurality of droplets) at a variety of suitable velocities. In some embodiments, the binder composition is deposited at a velocity of greater than or equal to 3 m/s, greater than or equal to 4 m/s, greater than or equal to 5 m/s, greater than or equal to 6 m/s, greater than or equal to 7 m/s, greater than or equal to 8 m/s, greater than or equal to 9 m/s, greater than or equal to 10 m/s, or greater than or equal to 11 m/s. In some embodiments, the binder composition is deposited at a velocity of less than or equal to 12 m/s, less than or equal to 11 m/s, less than or equal to 10 m/s, less than or equal to 9 m/s, less than or equal to 8 m/s, less than or equal to 7 m/s, less than or equal to 6 m/s, less than or equal to 5 m/s, or less than or equal to 4 m/s. Combinations of the above-referenced ranges are also possible (e.g., greater than or equal to 3 m/s and less than or equal to 12 m/s greater than or equal to 6 m/s and less than or equal to 12 m/s). Other ranges are also possible. Binder composition velocity may be measured using a high speed camera, or a stroboscope/camera apparatus, with imaging software as described in the Examples. The velocity may be measured when droplets of the binder composition are 0.5 mm from the orifice of the print head from which they are ejected.

In some embodiments, a binder composition is deposited in the form of droplets. For instance, in some embodiments, a step of depositing a binder composition on layer of metal powder comprises producing a droplet of the binder composition and depositing the droplet of the binder composition on the layer of metal powder. When produced, droplets may have a variety of suitable volumes. In some embodiments, a method comprises producing a droplet having a volume of greater than or equal to 0.5 pL, greater than or equal to 0.75 pL, greater than or equal to 1 pL, greater than or equal to 1.5 pL, greater than or equal to 2 pL, greater than or equal to 3 pL, greater than or equal to 5 pL, greater than or equal to 7.5 pL, greater than or equal to 10 pL, greater than or equal to 12 pL, greater than or equal to 15 pL, greater than or equal to 20 pL, greater than or equal to 25 pL, greater than or equal to 30 pL, or greater than or equal to 35 pL. In some embodiments, a method comprises producing a droplet having a volume of less than or equal to 40 pL, less than or equal to 35 pL, less than or equal to 30 pL, less than or equal to 25 pL, 20 pL, less than or equal to 15 pL, less than or equal to 12 pL, less than or equal to 10 pL, less than or equal to 7.5 pL, less than or equal to 5 pL, less than or equal to 3 pL, less than or equal to 2 pL, less than or equal to 1.5 pL, less than or equal to 1 pL, or less than or equal to 0.75 pL. Combinations of the above-referenced ranges are also possible (e.g., greater than or equal to 0.5 pL and less than or equal to 40 pL, greater than or equal to 0.5 pL and less than or equal to 20 pL, greater than or equal to 0.5 pL and less than or equal to 2 pL, greater than or equal to 2 pL and less than or equal to 20 pL, or greater than or equal to 2 pL and less than or equal to 12 pL). Other ranges are also possible. Droplet volume may be measured using a high speed camera, or a stroboscope/camera apparatus, with imaging software as described in the examples. It should also be understood that some methods may comprise producing a plurality of droplets comprising one or more droplets having a volume in one or more of the above-referenced ranges and that some methods may comprise producing a plurality of droplets having an average volume in one or more of the above-referenced ranges.

In some embodiments in which a plurality of droplets of a binder composition are produced, they may be produced in a manner such that they have a relatively uniform volume. Production of droplets with relatively uniform volumes may enhance the precision with which features in a composite layer can be formed, as it may allow more control over the amount and location of the binder composition in the composite layer by reducing the amount of unwanted droplets and/or droplets of unwanted volumes. Volume uniformity may enhance control over the volumetric ratio of the binder composition to the metal powder on which it is deposited, which may promote better control over the properties of the metal object fabricated therefrom.

In some embodiments, a plurality of droplets comprises almost exclusively main droplets and very few satellite droplets. In other words, the binder composition may form droplets in a manner that does not substantially form satellite droplets. The satellite droplets may be droplets having a smaller volume than the main droplets. In some embodiments, satellite droplets have a volume of less than or equal to 1.5 pL, less than or equal to 1 pL, or less than or equal to 0.5 pL. For instance, in some embodiments, less than 1% of the droplets within a plurality of droplets are satellite droplets (e.g., less than 1% of the droplets have a volume of less than or equal to 1.5 pL, less than or equal to 1 pL, or less than or equal to 0.5 pL when the main droplets have a volume of greater than or equal to 0.5 pL, greater than or equal to 1 pL, or greater than or equal to 1.5 pL). In some embodiments, a plurality of droplets comprises exclusively main droplets and no satellite droplets and/or a binder formulation forms droplets in a manner that does not form satellite droplets. The presence of satellite droplets, and their amount, may be determined by using the technique described for measuring droplet volume described above.

Droplets of a binder composition may be produced in a variety of suitable manners. In some embodiments, one or more droplets of a binder composition are produced by a print head, such as a piezoelectric print head or a thermal print head. Without wishing to be bound by any particular theory, it is believed that piezoelectric print heads may be configured to form larger droplets comprising a binder composition than thermal print heads (e.g., piezoelectric print heads may be configured to form droplets having volumes of greater than or equal to 2 pL and less than or equal to 20 pL, while thermal print heads may be configured to form droplets having volumes of greater than or equal to 0.5 pL and less than or equal to 2 pL). Non-limiting examples of suitable print heads include SAMBA (FujiFilm Co.), SG-1024 (Fujifilm Co.), XAAR 5601 (XAAR, plc), VersaPass (Memjet), Duralink (Memjet), and Duraflex (Memjet).

As described above, certain embodiments relate to three-dimensional compositions. The three-dimensional compositions may include a metal powder and a binder composition. The binder composition may comprise one or more of the components described elsewhere herein with respect to binder compositions (e.g., water, a polymer including an acrylic acid repeat unit, a cross-linking agent, and/or a pH modifier).

As described above, certain embodiments relate to the drying and/or cross-linking of a binder composition and certain embodiments relate to metal-based composite structures formed by the drying and/or cross-linking of a binder composition positioned in a three-dimensional composition. Further details regarding such embodiments are provided below.

As also described above, the drying and/or cross-linking of a binder composition may be accomplished by exposing the binder composition to a stimulus that is heat. The temperature to which the binder composition is heated may be sufficient to dry and/or cross-link the binder composition without appreciably degrading the portion(s) of the binder composition, if any, configured to remain in the metal-based composite structure during this step (e.g., a polymer). In some embodiments, drying and/or cross-linking a binder composition comprises heating an environment in which a three-dimensional composition is positioned to a temperature of greater than or equal to 90° C., greater than or equal to 100° C., greater than or equal to 110° C., greater than or equal to 120° C., greater than or equal to 130° C., greater than or equal to 140° C., greater than or equal to 150° C., greater than or equal to 160° C., greater than or equal to 170° C., greater than or equal to 180° C., greater than or equal to 190° C., greater than or equal to 200° C., greater than or equal to 210° C., greater than or equal to 220° C., greater than or equal to 230° C., or greater than or equal to 240° C. In some embodiments, drying and/or cross-linking a binder composition comprises heating an environment in which the three-dimensional composition is positioned to a temperature of less than or equal to 250° C., less than or equal to 240° C., less than or equal to 230° C., less than or equal to 220° C., less than or equal to 210° C., less than or equal to 200° C., less than or equal to 190° C., less than or equal to 180° C., less than or equal to 170° C., less than or equal to 160° C., less than or equal to 150° C., less than or equal to 140° C., less than or equal to 130° C., less than or equal to 120° C., or less than or equal to 100° C. Combinations of the above-referenced ranges are also possible (e.g., greater than or equal to 90° C. and less than or equal to 250° C., greater than or equal to 120° C. and less than or equal to 220° C.). Other temperatures are also possible. The temperature of an environment may be determined by use of a thermocouple positioned in the environment.

Non-limiting examples of suitable environments in which a three-dimensional composition may be positioned during drying and/or heating of the binder composition include an oven, a furnace, a powder bed. The relevant environment may comprise a variety of suitable types of gases. By way of example, the relevant environment may comprise air, may comprise hydrogen, and/or may comprise an inert gas (e.g., nitrogen, argon). In some embodiments, the relevant environment may lack species that are reactive at the temperature to which the environment is heated. By way of example, the relevant environment may be an inert environment (e.g., it may comprise, consist essentially of, and/or consist of an inert gas such as nitrogen and/or argon). The pressure of the relevant environment may generally be selected as desired. Some relevant environments may be at atmospheric pressure; some may be at a pressure less than atmospheric pressure.

Drying and/or heating a three-dimensional composition may be performed for a variety of suitable amounts of time. The time may be selected to provide a desired level of drying and/or cross-linking of the binder composition. By way of example, if a light level of drying and/or cross-linking is desired, a drying and/or cross-linking step may be performed for a relatively short time. Similarly, if a relatively high level of drying and/or cross-linking is desired, a drying and/or cross-linking step may be performed for a relatively long time. In some embodiments, a drying and/or cross-linking step comprises heating an environment in which a three-dimensional composition is positioned for a time period of greater than or equal to 15 minutes, greater than or equal to 30 minutes, greater than or equal to 45 minutes, greater than or equal to 1 hour, greater than or equal to 90 minutes, greater than or equal to 2 hours, greater than or equal to 3 hours, greater than or equal to 4 hours, greater than or equal to 5 hours, greater than or equal to 6 hours, greater than or equal to 8 hours, greater than or equal to 10 hours, greater than or equal to 12 hours, greater than or equal to 14 hours, greater than or equal to 16 hours, greater than or equal to 18 hours, greater than or equal to 20 hours, greater than or equal to 1 day, greater than or equal to 2 days, greater than or equal to 3 days, greater than or equal to 4 days, greater than or equal to 100 hours, greater than or equal to 5 days, or greater than or equal to 6 days. In some embodiments, a drying and/or cross-linking step comprises heating an environment in which a three-dimensional composition is positioned for a time period of less than or equal to 1 week, less than or equal to 6 days, less than or equal to 5 days, less than or equal to 100 hours, less than or equal to 4 days, less than or equal to 3 days, less than or equal to 2 days, less than or equal to 1 day, less than or equal to 20 hours, less than or equal to 18 hours, less than or equal to 16 hours, less than or equal to 14 hours, less than or equal to 12 hours, less than or equal to 10 hours, less than or equal to 8 hours, less than or equal to 6 hours, less than or equal to 5 hours, less than or equal to 4 hours, less than or equal to 3 hours, less than or equal to 140 minutes, less than or equal to 120 minutes, or less than or equal to 100 minutes. Combinations of the above-referenced ranges are also possible (e.g., greater than or equal to 15 minutes and less than or equal to 6 days, greater than or equal to 15 minutes and less than or equal to 120 minutes, or greater than or equal to 45 minutes and less than or equal to 120 minutes). Other ranges are also possible.

In some embodiments, drying and/or heating a three-dimensional composition comprises heating the environment in which the three-dimensional composition is positioned to one temperature in one or more of the above-referenced ranges and holding the temperature of the environment thereat for an amount of time in one of the above-referenced ranges. In some embodiments, drying and/or heating a three-dimensional composition comprises heating an environment in which the three-dimensional composition is positioned to two or more temperatures in the above-referenced ranges sequentially and holding the temperature of the environment at each of the two or more temperatures. In such embodiments, the relevant environment may be held at each of the relevant temperatures for a period of time in one or more of the above-referenced ranges and/or may be heated such that the total time it is held at all of the relevant temperatures is in one or more of the above-referenced ranges.

In some embodiments, drying and/or heating a three-dimensional composition is performed in a manner that minimizes the tendency of the three-dimensional object to form cracks. For instance, drying and/or heating a three-dimensional composition may be performed in a manner such that changes between temperatures are performed relatively slowly. In some embodiments, drying and/or heating a three-dimensional composition is performed such that the change in temperature of the environment in which the three-dimensional object is positioned is less than or equal to 2° C./min, less than or equal to 1.5° C./min, less than or equal to 1° C./min, at less than or equal to 0.75° C./min, less than or equal to 0.5° C./min, or less than or equal to 0.25° C./min. In some embodiments, drying and/or heating a three-dimensional composition is performed such that that the change in temperature of the environment in which the three-dimensional composition is positioned is greater than or equal to 0.1° C./min, greater than or equal to 0.25° C./min, greater than or equal to 0.5° C./min, greater than or equal to 0.75° C./min, greater than or equal to 1° C./min, greater than or equal to 1.5° C./min. Combinations of the above-referenced ranges are also possible (e.g., greater than or equal to 2° C./min and less than or equal to 0.1° C./min). Other ranges are also possible. In some embodiments, the temperature of the environment in which the three-dimensional composition is positioned is either constant or changes at a rate in one or more of the ranges described above throughout a drying and/or cross-linking process. In some embodiments, a drying and/or cross-linking process comprises a change in temperature at a rate in one or more of the ranges described above but also comprises further changes in temperature (e.g., at a rate in one or more of the ranges described above, at a rate outside of the ranges described above).

As described above, certain embodiments relate to metal-based composite structures. Further details regarding such embodiments are provided below.

In some embodiments, a metal-based composite structure is provided. The metal-based composite structure may comprise a metal powder, one or more components of a binder composition (e.g., a polymer including an acrylic acid repeat unit, a cross-linking agent), and/or one or more reaction products of one or more components of a binder composition (e.g., a cross-linked polymer formed by a reaction of a polymer present in the binder composition with a cross-linking agent present in the binder composition). The components of the binder composition and the reaction products thereof may together form a binder. In some embodiments, the metal powder comprises a plurality of particles is embedded in the binder. For instance, the binder may form a matrix in which the plurality of particles is disposed. As another example, the binder may coat the surfaces of the particles within the plurality of particles and/or the particles within the plurality of particles may be in topological contact with each other through the binder.

In some embodiments, a metal-based composite structure comprises a binder. For instance, the binder may adhere to particles positioned in the composite layer and may have sufficient cohesive strength to form a self-supporting structure in which the particles are embedded.

A metal powder present in a metal-based composite structure may make up any suitable amount thereof. In some embodiments, the metal powder makes up greater than or equal to 92 wt %, greater than or equal to 93 wt %, greater than or equal to 94 wt %, greater than or equal to 95 wt %, greater than or equal to 96 wt %, greater than or equal to 97 wt %, greater than or equal to 98 wt %, greater than or equal to 99 wt %, or greater than or equal to 99.5 wt % of the metal-based composite structure. In some embodiments, the metal powder makes up less than or equal to 99.9 wt %, less than or equal to 99.5 wt %, less than or equal to 99 wt %, less than or equal to 98 wt %, less than or equal to 97 wt %, less than or equal to 96 wt %, less than or equal to 95 wt %, less than or equal to 94 wt %, or less than or equal to 93 wt % of the metal-based composite structure. Combinations of the above-referenced ranges are also possible (e.g., greater than or equal to 92 wt % and less than or equal to 99.9 wt %, or greater than or equal to 96 wt % and less than or equal to 99.9 wt %). Other ranges are also possible.

The metal-based composite structures described herein may have advantageously have relatively high transverse flexural strengths. Desirably, high values of transverse flexural strength may reduce the tendency of metal-based composite structures to fail during further additive manufacturing steps. In some embodiments, a metal-based composite structure has a transverse flexural strength of greater than or equal to 1 MPa, greater than or equal to 2 MPa, greater than or equal to 5 MPa, greater than or equal to 7.5 MPa, greater than or equal to 10 MPa, greater than or equal to 20 MPa, greater than or equal to 50 MPa, greater than or equal to 75 MPa, greater than or equal to 100 MPa, or greater than or equal to 125 MPa. In some embodiments, a metal-based composite structure has a transverse flexural strength of less than or equal to 150 MPa, less than or equal to 125 MPa, less than or equal to 100 MPa, less than or equal to 75 MPa, less than or equal to 50 MPa, less than or equal to 20 MPa, less than or equal to 10 MPa, less than or equal to 7.5 MPa, less than or equal to 5 MPa, or less than or equal to 2 MPa. Combinations of the above-referenced ranges are also possible (e.g., greater than or equal to 1 MPa and less than or equal to 150 MPa, or greater than or equal to 2 MPa and less than or equal to 150 MPa). Other ranges are also possible.

The transverse flexural strength of a metal-based composite structure may be the transverse flexural strength as determined by the three-point bending test described in ASTM B312-14 and/or may be the transverse flexural strength as determined by the four-point bending test described in ASTM C1161-18. In other words, some metal-based composite structures may have transverse flexural strengths as determined by the three-point bending test described in ASTM B312-14 in one or more of the above-referenced ranges, some metal-based composite structures may have transverse flexural strengths as determined by the four-point bending test described in ASTM C1161-18 in one or more of the above-referenced ranges, and some metal-based composite structures may have transverse flexural strengths as determined by the three-point bending test described in ASTM B312-14 and as determined the four-point bending test described in ASTM C1161-18 in one or more of the above-referenced ranges.

As described above, certain embodiments relate to heating metal-based composite structures. Certain embodiments relate to de-bound metal structures formed by heating metal-based composite structures. Further details regarding such embodiments are provided below.

During this heating process, it may be desirable for the binder and/or binder composition to be removed from the metal-based composite structure. Accordingly, a temperature is typically selected that promotes volatilization (e.g., evaporation, thermal decomposition and/or degradation) of the binder and/or binder composition.

In some embodiments, an environment in which a metal-based composite structure is positioned is heated to a temperature of greater than or equal to 200° C., greater than or equal to 210° C., greater than or equal to 220° C., greater than or equal to 230° C., greater than or equal to 240° C., greater than or equal to 250° C., greater than or equal to 275° C., greater than or equal to 300° C., greater than or equal to 350° C., greater than or equal to 400° C., greater than or equal to 450° C., greater than or equal to 500° C., greater than or equal to 550° C., greater than or equal to 600° C., or greater than or equal to 650° C. In some embodiments, an environment in which a metal-based composite structure is positioned is heated to a temperature of less than or equal to 700° C., less than or equal to 650° C., less than or equal to 600° C., less than or equal to 550° C., less than or equal to 500° C., less than or equal to 400° C., less than or equal to 350° C., less than or equal to 300° C., less than or equal to 275° C., less than or equal to 250° C., less than or equal to 240° C., less than or equal to 230° C., less than or equal to 220° C., or less than or equal to 210° C. Combinations of the above-referenced ranges are also possible (e.g., greater than or equal to 200° C. and less than or equal to 700° C.). Other ranges are also possible. The temperature of an environment may be determined by use of a thermocouple positioned in the environment.

It should be understood that some heating steps may comprise heating a metal-based composite structure to two or more temperatures in sequence. For instance, a heating step may comprise heating a metal-based composite structure to one temperature at which one portion of the binder is expected to degrade (e.g., based on a thermogravimetric analysis performed on the binder) and then heating the metal-based composite structure to another temperature at which another portion of the binder is expected to degrade (e.g., based on a thermogravimetric analysis performed on the binder). These temperatures may be successively increasing (e.g., each temperature to which the metal-based composite structure is heated during the heating step may be higher than the previous temperature to which the metal-based composite structure was heated during the heating step). Some such heating steps may comprise heating the metal-based composite structure to three, four, five, or even more temperatures in sequence. Some or all of the temperatures may be within one or more of the above-described ranges.

In some embodiments, a heating step is performed in a manner that minimizes the tendency of the metal-based composite structure to form cracks. For instance, the heating step may be performed in a manner such that changes between temperatures are accomplished relatively slowly. In some embodiments, a heating step is performed such that the change in temperature of the environment in which the metal-based composite structure is positioned is less than or equal to 2° C./min, less than or equal to 1.5° C./min, less than or equal to 1° C./min, less than or equal to 0.75° C./min, less than or equal to 0.5° C./min, or less than or equal to 0.25° C./min. In some embodiments, a heating step is performed such that that the change in temperature of the environment in which the metal-based composite structure is positioned is greater than or equal to 0.1° C./min, greater than or equal to 0.25° C./min, greater than or equal to 0.5° C./min, greater than or equal to 0.75° C./min, greater than or equal to 1° C./min, or greater than or equal to 1.5° C./min. Combinations of the above-referenced ranges are also possible (e.g., greater than or equal to 2° C./min and less than or equal to 0.1° C./min). Other ranges are also possible. In some embodiments, the temperature of the environment in which the metal-based composite structure is positioned is either constant or changes at a rate in one or more of the ranges described above throughout the heating step. In some embodiments, the heating step comprises a change in temperature at a rate in one or more of the ranges described above but also comprises further changes in temperature (e.g., at a rate in one or more of the ranges described above, at a rate outside of the ranges described above).

A metal-based composite structure may be heated for a variety of suitable amounts of time. In some embodiments, an environment in which a metal-based composite material is positioned is heated for a time period of greater than or equal to 15 minutes, greater than or equal to 30 minutes, greater than or equal to 45 minutes, greater than or equal to 60 minutes, greater than or equal to 100 minutes, greater than or equal to 120 minutes, greater than or equal to 140 minutes, greater than or equal to 2 hours, greater than or equal to 3 hours, greater than or equal to 4 hours, greater than or equal to 4.5 hours, greater than or equal to 5 hours, greater than or equal to 5.5 hours, greater than or equal to 6 hours, greater than or equal to 6.5 hours, greater than or equal to 7 hours, greater than or equal to 7.5 hours, greater than or equal to 8 hours, greater than or equal to 8.5 hours, greater than or equal to 9 hours, greater than or equal to 9.5 hours, greater than or equal to 10 hours, greater than or equal to 12 hours, greater than or equal to 12 hours, greater than or equal to 14 hours, greater than or equal to 18 hours, greater than or equal to 1 day, greater than or equal to 2 days, greater than or equal to 3 days, greater than or equal to 4 days, greater than or equal to 5 days, or greater than or equal to 6 days. In some embodiments, an environment in which a metal-based composite material is positioned is heated for a time period of less than or equal to 1 week, less than or equal to 6 days, less than or equal to 5 days, less than or equal to 4 days, less than or equal to 3 days, less than or equal to 2 days, less than or equal to 1 day, less than or equal to 18 hours, less than or equal to 14 hours, less than or equal to 12 hours, less than or equal to 10 hours, less than or equal to 9.5 hours, less than or equal to 9 hours, less than or equal to 8.5 hours, less than or equal to 8 hours, less than or equal to 7.5 hours, less than or equal to 7 hours, less than or equal to 6.5 hours, less than or equal to 6 hours, less than or equal to 5.5 hours, less than or equal to 5 hours, less than or equal to 4.5 hours, less than or equal to 3 hours, less than or equal to 2 hours, less than or equal to 140 minutes, less than or equal to 120 minutes, or less than or equal to 100 minutes. Combinations of the above-referenced ranges are also possible (e.g., greater than or equal to 15 minutes and less than or equal to 1 week, greater than or equal to 15 minutes and less than or equal to 1 day, or greater than or equal to 4 hours and less than or equal to 10 hours). Other ranges are also possible.

In some embodiments, heating a metal-based composite material comprises heating the environment in which the metal-based composite material is positioned to one temperature in one or more of the above-referenced ranges and holding the temperature of the environment thereat for an amount of time in one of the above-referenced ranges. In some embodiments, heating a metal-based composite material comprises heating an environment in which the metal-based composite is positioned to two or more temperatures in the above-referenced ranges sequentially and holding the temperature of the environment at each of the two or more temperatures. In such embodiments, the relevant environment may be held at each of the relevant temperatures for a period of time in one or more of the above-referenced ranges and/or may be heated such that the total time it is held at all of the relevant temperatures is in one or more of the above-referenced ranges.

Non-limiting examples of suitable environments in which a metal-based composite structure may be positioned during heating include an oven, a furnace, and a powder bed. In some embodiments, during a heating step, the pressure of the environment to which the metal-based composite structure is exposed is set to a full vacuum or a partial vacuum to remove decomposition products from the metal-based composite structure. In some embodiments, the pressure is greater than or equal to $10^{-11}$ bar, greater than or equal to $10^{-10}$ bar, greater than or equal to $10^{-9}$ bar, greater than or equal to $10^{-8}$ bar, greater than or equal to $10^{-7}$ bar, greater than or equal to $10^{-6}$ bar, greater than or equal to $10^{-5}$ bar, greater than or equal to $10^4$ bar, greater than or equal to $10^{-3}$ bar, greater than or equal to $10^{-2}$ bar, greater than or equal to $10^{-1}$ bar, greater than or equal to 1 bar, greater than or equal to 10 bar, greater than or equal to 20 bar, or greater than or equal to 50 bar. In some embodiments, the pressure is less than or equal to 70 bar, less than or equal to 50 bar, less than or equal to 20 bar, less than or equal to 10 bar, less than or equal to 1 bar, less than or equal to $10^{-1}$ bar, less than or equal to $10^{-2}$ bar, less than or equal to $10^{-3}$ bar, less than or equal to $10^4$ bar, less than or equal to $10^{-5}$ bar, less than or equal to $10^{-6}$ bar, less than or equal to $10^{-7}$ bar, less than or equal to $10^{-8}$ bar, less than or equal to $10^{-9}$ bar, or less than or equal to $10^{-10}$ bar. Combinations of the above-referenced ranges are also possible (e.g., greater than or equal to $10^{-11}$ bar and less than or equal to 70 bar, greater than or equal to $10^{-11}$ bar and less than or equal to $10^{-3}$ bar, greater than or equal to $10^{-3}$ bar and less than or equal to 70 bar, greater than or equal to $10^{-3}$ bar and less than or equal to 1 bar, or greater than or equal to $10^{-3}$ bar and less than or equal to $10^{-1}$ bar). Other ranges are also possible. The pressure may be determined by a pressure gauge. In some embodiments, the pressure of the environment to which the metal-based composite structure is exposed is cycled between atmospheric pressure and a pressure in one or more of the above-referenced ranges.

In some embodiments, an environment to which a metal-based composite structure is exposed during a heating step comprises one or more gases. For instance, in some embodiments, the relevant environment may comprise one or more species that are reactive (e.g., with one or more components of the binder) at the temperature to which the environment is heated. By way of example, the relevant environment may be an oxidative environment (e.g., it may comprise air). As another example, the relevant environment may be a reducing environment (e.g., it may comprise hydrogen). In some embodiments, the relevant environment may lack species that are reactive at the temperature to which the environment is heated. By way of example, the relevant environment may be an inert environment (e.g., it may comprise, consist essentially of, and/or consist of an inert gas such as argon).

In some embodiments, an environment in which a metal-based composite structure is positioned during heating comprises a relatively low amount of one or more species (e.g., one or more species reactive with one or more components of the binder). For instance, in some embodiments, an environment in which a metal-based composite structure is heated comprises greater than or equal to 2 wt %, greater than or equal to 4 wt %, greater than or equal to 6 wt %, or greater than or equal to 8 wt % hydrogen. The environment in which the metal-based composite structure is heated may comprise less than or equal to 10 wt %, less than or equal to 8 wt %, less than or equal to 6 wt %, or less than or equal to 4 wt % hydrogen. Combinations of the above-referenced ranges are also possible (e.g., greater than or equal to 2 wt % hydrogen and less than or equal to 10 wt % hydrogen). Other ranges are also possible. For instance, in some embodiments, the environment in which the metal-based composite structure is heated comprises more than 10 wt % hydrogen (e.g., up to 100 wt % hydrogen).

In some embodiments, an environment in which a metal-based composite structure is heated has an oxygen content of at most 10 ppm, at most 8 ppm, at most 6 ppm, at most 4 ppm, at most 2 ppm, or at most 1 ppm. The environment in which a metal-based composite structure is heated may have an oxygen content of at least 0 ppm, at least 1 ppm, at least 2 ppm, at least 4 ppm, at least 6 ppm, or at least 8 ppm. Combinations of the above-referenced ranges are also possible (e.g., greater than or equal to 10 ppm and less than or equal to 0 ppm). Other ranges are also possible. In other embodiments, the metal-based composite structure may be heated in an environment comprising more oxygen (e.g., when heated in air).

De-bound metal structures may advantageously include relatively low levels of certain elements. For instance, in some embodiments, a de-bound metal structure comprises relatively small amounts of carbon and/or oxygen. As described elsewhere herein, such components may react undesirably with the metal in the de-bound metal structure during further additive manufacturing steps (e.g., during a sintering step). By way of example, carbon in a de-bound metal structure may react undesirably with surface oxides also therein.

In some embodiments, carbon makes up less than or equal to 0.5 wt %, less than or equal to 0.4 wt %, less than or equal to 0.2 wt %, less than or equal to 0.1 wt %, less than or equal to 0.05 wt %, or less than or equal to 0.02 wt % of the de-bound metal structure. In some embodiments, carbon makes up greater than or equal to 0 wt %, greater than or equal to 0.02 wt %, greater than or equal to 0.05 wt %, greater than or equal to 0.1 wt %, greater than or equal to 0.2 wt %, or greater than or equal to 0.4 wt % of the de-bound metal structure. Combinations of the above-referenced ranges are also possible (e.g., less than or equal to 0.5 wt % and greater than or equal to 0 wt %, or less than or equal to 0.1 wt % and greater than or equal to 0 wt %). Other ranges are also possible. The amount of carbon in the de-bound metal structure may be determined in accordance with ASTM E1019.

In some embodiments, oxygen makes up less than or equal to 1.5 wt % or less than or equal to 1 wt % of the de-bound metal structure. The amount of oxygen in the de-bound metal structure may be determined in accordance with ASTM E1019.

As described above, certain embodiments relate to the formation of metal objects from de-bound metal structures and/or composite metal structures. Certain embodiments relate to metal objects. Further details regarding such embodiments are provided below.

As also described above, formation of a metal object from a de-bound metal structure and/or a composite metal structure may comprise heating the de-bound metal structure and/or the composite metal structure. During this heating process, it is desirable for the de-bound metal structure and/or a composite metal structure to undergo sintering without undergoing appreciable melting. In some embodiments, an environment in which a de-bound metal structure and/or a composite metal structure is positioned is heated to a temperature of greater than or equal to 500° C., greater than or equal to 550° C., greater than or equal to 600° C., greater than or equal to 650° C., greater than or equal to 700° C., greater than or equal to 750° C., greater than or equal to 800° C., greater than or equal to 850° C., greater than or equal to 900° C., greater than or equal to 950° C., greater than or equal to 1000° C., greater than or equal to 1050° C., greater than or equal to 1100° C., greater than or equal to 1150° C., greater than or equal to 1200° C., greater than or equal to 1250° C., greater than or equal to 1300° C., greater than or equal to 1350° C., greater than or equal to 1400° C., greater than or equal to 1500° C., or greater than or equal to 1600° C. In some embodiments, an environment in which a de-bound metal structure and/or a composite metal structure is positioned is heated to a temperature of less than or equal to 1700° C., less than or equal to 1600° C., less than or equal to 1500° C., less than or equal to 1400° C., less than or equal to 1350° C., less than or equal to 1300° C., less than or equal to 1250° C., less than or equal to 1200° C., less than or equal to 1150° C., less than or equal to 1100° C., less than or equal to 1050° C., less than or equal to 1000° C., less than or equal to 950° C., less than or equal to 900° C., less than or equal to 850° C., less than or equal to 800° C., less than or equal to 750° C., less than or equal to 700° C., less than or equal to 650° C., less than or equal to 600° C., or less than or equal to 550° C. Combinations of the above-referenced ranges are also possible (e.g., greater than or equal to 500° C. and less than or equal to 1700° C., greater than or equal to 700° C. and less than or equal to 1400° C., greater than or equal to 750° C. and less than or equal to 1400° C., greater than or equal to 750° C. and less than or equal to 1200° C., or greater than or equal to 750° C. and less than or equal to 850° C.). Other ranges are also possible. The temperature of an environment may be determined by use of a thermocouple positioned in the environment.

Formation of a metal object may comprise heating an environment in which a de-bound metal structure and/or a composite metal structure is positioned in for a variety of suitable amounts of time. In some embodiments, an environment in which a de-bound metal structure and/or a composite metal structure is positioned is heated for a time period of greater than or equal to 30 minutes, greater than or equal to 1 hour, greater than or equal to 2 hours, greater than or equal to 3 hours, greater than or equal to 6 hours, greater than or equal to 9 hours, greater than or equal to 12 hours, greater than or equal to 18 hours, greater than or equal to 1 day, or greater than or equal to 1.5 days. In some embodiments, an environment in which a de-bound metal structure and/or a composite metal structure is positioned is heated for a time period of less than or equal to 2 days, less than or equal to 1.5 days, less than or equal to 1 day, less than or equal to 18 hours, less than or equal to 12 hours, less than or equal to 9 hours, less than or equal to 6 hours, less than or equal to 3 hours, less than or equal to 2 hours, or less than or equal to 1 hour. Combinations of the above-referenced ranges are also possible (e.g., greater than or equal to 30 minutes and less than or equal to 2 days). Other ranges are also possible.

In some embodiments, heating a de-bound metal structure and/or metal-based composite structure comprises heating the environment in which the de-bound metal structure and/or metal-based composite structure is positioned to one temperature in one or more of the above-referenced ranges and holding the temperature of the environment thereat for an amount of time in one of the above-referenced ranges. In some embodiments, heating a de-bound metal structure and/or metal-based composite structure comprises heating an environment in which the de-bound metal structure and/or metal-based composite structure is positioned to two or more temperatures in the above-referenced ranges sequentially and holding the temperature of the environment at each of the two or more temperatures. In such embodiments, the relevant environment may be held at each of the relevant temperatures for a period of time in one or more of the above-referenced ranges and/or may be heated such that the total time it is held at all of the relevant temperatures is in one or more of the above-referenced ranges.

Non-limiting examples of suitable environments in which a de-bound part may be positioned during sintering include an oven or a furnace. The relevant environment may comprise a variety of suitable types of gases. For instance, in some embodiments, the relevant environment may be a reducing environment. By way of example, the relevant requirement may comprise a reducing species, such as hydrogen (e.g., pure hydrogen, a mixture of hydrogen and argon comprising 1 vol % to 6 vol % hydrogen, a mixture of hydrogen and argon comprising up to 10 vol % hydrogen). In some embodiments, the relevant environment is an inert environment. By way of example, the relevant environment may comprise, consist of, and/or consist essentially of inert gases, such as nitrogen, argon, and/or helium. As another example of a type of environment, in some embodiments, the relevant environment may be a vacuum.

Some metal objects described herein advantageously both comprise a metal alloy and have a density that is relatively close to the density of the metal alloy included therein. Metal objects having this property may include a relatively low amount of internal pores (i.e., pores included in the bulk of the metal object and not in fluidic communication with an environment external to the metal object) and/or may include internal pores that make up a relatively small volume fraction of the metal object. Low amounts and/or volume fractions of internal pores may desirably increase the robustness and strength of the metal object.

The relationship between the density of a metal object and the density of a metal alloy included therein may be parametrized by a relative density. As used herein, the relative density may be computed by dividing the bulk density of the metal object by the bulk density of the relevant metal alloy and multiplying by 100%. Accordingly, a relative density of 100% would indicate that the metal object has a density identical to the bulk metal alloy included therein while a relative densities of less than 100% would indicate that the metal object has a density less than the metal alloy included therein. The bulk density of a metal object may be computed in accordance with ASTM B962-17. It should be understood that internal pores would contribute to this volume (because they are entirely enclosed by the outer boundary of the metal object) while open pores and other features partially enclosed by a metal object would not contribute to this volume.

In some embodiments, a metal object has a relative density of greater than or equal to 90%, greater than or equal to 91%, greater than or equal to 92%, greater than or equal to 93%, greater than or equal to 94%, greater than or equal to 95%, greater than or equal to 96%, greater than or equal to 97%, greater than or equal to 98%, or greater than or equal to 99%. In some embodiments, a metal object has a relative density of less than or equal to 100%, less than or equal to 99%, less than or equal to 98%, less than or equal to 97%, less than or equal to 96%, less than or equal to 95%, less than or equal to 94%, less than or equal to 93%, less than or equal to 92%, or less than or equal to 91%. Combinations of the above-referenced ranges are also possible (e.g., greater than or equal to 90% and less than or equal to 100%). Other ranges are also possible.

Metal objects described herein may have a chemical composition similar to the metal powders from which they were formed. For instance, a metal object may comprise a metal alloy. Non-limiting examples of suitable metal alloys include ferric alloys, such as steels. Non-limiting examples of steels include stainless steels (e.g., 17-4 PH stainless steel, 316 stainless steel, 260L stainless steel) and low alloy steels (e.g., 4140 low alloy steel). In some embodiments, a metal object comprises a precious metal or precious metal alloy from the precious metal powder, such as gold, sterling silver, and/or platinum. Non-limiting examples of suitable metal alloys include argentium silver (e.g., 93.5 wt % or 96 wt % silver alloyed with other metals or metalloids, such as germanium), yellow gold (e.g., 75 wt % gold, 16 wt % silver, 9 wt % copper), rose gold (e.g., 75 wt % gold, 6 wt % silver, 19 wt % copper), and platinum (e.g., Pt850/Ir, Pt900/Ir, Pt950/Ir, Pt950/Ru, Pt850/Co50/Pd100, etc.). In some instances, the weight percent of the precious metal and/or precious metal alloy from the precious metal powder in the metal object is greater than or equal to 90 wt %, greater than or equal to 93 wt %, greater than or equal to 95 wt %, greater than or equal to 97 wt %, greater than or equal to 98 wt %, and/or up 99 wt %, up to 99.5 wt %, up to 99.9 wt %, or more. Combinations of these ranges are possible (e.g., a wt % of between 93 wt % and 99 wt %.

In some embodiments, a metal object comprises a metal alloy comprising chromium (e.g., an alloy comprising iron and chromium). Chromium may make up greater than or equal to 0 wt %, greater than or equal to 0.1 wt %, greater than or equal to 0.2 wt %, greater than or equal to 0.5 wt %, greater than or equal to 0.8 wt %, greater than or equal to 0.9 wt %, greater than or equal to 1 wt %, greater than or equal to 1.25 wt %, greater than or equal to 1.5 wt %, greater than or equal to 1.75 wt %, greater than or equal to 2 wt %, greater than or equal to 5 wt %, greater than or equal to 7.5 wt %, greater than or equal to 10 wt %, greater than or equal to 12.5 wt %, or greater than or equal to 15 wt % of the metal object. Chromium may make up less than or equal to 17.5 wt %, less than or equal to 15 wt %, less than or equal to 12.5 wt %, less than or equal to 10 wt %, less than or equal to 7.5 wt %, less than or equal to 5 wt %, less than or equal to 2 wt %, less than or equal to 1.75 wt %, less than or equal to 2.5 wt %, less than or equal to 1.25 wt %, less than or equal to 1 wt %, less than or equal to 0.9 wt %, less than or equal to 0.8 wt %, less than or equal to 0.5 wt %, less than or equal to 0.2 wt %, or less than or equal to 0.1 wt % of the metal object. Combinations of the above-referenced ranges are also possible (e.g., greater than or equal to 0 wt % and less than or equal to 17.5 wt %, greater than or equal to 0.8 wt % and less than or equal to 17.5 wt %, greater than or equal to 0.8 wt % and less than or equal to 1.1 wt %, or greater than or equal to 15 wt % and less than or equal to 17.5 wt %).

Other ranges are also possible. The chromium content of a metal alloy may be determined by in accordance with ASTM E1086-08.

In some embodiments, a metal object comprises a metal alloy comprising carbon (e.g., an alloy comprising iron and carbon). Carbon may make up greater than or equal to 0 wt %, greater than or equal to 0.01 wt %, greater than or equal to 0.02 wt %, greater than or equal to 0.03 wt %, greater than or equal to 0.05 wt %, greater than or equal to 0.07 wt %, greater than or equal to 0.1 wt %, greater than or equal to 0.15 wt %, greater than or equal to 0.2 wt %, greater than or equal to 0.25 wt %, greater than or equal to 0.3 wt %, greater than or equal to 0.35 wt %, greater than or equal to 0.38 wt %, or greater than or equal to 0.39 wt % of the metal object. Carbon may make up less than or equal to 0.4 wt %, less than or equal to 0.39 wt %, less than or equal to 0.38 wt %, less than or equal to 0.35 wt %, less than or equal to 0.3 wt %, less than or equal to 0.25 wt %, less than or equal to 0.2 wt %, less than or equal to 0.15 wt %, less than or equal to 0.1 wt %, less than or equal to 0.07 wt %, less than or equal to 0.05 wt %, less than or equal to 0.03 wt %, less than or equal to 0.02 wt %, or less than or equal to 0.01 wt % of the metal object. Combinations of the above-referenced ranges are also possible (e.g., greater than or equal to 0 wt % and less than or equal to 0.4 wt %, greater than or equal to 0 wt % and less or equal to 0.07 wt %, or greater than or equal to 0.38 wt % and less than or equal to 0.4 wt %). Other ranges are also possible. The carbon content of a metal alloy may be determined in accordance with ASTM E1086-08.

Further examples of elements that may be included in metal alloys suitable for use in metal objects described herein include, but are not limited to, aluminum (which may make up, e.g., greater than or equal to 0.95 wt % and less than or equal to 1.30 wt % of the metal alloy), boron (which may make up, e.g., greater than or equal to 0.001 wt % and less than or equal to 0.003 wt % of the metal alloy), cobalt (which may make up, e.g., greater than or equal to 0 wt % and less than or equal to 8 wt % of the metal alloy), copper (which may make up, e.g., greater than or equal to 0 wt % and less than or equal to 5 wt % of the metal alloy), manganese (which may make up, e.g., greater than or equal to 0 wt % and less than or equal to 12 wt % of the metal alloy), molybdenum (which may make up, e.g., greater than or equal to 0.2 wt % and less than or equal to 5 wt % of the metal alloy), nickel (which may make up, e.g., greater than or equal to 2 wt % and less than or equal to 20 wt % of the metal alloy), phosphorus (which may be present in trace amounts and/or make up, e.g., greater than or equal to 0 wt % and less than or equal to 0.05 wt % of the metal alloy), silicon (which may make up, e.g., greater than or equal to 0.2 wt % and less than or equal to 2 wt % of the metal alloy), vanadium (which may make up, e.g., greater than or equal to 0 wt % and less than or equal to 5 wt % of the metal alloy), tungsten (which may make up, e.g., greater than or equal to 0 wt % and less than or equal to 18 wt % of the metal alloy), and zirconium (which may make up, e.g., approximately 0.1 wt % of the metal alloy). The amount of each of the above-referenced elements in a metal alloy may be determined in accordance with ASTM E1086-08.

For convenience, certain terms employed in the specification, examples, and appended claims are listed here. Definitions of specific functional groups and chemical terms are described in more detail below. For purposes of this invention, the chemical elements are identified in accordance with the Periodic Table of the Elements, CAS version, Handbook of Chemistry and Physics, 75th Ed., inside cover, and specific functional groups are generally defined as described therein. Additionally, general principles of organic chemistry, as well as specific functional moieties and reactivity, are described in Organic Chemistry, Thomas Sorrell, University Science Books, Sausalito: 1999.

The term "aliphatic," as used herein, includes both saturated and unsaturated, nonaromatic, straight chain (i.e., unbranched), branched, acyclic, and cyclic (i.e., carbocyclic) hydrocarbons, which are optionally substituted with one or more functional groups. As will be appreciated by one of ordinary skill in the art, "aliphatic" is intended herein to include, but is not limited to, alkyl, alkenyl, alkynyl, cycloalkyl, cycloalkenyl, and cycloalkynyl moieties. Thus, as used herein, the term "alkyl" includes straight, branched and cyclic alkyl groups. An analogous convention applies to other generic terms such as "alkenyl", "alkynyl", and the like. Furthermore, as used herein, the terms "alkyl", "alkenyl", "alkynyl", and the like encompass both substituted and unsubstituted groups. In certain embodiments, as used herein, "aliphatic" is used to indicate those aliphatic groups (cyclic, acyclic, substituted, unsubstituted, branched or unbranched) having 1-20 carbon atoms. Aliphatic group substituents include, but are not limited to, any of the substituents described herein, that result in the formation of a stable moiety (e.g., aliphatic, alkyl, alkenyl, alkynyl, heteroaliphatic, heterocyclic, aryl, heteroaryl, acyl, oxo, imino, thiooxo, cyano, isocyano, amino, azido, nitro, hydroxyl, thiol, halo, aliphaticamino, heteroaliphaticamino, alkylamino, heteroalkylamino, arylamino, heteroarylamino, alkylaryl, arylalkyl, aliphaticoxy, heteroaliphaticoxy, alkyloxy, heteroalkyloxy, aryloxy, heteroaryloxy, aliphaticthioxy, heteroaliphaticthioxy, alkylthioxy, heteroalkylthioxy, arylthioxy, heteroarylthioxy, acyloxy, and the like, each of which may or may not be further substituted).

The term "alkyl" refers to the radical of saturated aliphatic groups, including straight-chain alkyl groups, branched-chain alkyl groups, cycloalkyl (alicyclic) groups, alkyl substituted cycloalkyl groups, and cycloalkyl substituted alkyl groups. The alkyl groups may be optionally substituted, as described more fully below. Examples of alkyl groups include, but are not limited to, methyl, ethyl, propyl, isopropyl, butyl, isobutyl, tert-butyl, 2-ethylhexyl, cyclopropyl, cyclobutyl, cyclopentyl, cyclohexyl, and the like. "Heteroalkyl" groups are alkyl groups wherein at least one atom is a heteroatom (e.g., oxygen, sulfur, nitrogen, phosphorus, etc.), with the remainder of the atoms being carbon atoms. Examples of heteroalkyl groups include, but are not limited to, alkoxy, poly(ethylene glycol)-, alkyl-substituted amino, tetrahydrofuranyl, piperidinyl, morpholinyl, etc.

The terms "alkenyl" and "alkynyl" refer to unsaturated aliphatic groups analogous to the alkyl groups described above, but containing at least one double or triple bond respectively. The "heteroalkenyl" and "heteroalkynyl" refer to alkenyl and alkynyl groups as described herein in which one or more atoms is a heteroatom (e.g., oxygen, nitrogen, sulfur, and the like).

The term "aryl" refers to an aromatic carbocyclic group having a single ring (e.g., phenyl), multiple rings (e.g., biphenyl), or multiple fused rings in which at least one is aromatic (e.g., 1,2,3,4-tetrahydronaphthyl, naphthyl, anthryl, or phenanthryl), all optionally substituted. "Heteroaryl" groups are aryl groups wherein at least one ring atom in the aromatic ring is a heteroatom, with the remainder of the ring atoms being carbon atoms. Examples of heteroaryl groups include furanyl, thienyl, pyridyl, pyrrolyl, N lower alkyl pyrrolyl, pyridyl N oxide, pyrimidyl, pyrazinyl, imidazolyl, indolyl and the like, all optionally substituted.

The terms "amine" and "amino" refer to both unsubstituted and substituted amines, e.g., a moiety that can be represented by the general formula: N(R')(R")(R''') wherein R', R", and R''' each independently represent a group permitted by the rules of valence.

The terms "acyl," "carboxyl group," or "carbonyl group" are recognized in the art and can include such moieties as can be represented by the general formula:

wherein W is H, OH, O-alkyl, O-alkenyl, or a salt thereof. Where W is O-alkyl, the formula represents an "ester." Where W is OH, the formula represents a "carboxylic acid." In general, where the oxygen atom of the above formula is replaced by sulfur, the formula represents a "thiolcarbonyl" group. Where W is a S-alkyl, the formula represents a "thiolester." Where W is SH, the formula represents a "thiolcarboxylic acid." On the other hand, where W is alkyl, the above formula represents a "ketone" group. Where W is hydrogen, the above formula represents an "aldehyde" group.

As used herein, the term "heteroaromatic" or "heteroaryl" means a monocyclic or polycyclic heteroaromatic ring (or radical thereof) comprising carbon atom ring members and one or more heteroatom ring members (such as, for example, oxygen, sulfur or nitrogen). Typically, the heteroaromatic ring has from 5 to about 14 ring members in which at least 1 ring member is a heteroatom selected from oxygen, sulfur, and nitrogen. In another embodiment, the heteroaromatic ring is a 5 or 6 membered ring and may contain from 1 to about 4 heteroatoms. In another embodiment, the heteroaromatic ring system has a 7 to 14 ring members and may contain from 1 to about 7 heteroatoms. Representative heteroaryls include pyridyl, furyl, thienyl, pyrrolyl, oxazolyl, imidazolyl, indolizinyl, thiazolyl, isoxazolyl, pyrazolyl, isothiazolyl, pyridazinyl, pyrimidinyl, pyrazinyl, triazinyl, triazolyl, pyridinyl, thiadiazolyl, pyrazinyl, quinolyl, isoquinolyl, indazolyl, benzoxazolyl, benzofuryl, benzothiazolyl, indolizinyl, imidazopyridinyl, isothiazolyl, tetrazolyl, benzimidazolyl, benzoxazolyl, benzothiazolyl, benzothiadiazolyl, benzoxadiazolyl, carbazolyl, indolyl, tetrahydroindolyl, azaindolyl, imidazopyridyl, qunizaolinyl, purinyl, pyrrolo[2,3]pyrimidyl, pyrazolo[3,4]pyrimidyl, benzo(b)thienyl, and the like. These heteroaryl groups may be optionally substituted with one or more substituents.

The term "substituted" is contemplated to include all permissible substituents of organic compounds, "permissible" being in the context of the chemical rules of valence known to those of ordinary skill in the art. In some cases, "substituted" may generally refer to replacement of a hydrogen with a substituent as described herein. However, "substituted," as used herein, does not encompass replacement and/or alteration of a key functional group by which a molecule is identified, e.g., such that the "substituted" functional group becomes, through substitution, a different functional group. For example, a "substituted phenyl" must still comprise the phenyl moiety and cannot be modified by substitution, in this definition, to become, e.g., a heteroaryl group such as pyridine. In a broad aspect, the permissible substituents include acyclic and cyclic, branched and unbranched, carbocyclic and heterocyclic, aromatic and nonaromatic substituents of organic compounds. Illustrative substituents include, for example, those described herein. The permissible substituents can be one or more and the same or different for appropriate organic compounds. For purposes of this invention, the heteroatoms such as nitrogen may have hydrogen substituents and/or any permissible substituents of organic compounds described herein which satisfy the valencies of the heteroatoms. This invention is not intended to be limited in any manner by the permissible substituents of organic compounds.

Examples of substituents include, but are not limited to, alkyl, aryl, aralkyl, cyclic alkyl, heterocycloalkyl, hydroxy, alkoxy, aryloxy, perhaloalkoxy, aralkoxy, heteroaryl, heteroaryloxy, heteroarylalkyl, heteroaralkoxy, azido, amino, halogen, alkylthio, oxo, acyl, acylalkyl, carboxy esters, carboxyl, carboxamido, nitro, acyloxy, aminoalkyl, alkylaminoaryl, alkylaryl, alkylaminoalkyl, alkoxyaryl, arylamino, aralkylamino, alkylsulfonyl, carboxamidoalkylaryl, carboxamidoaryl, hydroxyalkyl, haloalkyl, alkylaminoalkylcarboxy, aminocarboxamidoalkyl, alkoxyalkyl, perhaloalkyl, arylalkyloxyalkyl, and the like.

Example 1

This Example describes the preparation of four binder compositions and the formation of metal-based composite structures therefrom.

Four binder compositions having the components shown in Table 1 were each prepared by the procedure described below. First, the components for the binder composition other than the concentrated solution of ammonium hydroxide were charged into a flask. For binder compositions 2 and 3, the concentrated solution of ammonium hydroxide was then added in sufficient amount to cause the mixture to reach the desired pH. Next, for all binder compositions, the resultant mixture was magnetically stirred at room temperature for 1 hour. Finally, the homogeneous solutions were filtered through a Buchner funnel. After these steps, binder composition 1 had a pH of 2.1.

TABLE 1

| | Binder composition no. | | | |
| --- | --- | --- | --- | --- |
| | 1 | 2 | 3 | 4 (comparative) |
| Amount of 50 wt % aqueous solution of poly(acrylic acid) with $M_w$ = 4 kDa (Sokalan CP10S; purchased from BASF Inc.) | 900 g | 180 g | 180 g | |
| Amount of Poval 3-98 (polyvinyl alcohol) | | | | 5 g |
| Amount of glycerol (purchased from Sigma-Aldrich, Inc.) | 50 g | 10 g | 10 g | |

TABLE 1-continued

| | Binder composition no. | | | |
|---|---|---|---|---|
| | 1 | 2 | 3 | 4 (comparative) |
| Amount of isopropanol (purchased from Sigma-Aldrich, Inc.) | 250 g | 50 g | 50 g | |
| Amount of Thetawet FS-8150 (purchased from ICT, Inc.) | 2.5 g | 0.5 g | 0.5 g | 0.1 g |
| Amount of deionized water | 1297.5 g | 259 g | 259 g | 95 g |
| Amount of concentrated solution of ammonium hydroxide in water | | Sufficient to bring pH of binder composition to 6.3 | Sufficient to bring pH of binder composition to 7.5 | |

For binder compositions 2-4, metal-based composite structures were produced from a mixture thereof with a metal powder comprising a 4140 low alloy steel particles having a D90 of approximately 25 microns. 190 g of the 4140 low alloy steel powder and 36 g of the relevant binder composition were charged into a mixing cup of a Flack Tech Speed Mixer. The cup was then spun at approximately 800 rpm under 20 mmHg of vacuum for 2 minutes, which yielded an even, bubble-free suspension. Next, the bubble-free suspension was poured into five molds. The filled molds were allowed to sit for 2 hours, after which the supernatant liquid was removed from the settled 4140 low alloy steel powder by pipette. Then, the filled molds were allowed to dry at 35° C. in an oven under nitrogen at atmospheric pressure for 24 hours. After drying, the oven was held under nitrogen and subject to the following temperature profile: (1) heating to 105° C. at 0.67° C./minute; (2) holding at 105° C. for at least 1 hour; (3) heating to 190° C. at 1.1° C./minute; (4) holding at 190° C. for 1 hour. Then, the heating element of the oven was turned off, and the oven was held under nitrogen and allowed to cool to room temperature.

An attempt was made to fabricate metal-based composite structures from binder composition 1 and the 4140 low alloy steel metal powder described above by the procedure described above. However, approximately 1 hour after the relevant even, bubble-free suspension was poured into the molds, it began to show strong gas evolution. This was believed to indicate a lack of compatibility with the 4140 low alloy steel, and so the attempt was abandoned.

After the molds comprising the metal-based composite structure formed from binder compositions 2 and 3 reached room temperature, a portion thereof were demolded and then broken to expose their cross-sections. The cross-section of the metal-based composite structure prepared from binder composition 2 had voids, while the cross-section of the brown part prepared from binder composition 3 lacked voids. As voids are typically considered undesirable, it is believed that binder compositions having a pH in excess of 6.3 are desirable for the preparation of metal-based composite structures from 4140 low alloy steel powders.

Another portion of the metal-based composite structures formed from binder composition 2 and those formed from binder composition 4 were demolded and then sanded with 220 grit sandpaper. After sanding, the metal-based composite structures had smooth, even surfaces and lacked sharp edges at their corners. The average transverse flexural strengths of the these sanded bars was measured in accordance with ASTM B528-16. The average transverse flexural strength was determined to be 11 MPa for the sanded bars formed from binder composition 3 and 4 MPa for those formed from binder composition 4. Accordingly, binder composition 3, which included a low molecular weight polymer comprising an acrylic acid repeat group, performed better than binder composition 4, which did not.

Example 2

This Example describes the preparation of three binder compositions and their use in binder jetting.

Three binder compositions having the components shown in Table 2 were each prepared using the method described in Example 1.

TABLE 2

| | Binder composition no. | | |
|---|---|---|---|
| | 5 | 6 | 7 |
| Wt % poly(acrylic acid) with $M_w$ = 4 kDa | 15.94 | 19.33 | 20 |
| Wt % isopropanol | 9 | | 10 |
| Wt % Thetawet FS-8150 | 0.09 | | 0.1 |
| Wt % glycerol | 1.8 | 2.04 | 2 |
| Wt % pH ammonium hydroxide | 10.5 | 13.07 | |
| 1,2,-hexanediol | | 2.15 | |
| Wt % deionzed water | Balance | Balance | Balance |

For each binder composition shown in Table 2, droplets were produced using a Samba G3L ink-jet print head equipped with Megnajet CIMS-2HFR (available from Megnajet, Northamptonshire, England) recirculation system. Droplet volume and velocity were determined using a stroboscope, a camera, and imaging software, all available from JetXpert, Nashua, NH, USA. For each binder formulation, ink-jet pulse voltage, pulse time, and pulse sequence were adjusted to produce droplets having volumes in the range of 9 pL to 12 pL and velocities in range of 8 m/sec to 12 m/sec when measured at 0.5 mm from the print head nozzle at 24 kHz pulse frequency. If more than 1 droplet was produced for each pulse sequence, the pulse sequence was adjusted to cause the droplets to coalesce into a single droplet not farther than 0.5 mm from the print head nozzle. The resulting pulse sequence is referred to herein as "the large drop waveform". Latency was assessed by operating the print head at the large droplet waveform until stable droplet formation was established, turning off the print head for 5 sec, turning the print head back on again, and then determining how many droplets were ejected from the print head before stable droplet formation was reestablished.

Table 3 lists the pH of each binder composition and the average number of droplets ejected from the print head prior to resumption of normal printing for each binder composition.

TABLE 3

| Binder composition no. | pH | Latency (average number of droplets ejected from the print head prior to resumption of normal printing) |
|---|---|---|
| 5 | 7 | 14 |
| 6 | 7 | 39 |
| 7 | 3 | 399 |

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method of additive manufacturing a metal-based composite structure by binder jet printing, the method comprising:
    depositing a first layer of metal powder;
    depositing a binder composition on at least a portion of the first layer of metal powder, the binder composition comprising:
        water,
        an adhesion promoter that is a small molecule, the adhesion promoter comprising a thiol group, and
        a low molecular weight polymer including an acrylic acid repeat unit, wherein the binder composition has a pH of greater than or equal to 4; and
    drying and/or cross-linking at least the binder composition deposited on the first layer of the metal powder, thereby forming a metal-based composite structure.

2. The method of claim 1, wherein the low molecular weight polymer has a weight average molecular weight of less than or equal to 40 kDa.

3. The method of claim 1, wherein the thiol group is a first functional group, and wherein the adhesion promoter further comprises a second functional group.

4. The method of claim 3, wherein the second functional group is a nucleophilic functional group or an electrophilic group.

5. The method of claim 3, wherein the adhesion promoter further comprises a third functional group.

6. The method of claim 5, wherein the third functional group is a nucleophilic group or an electrophilic group.

7. The method of claim 1, wherein the metal powder comprises gold metal and/or a gold alloy.

8. The method of claim 1, wherein the adhesion promoter has a molecular weight of less than 1000 Da.

9. The method of claim 8, wherein the low molecular weight polymer has a weight average molecular weight of less than or equal to 40 kDa.

10. The method of claim 1, wherein the adhesion promoter has a molecular weight of less than 500 Da.

11. The method of claim 1, wherein the adhesion promoter has a molecular weight of less than 300 Da.

12. The method of claim 1, wherein the adhesion promoter forms a covalent bond with the low molecular weight polymer.

13. The method of claim 12, wherein the adhesion promoter forms a covalent bond with the metal powder.

14. A method of additive manufacturing a metal-based composite structure by binder jet printing, the method comprising:

depositing a first layer of metal powder;

depositing a binder composition on at least a portion of the first layer of metal powder, the binder composition comprising:

water, an adhesion promoter that is a small molecule, wherein the adhesion promoter is or comprises cysteine, cystine, methionine, homocysteine, an amine thiol, dithiothreitol, mercaptoethanol, a thiocarboxylic acid, and/or a thiocarboxylate, and a low molecular weight polymer including an acrylic acid repeat unit, wherein the binder composition has a pH of greater than or equal to 4; and drying and/or cross-linking at least the binder composition deposited on the first layer of the metal powder, thereby forming a metal-based composite structure.

15. The method of claim 14, wherein the adhesion promoter is cysteine, cystine, methionine, homocysteine, dithiothreitol, or mercaptoethanol.

16. The method of claim 14, wherein the adhesion promoter is cysteine.

17. The method of claim 14, wherein the metal powder comprises gold metal and/or a gold alloy.

* * * * *